May 4, 1954 P. J. CAMPBELL 2,677,310
CONTOUR FORMING MACHINE, INCLUDING TRACER CONTROL MECHANISM
Filed Dec. 13, 1948 17 Sheets-Sheet 3
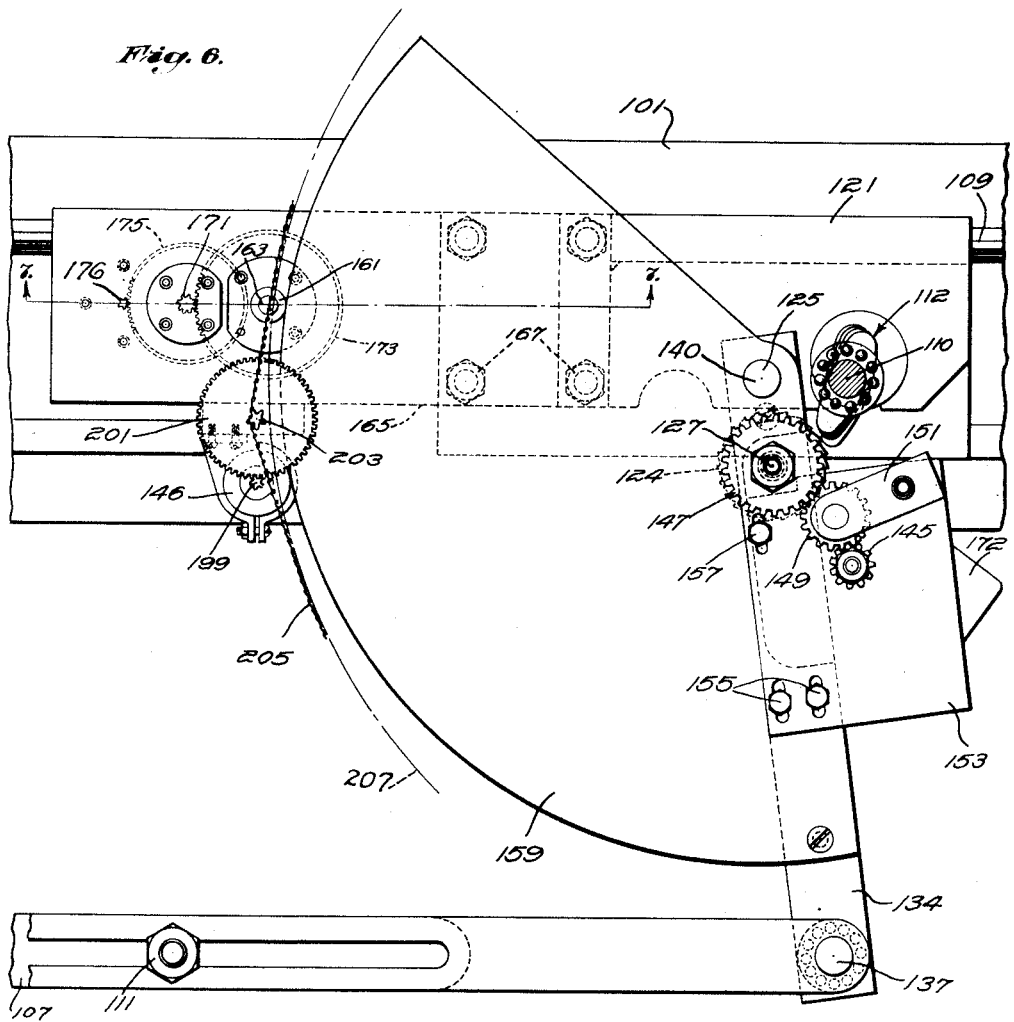
INVENTOR.
Paul J. Campbell
BY
H. Hume Mathews
Attorney

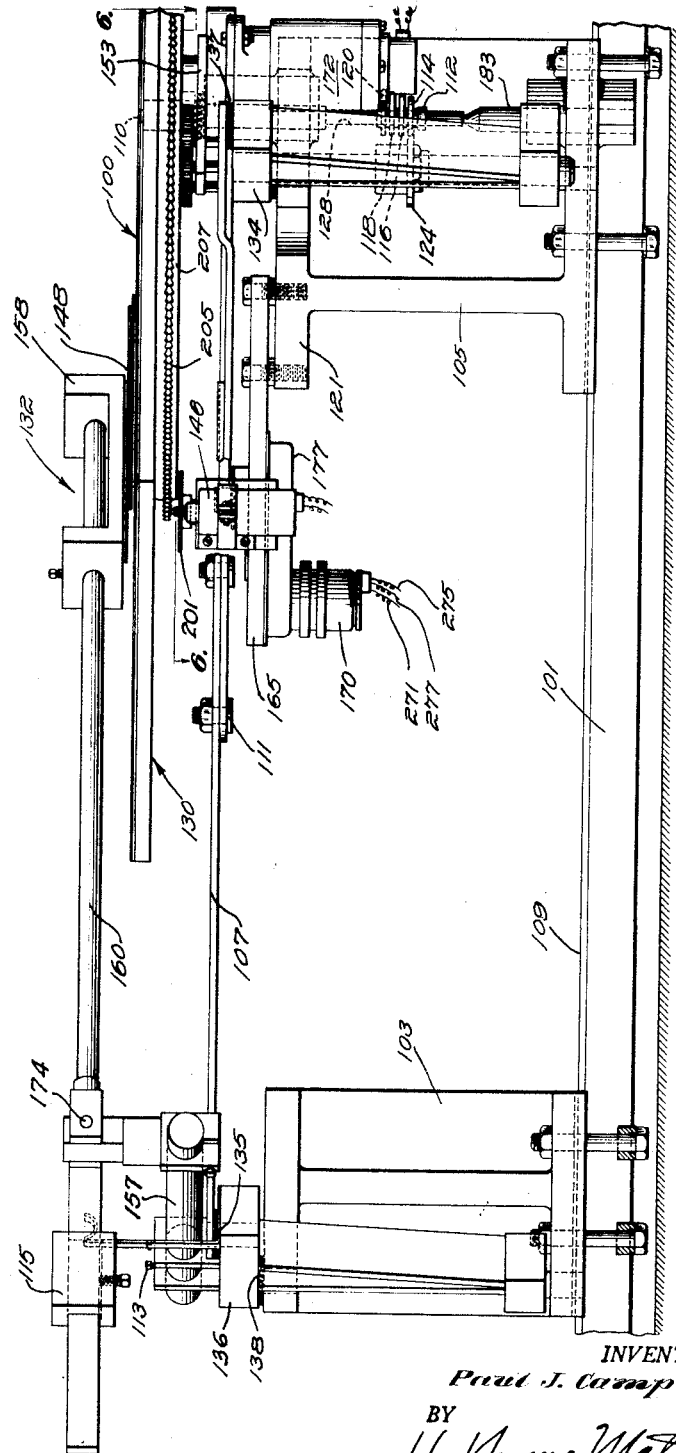

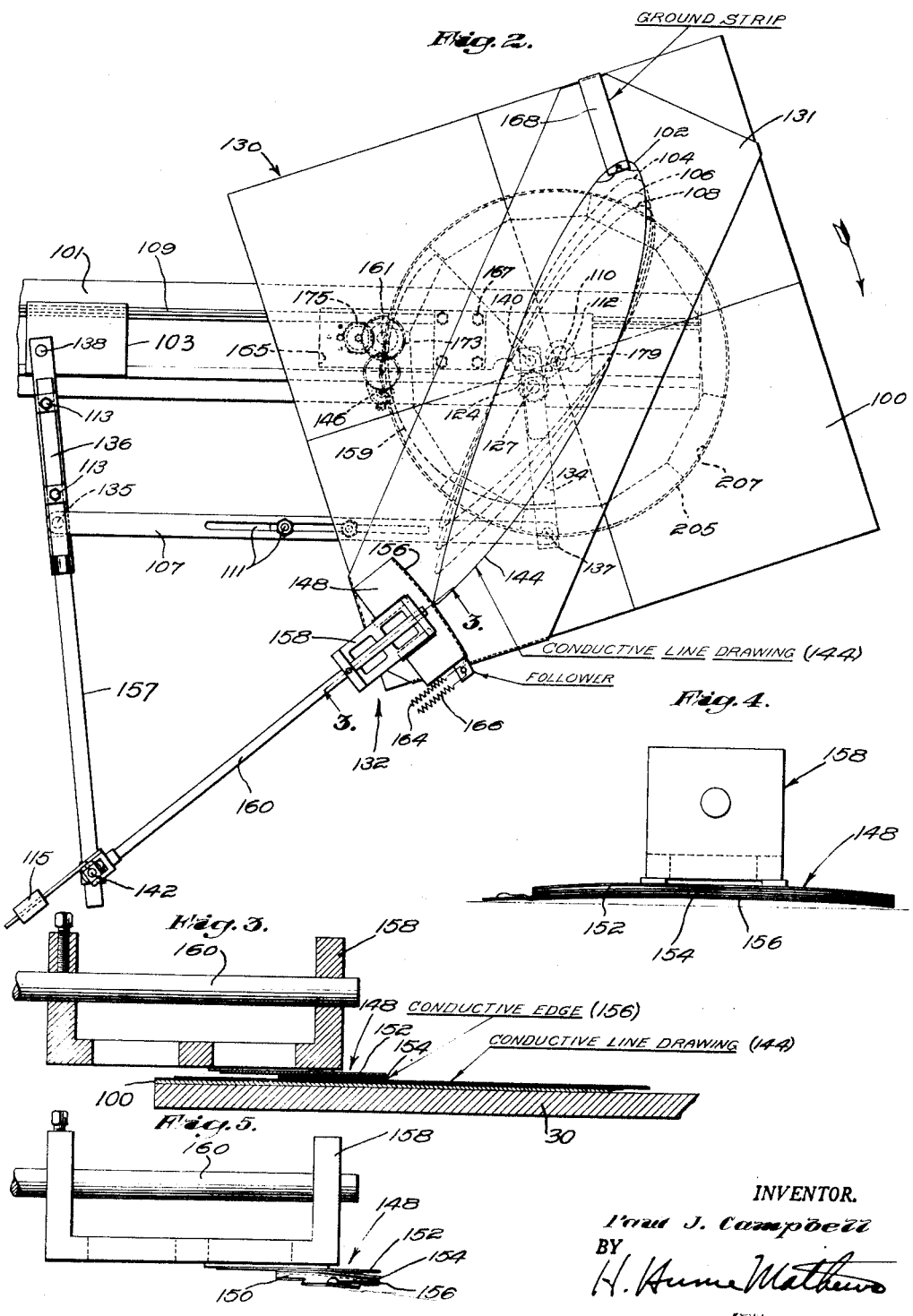

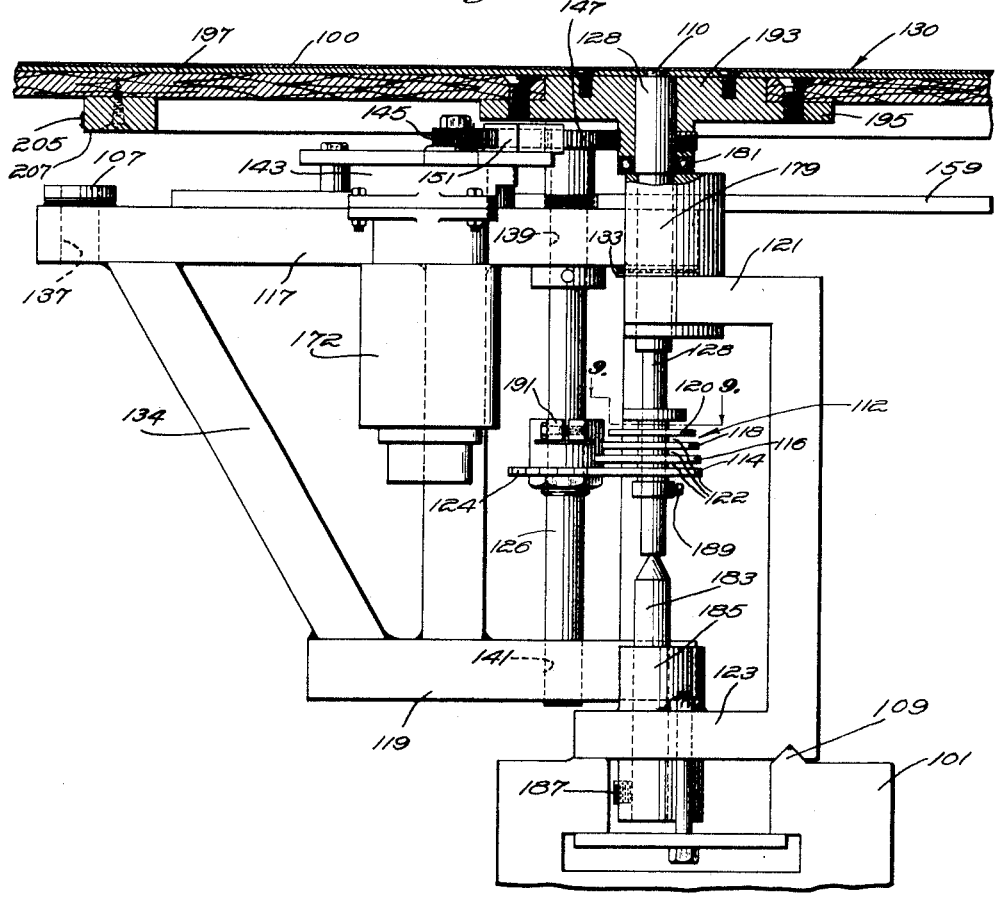
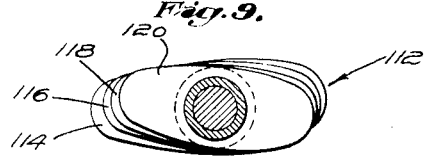

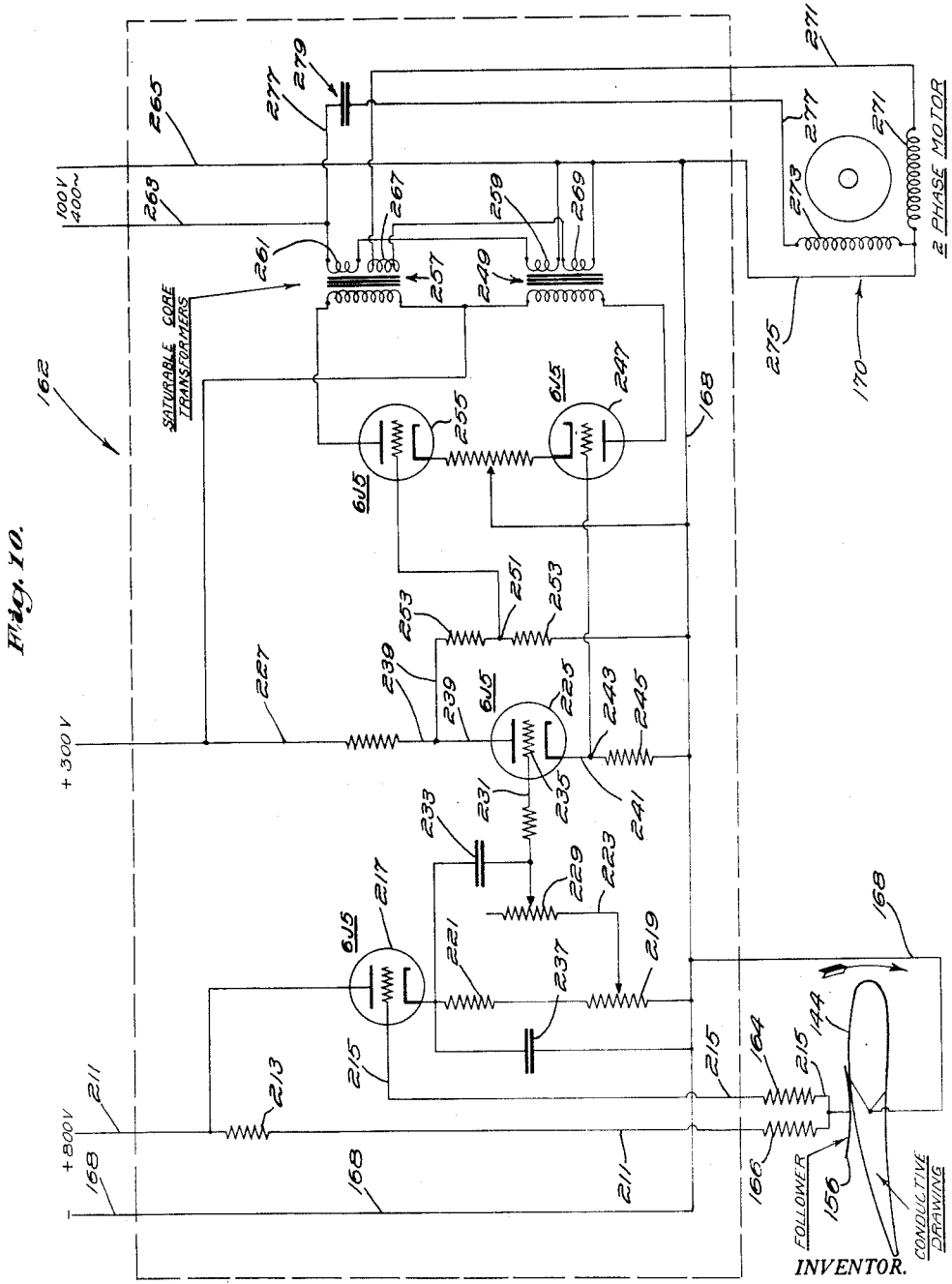

May 4, 1954 P. J. CAMPBELL 2,677,310
CONTOUR FORMING MACHINE, INCLUDING TRACER CONTROL MECHANISM
Filed Dec. 13, 1948 17 Sheets-Sheet 6

INVENTOR.
Paul J. Campbell
BY
H. Hume Mathews
Attorneys

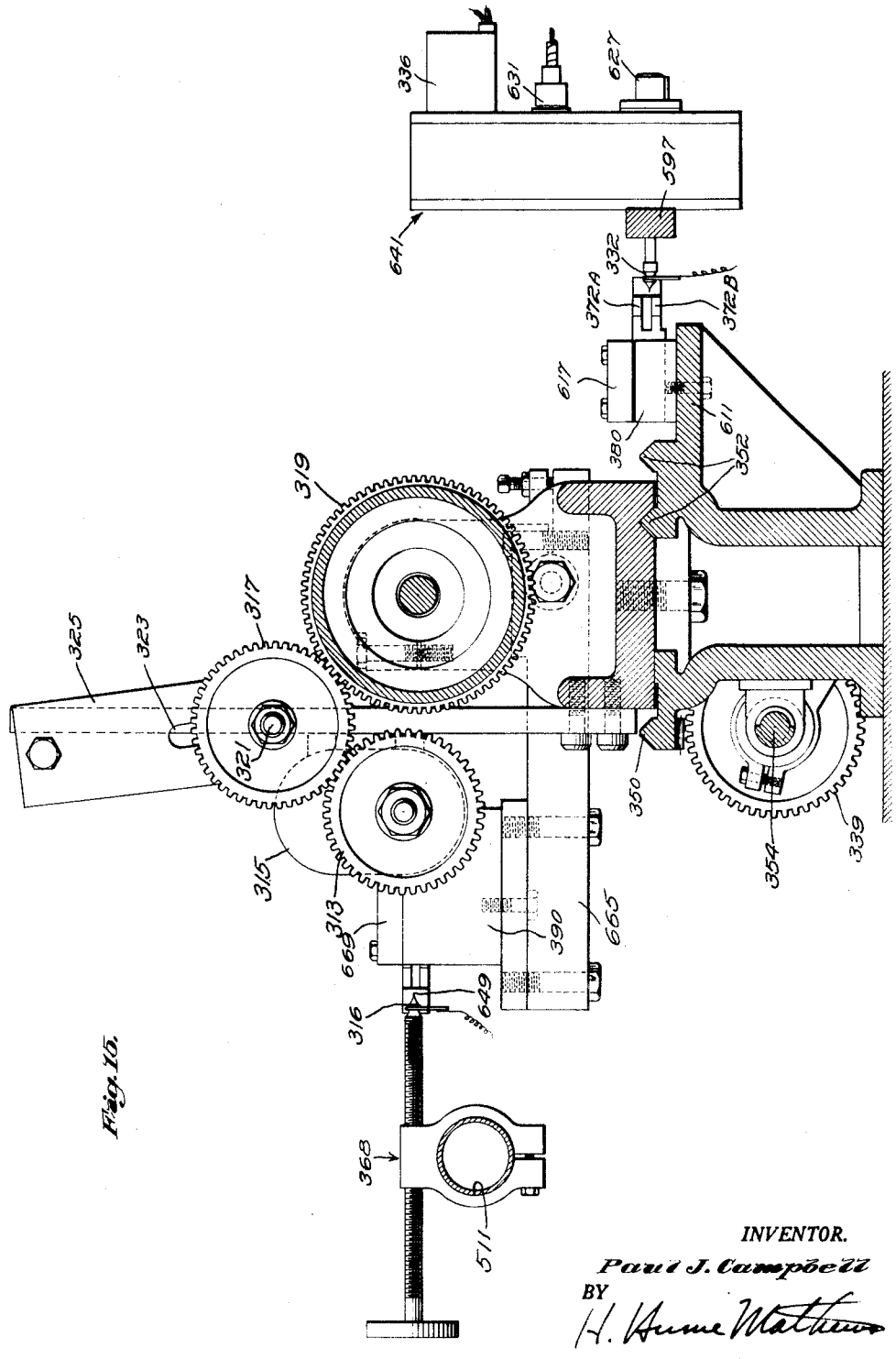

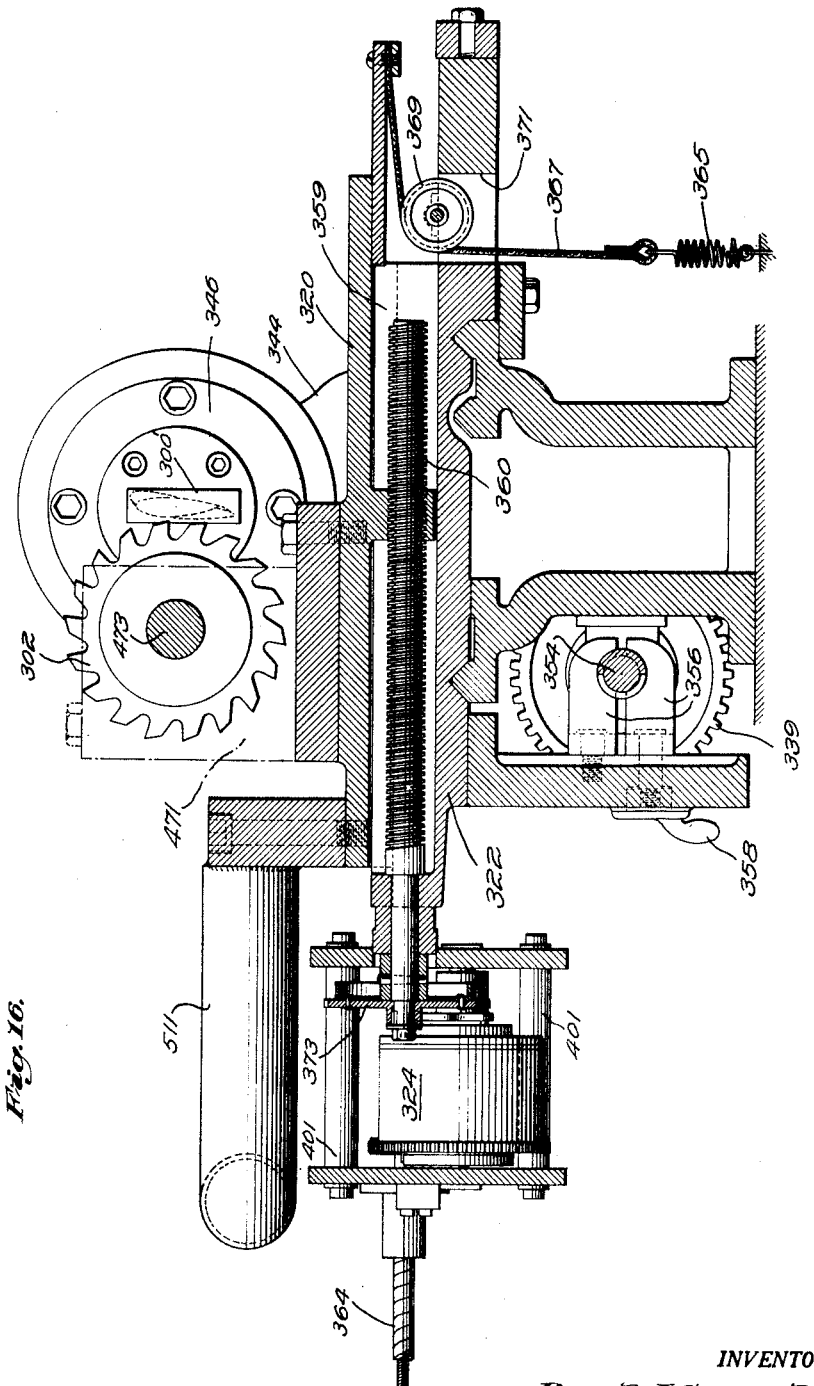

May 4, 1954 P. J. CAMPBELL 2,677,310
CONTOUR FORMING MACHINE, INCLUDING TRACER CONTROL MECHANISM
Filed Dec. 13, 1948 17 Sheets-Sheet 11
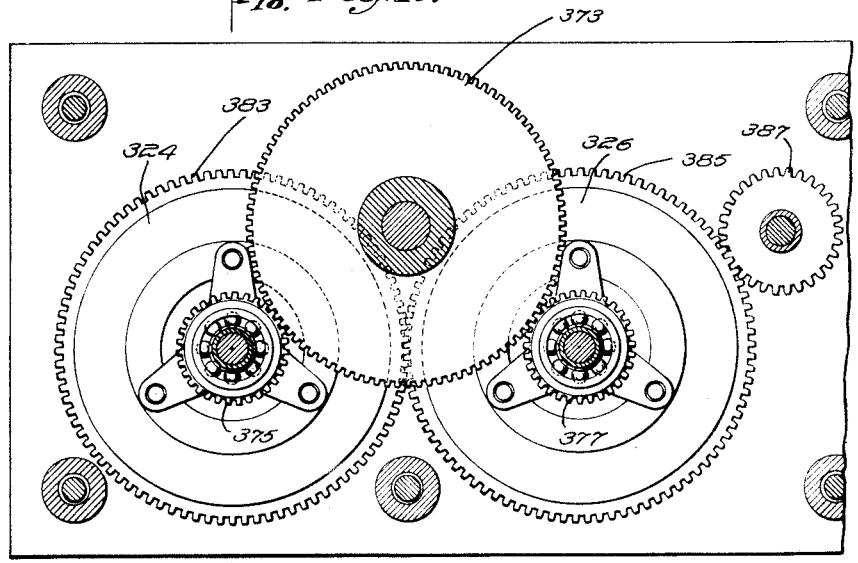
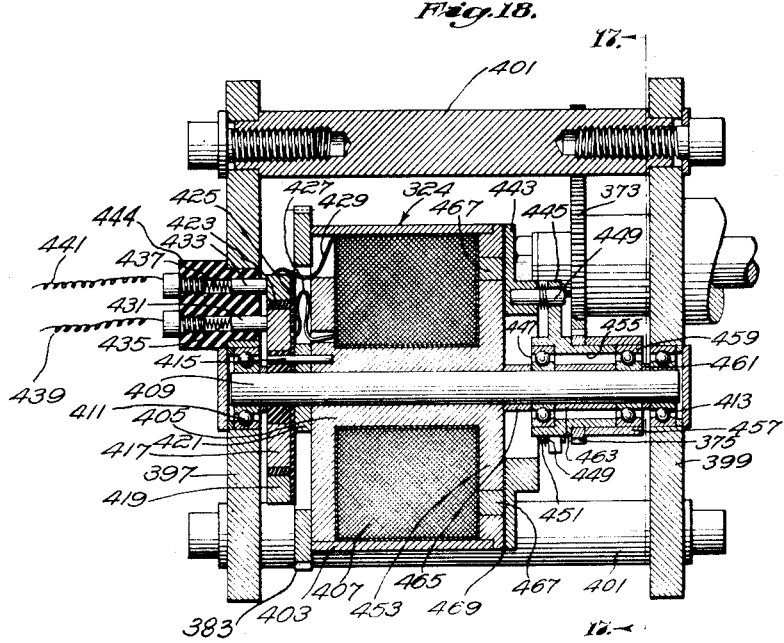
INVENTOR.
Paul J. Campbell
BY
H. Hume Mathews
Attorneys

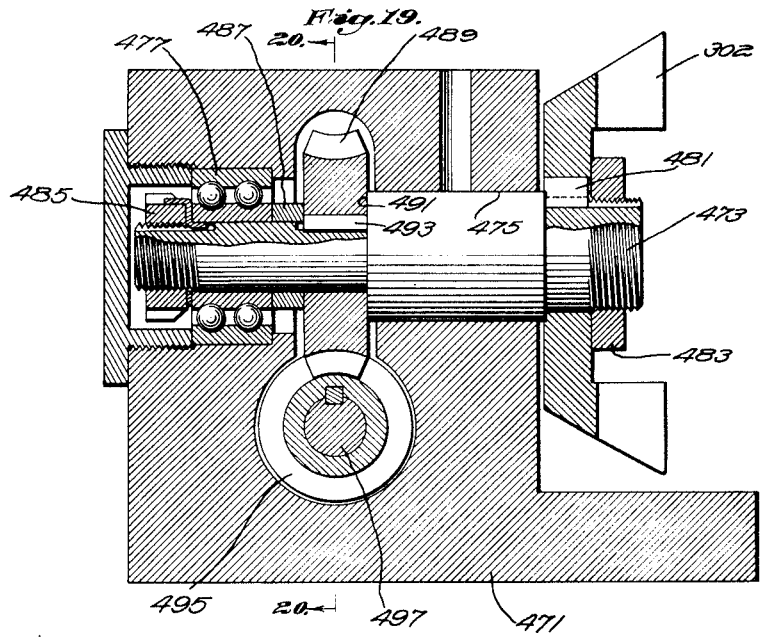
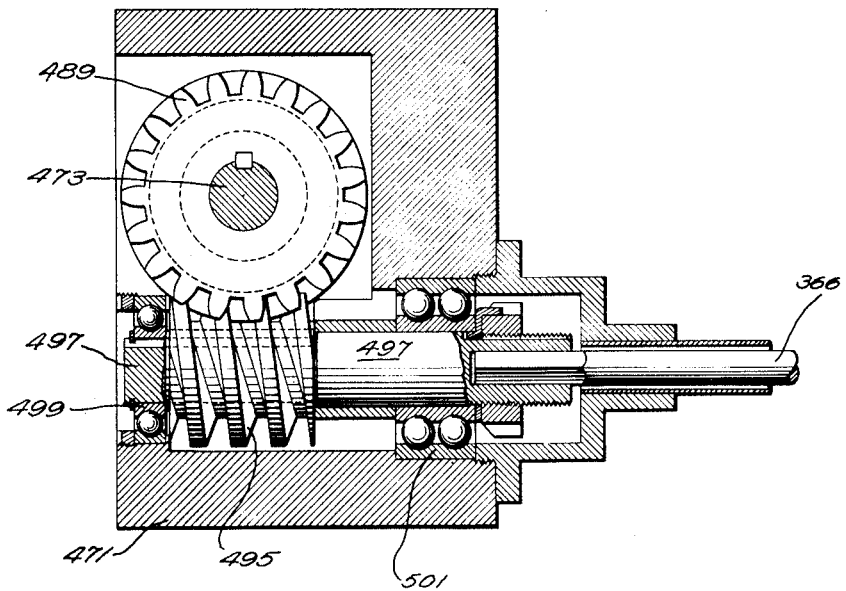

May 4, 1954  P. J. CAMPBELL  2,677,310
CONTOUR FORMING MACHINE, INCLUDING TRACER CONTROL MECHANISM
Filed Dec. 13, 1948  17 Sheets-Sheet 13
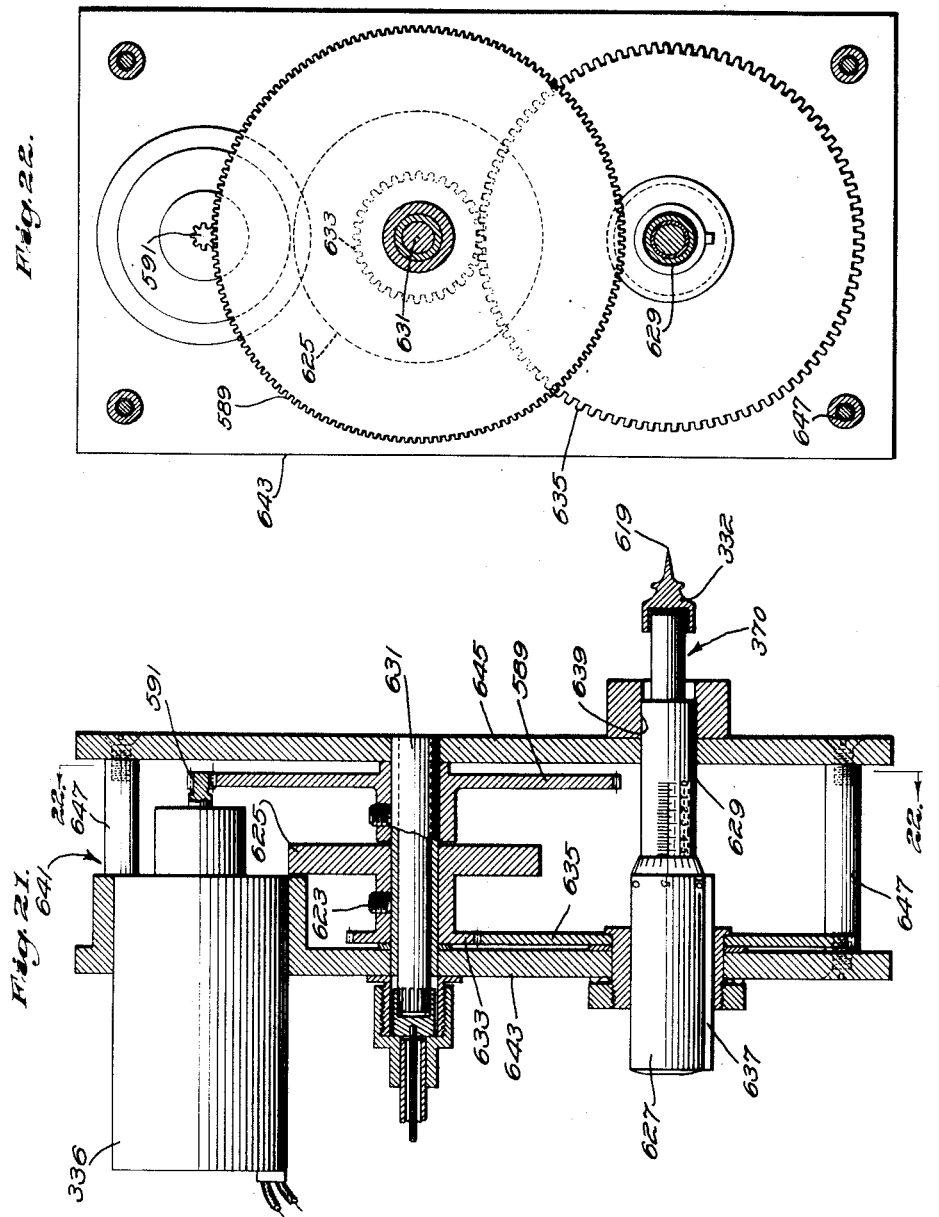
INVENTOR.
Paul J. Campbell
BY
H. Hume Mathews
Attorney May 4, 1954 P. J. CAMPBELL 2,677,310
CONTOUR FORMING MACHINE, INCLUDING TRACER CONTROL MECHANISM
Filed Dec. 13, 1948 17 Sheets-Sheet 14

INVENTOR.
Paul J. Campbell
BY
H. Hume Mathews
Attorney

May 4, 1954   P. J. CAMPBELL   2,677,310
CONTOUR FORMING MACHINE, INCLUDING TRACER CONTROL MECHANISM
Filed Dec. 13, 1948   17 Sheets-Sheet 15
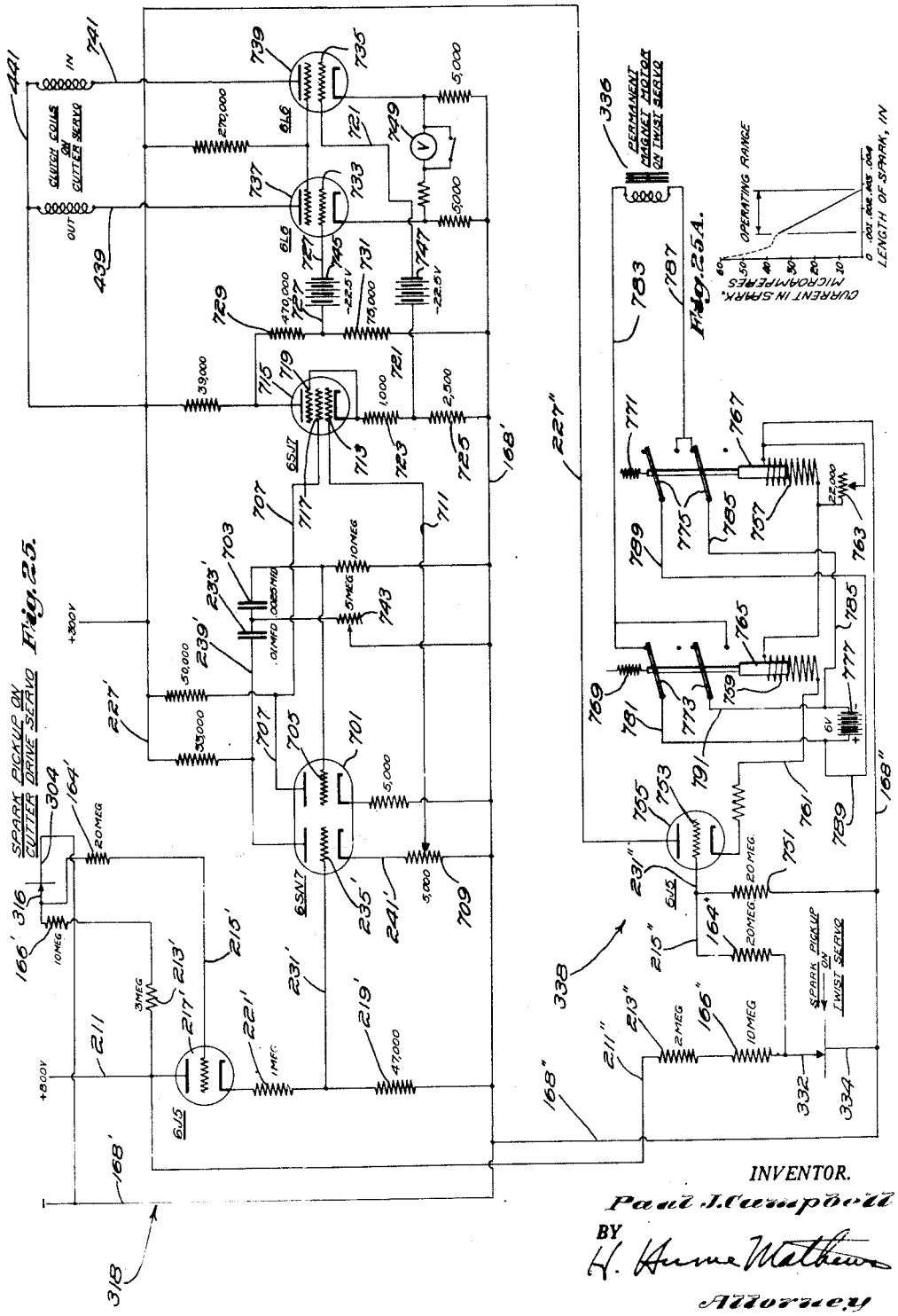
INVENTOR.
Paul J. Campbell
BY
H. Hume Mathews
Attorney May 4, 1954   P. J. CAMPBELL   2,677,310
CONTOUR FORMING MACHINE, INCLUDING TRACER CONTROL MECHANISM
Filed Dec. 13, 1948   17 Sheets-Sheet 16
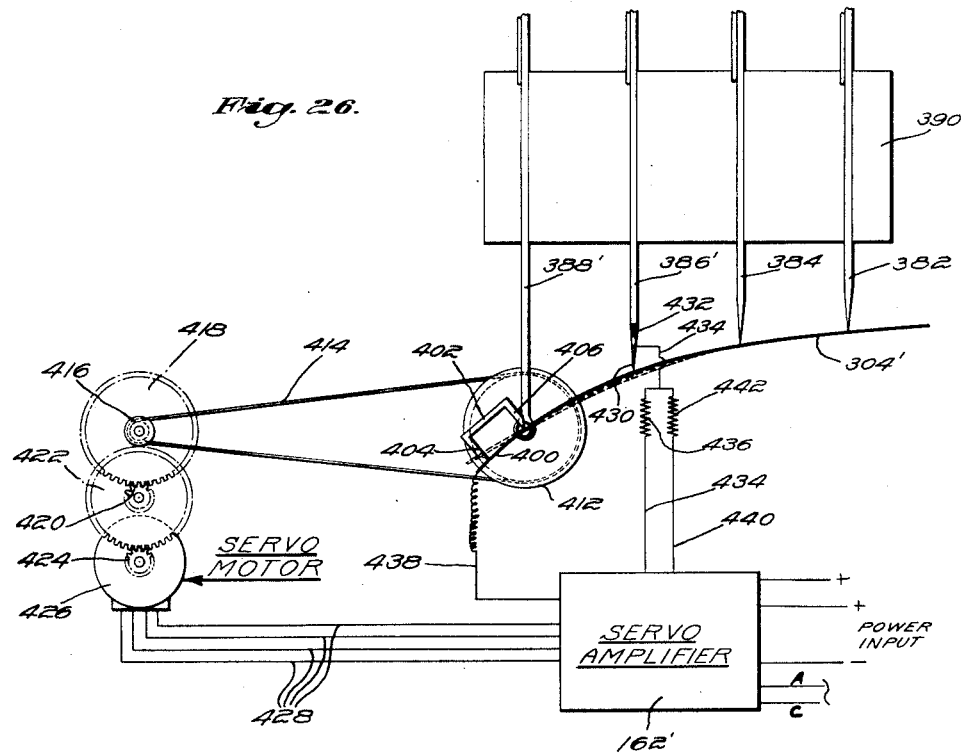
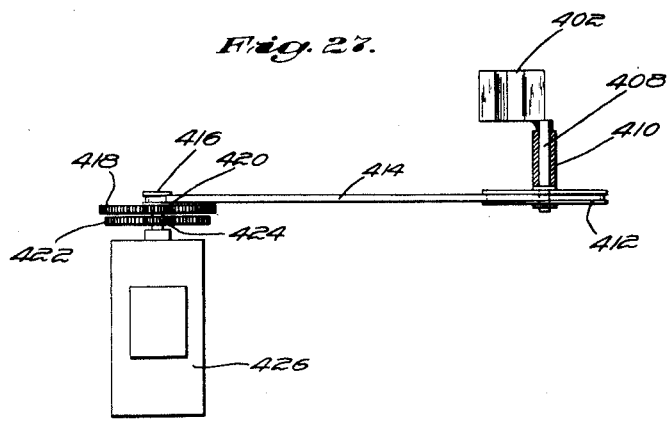
INVENTOR.
Paul J. Campbell
BY
H. Hume Mathews
Attorney

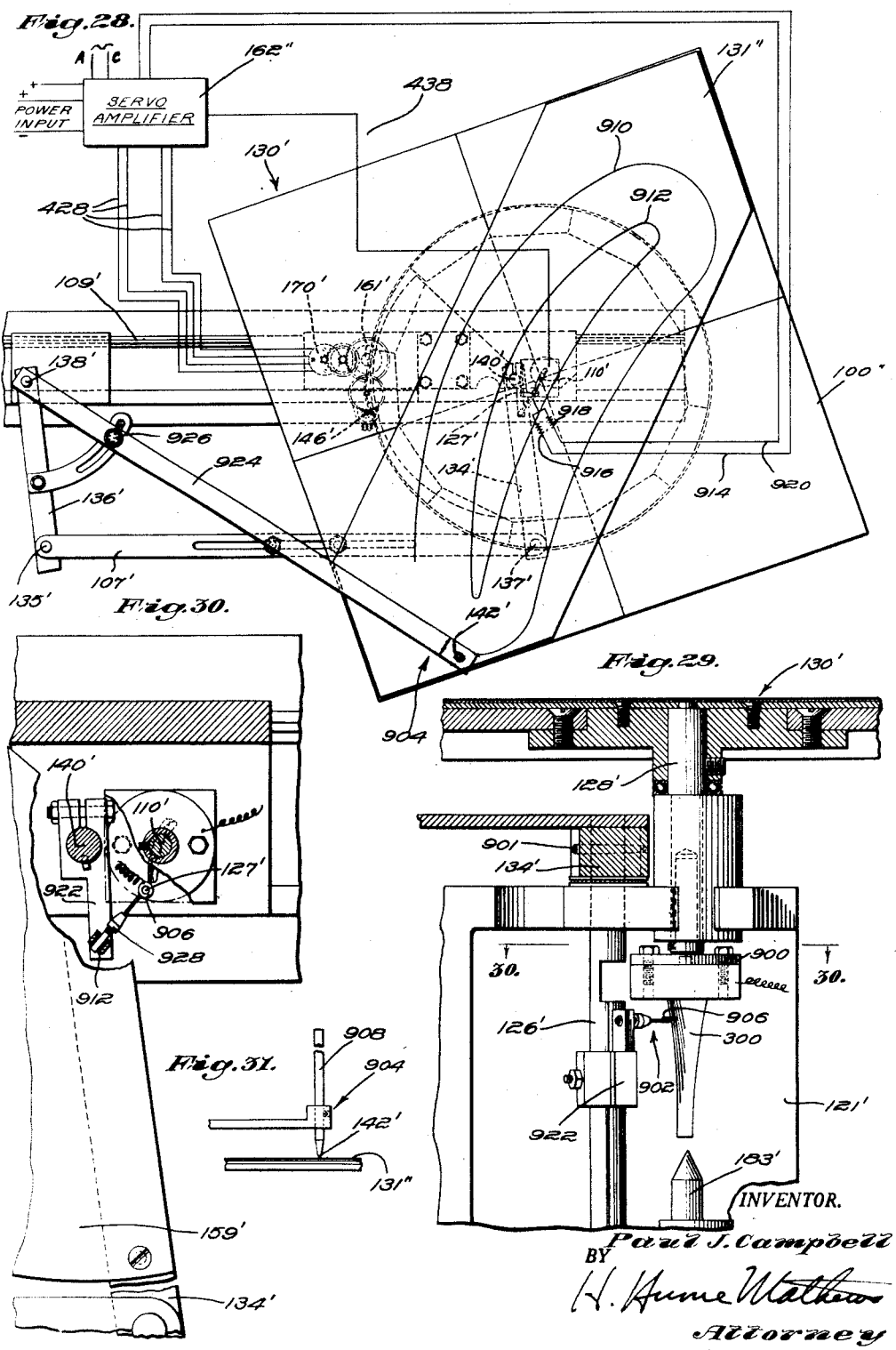

Patented May 4, 1954

2,677,310

UNITED STATES PATENT OFFICE 2,677,310

CONTOUR FORMING MACHINE, INCLUDING TRACER CONTROL MECHANISM

Paul J. Campbell, Middletown, Conn.

Application December 13, 1948, Serial No. 65,052

66 Claims. (Cl. 90—13.5)

The invention relates to a machine or apparatus for shaping or cutting a workpiece to provide it with one or more contours corresponding to the contour or contours of a pattern or template. Within the scope of the invention, the character of the pattern or template may be widely varied and it may have a contour or contours in only one plane or may have contours in different planes. The pattern may consist of one or more lines on a drawing. Also within the scope of the invention, the character of the workpiece may be widely varied and it may be a drawing with one or more contour lines produced thereon and corresponding to the contour or contours of the pattern or template.

As illustrated in the drawings and as hereinafter described, there are three separate machines each embodying the invention which machines are adapted for effecting successive operations in the making and inspecting of master blades for axial flow turbines and the like. The first machine is adapted for making a three-dimensional template having contours corresponding to some of the contours of the master blade to be made. In this machine the pattern comprises lines on a drawing corresponding in contours to the required contours on the template and the template constitutes the workpiece. The second machine is adapted for the cutting or contouring of a master blade with contours corresponding to those of the template. In this last said machine the template made by the first machine constitutes the pattern or template and the master blade constitutes the workpiece. The third machine is adapted for forming lines on a drawing corresponding to selected contours of the completed master blade made by the second machine, the said drawing serving for inspection purposes to determine the accuracy of the said contours of the master blade. In this last said machine the completed master blade constitutes the template and the drawing with the lines formed thereon constitutes the workpiece. While the invention is exemplified by the said three machines, it is not so limited and it may be embodied in machines intended and adapted for other uses.

One object of the invention is to provide a machine having a tracer for following the contour or contours of the pattern and for controlling the cutting or shaping piece in accordance with the said pattern contour or contours and having an electrically responsive control means for the tracer which enables it to closely follow the contour or contours of the pattern without contacting the said pattern.

Another object of the invention is to provide more broadly an electrically responsive tracer control means for use with a pattern and having the characteristics above set forth.

A further object of the invention is to provide an apparatus as last above outlined, wherein the electrically conductive template is or may be an electrically conductive line on a drawing.

A further object of the invention is to provide a machine and method for making an article such as a template for subsequent use in the making of master blades for axial flow turbines and compressors. The said blade template conforms at various positions to the contours of lines on a previously prepared drawing or drawings which lines represent cross sectional contours of the required master blades at selected spanwise spaced stations or positions. In accordance with this phase of the invention, the line or lines on the drawing or drawings are preferably electrically conductive and constitute an electrically conductive initial template which guides or controls the tool that forms the required contour or contours on the blade template.

A further object of the invention is to provide a machine having a template with different contours in spaced parallel planes and adapted to cut a workpiece with various contours some of which correspond to the said template contours and others of which correspond to contours interpolated between the said template contours.

Still another object of the invention is to provide a machine having a template with different contours in spaced parallel planes and also adapted to cut the contours on the workpiece in a relationship different from the relationship of the contours of the template.

Other objects of the invention will be apparent from the drawings and from the following description.

Referring to the drawings:

Figure 1 is a front elevational view of a pantograph constructed in accordance with the teaching of the invention. Certain portions of the frame to the right and left and of the table to the right have been broken off in order to facilitate its illustration in the drawing.

Figure 2 is a top view on a smaller scale of the table and associated parts shown in Figure 1.

Figure 3 is a cross-sectional view along the line 3—3 of Figure 2.

Figures 4 and 5 are front and side views respectively, of the tracer-head of Figure 3.

Figure 6 is a view along the lines 6—6 of Figure 1.

Figure 7 is a view along the line 7—7 of Figure 6.

Figure 8 is a side view, partly in section of the template arbor, the template cutter and associated mechanism of Figure 1 on an enlarged scale.

Figure 9 is a top view of the template, taken along the lines 9—9 of Figure 8.

Figure 10 is a diagrammatic view of the electrical circuit of the servo-mechanism and sensing or tracing means of Figures 1 to 9.

Figure 15 is a view along the line 15—15 of Figure 13.

Figure 16 is a view along the line of 16—16 of Figure 13.

Figure 17 is a front view of the magnetic clutch for the tool feeding mechanism shown in Figures 13 and 16.

Figure 18 is a view along the lines 18—18 of Figure 17.

Figure 19 is a sectional view of the tool or milling cutter of Figures 13 and 16.

Figure 20 is a view along the line 20—20 of Figure 19.

Figure 21 is a sectional view through a portion of the retwisting device or mechanism of Figure 13.

Figure 22 is a view along the line 22—22 of Figure 21.

Figure 25 is a diagrammatic view of the electrical circuit for the contouring device and the retwisting mechanism of Figures 13 to 24.

Figure 25A is a graph of spark length against spark current for the circuit and associated spark gap illustrated in Figure 25.

Figure 26 is schematic view of a modified form of a flexure shaping or contouring means.

Figure 27 is a front view of the bending device of Figure 26.

Figure 28 is a plan view of the inspection pantograph.

Figure 29 is a front view, partly in section, of the pantograph of Figure 28.

Figure 30 is a view, partly broken away, along the lines 30—30 of Figure 29.

Figure 31 is a front view of the recording pen of Figure 28.

Figure 11:
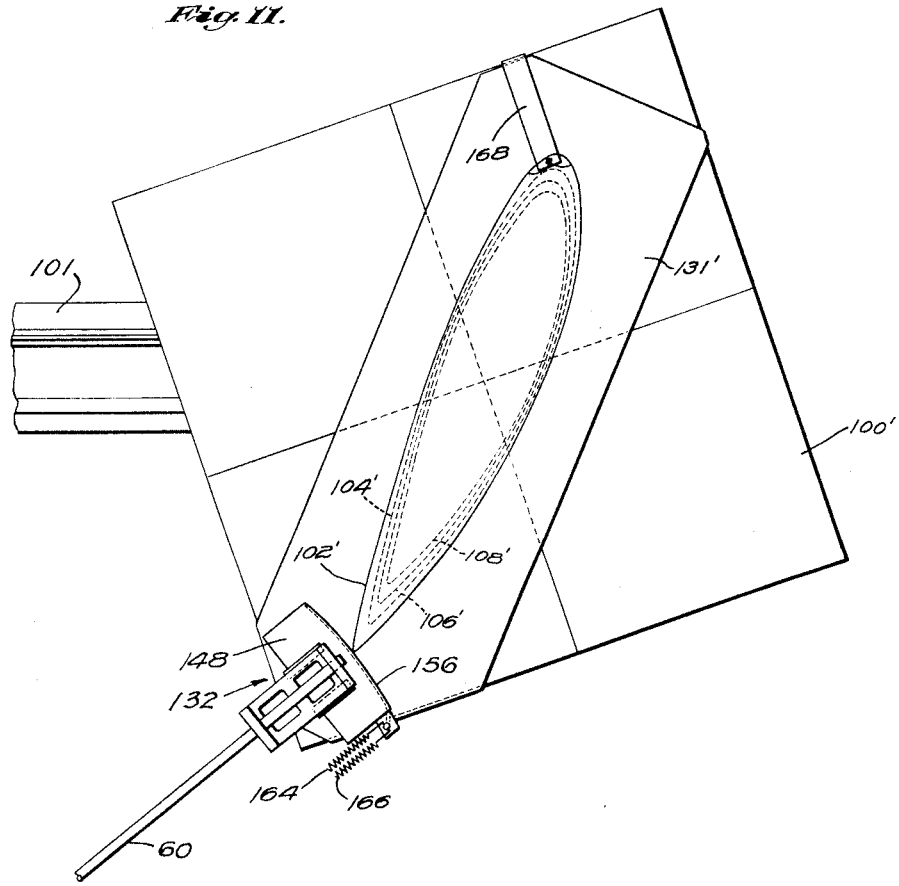
Figure 11 is top view of the table and sensing means or follower of Figures 1 to 9 with a modified drawing thereon showing how a twisted article such as a turbine blade may be "untwisted" with the pantograph of Figures 1 to 9 to form an untwisted template.

While the method and apparatus of this invention is not limited to the making of any particular article, the presently preferred embodiment of the invention shown in the accompanying drawings will, in the interest of brevity and clarity, be described below in connection with only one of its applications: the forming of master blades or working blades for axial flow compressors or turbines. Because the description must necessarily be lengthy in view of the complicated nature of the invention, it is divided into four main sections under headings: "General description," "The template making machine," "The contouring machine" and "The inspection machine."

*General description*

Heretofore in the making of blades for axial flow turbines and compressors it has been more or less conventional practice first to determine the preferred airfoil contour or cross-sectional shape of the blade, or the profile of a blade element, at each of a plurality of stations spaced spanwise or lengthwise of the blade. Large scale drawings are then made of such calculated or computed blade elements and from the drawings a master craftsman or pattern maker carves, largely by hand, a master blade which has the profile shown by the drawing at each of the selected stations and which is faired or contoured spanwise, again by hand and eye, between said computed blade elements to form a gradually curved, smoothly surfaced complete master blade. The master blade so formed may then be used as a pattern, die or model from which working blades, or the actual blades with which the turbine or compressor is constructed, may be cast, forged or machined. Because the master blade must be made with extreme accuracy to very close tolerances and because it is usually made of steel or a hard metal for accuracy, smooth surface finish and durability, the work of making such a model must be done by a skilled craftsman at a high cost per master blade. This is particularly true where the blade is of the usual type having a progressively varying blade angle from root to tip (twisted, like an aircraft propeller) which considerably complicates the work of fairing or contouring the surfaces between the computed profiles. Furthermore, this hand process is a very time consuming one, which becomes a factor of great importance when a turbo-jet or similar engine with an axial flow compressor is being made, because such engines ordinarily require a large number of rows of blades and a correspondingly high number of master blades.

According to the present invention the first step in making a master blade may be the same as in the prior art method described above, i. e., the cross-sectional blade profiles are calculated or computed at a plurality of selected spanwise spaced stations and then are drawn, usually upon an enlarged scale such as 20:1. Such a drawing, made in the usual manner upon a large square thin flat steel sheet, is shown at 100 in Figures 1 and 2. It comprises a series of closed curves 102, 104, 106, and 108 representing the projections upon the plane of the drawing of the computed profiles of four selected blade elements. A greater or less number of computed blade elements, and drawing curves, may be used as described. The plane of the drawing in this instance is taken as a plane normal to a spanwise axis of the blade (this axis is represented in the drawing by the point 110) which is a radius or straight line intersecting the axis of rotation of the compressor or turbine at right angles thereto and passing through the center of gravity of each of the four blade elements represented by the curves 102, 104, 106 and 108 and at right angles thereto. The drawing could, of course, be made in a different way or of a differently designated blade. But it is important for satisfactory results that a sufficient number of blade elements be computed, and at locations so selected, as to define the general or overall form and dimensions of the blade. The computed blade elements are preferably taken at stations or positions spanwise of the blade so relatively spaced that there is no unduly abrupt change of curvature in the blade surface from one blade element to the succeeding one in a lengthwise or spanwise direction.

The next main step involves the making of a master template, use being made of the machine shown in Figs. 1 to 10. Certain features of the said machine are not herein specifically claimed, being set forth and claimed in my divisional application, Serial No. 288,287, filed May 16, 1952, and entitled "Machine for Forming Contours."

A master template 112 made by the said machine and the said template is best shown in Figs. 8 and 9. This master template is preferably cut from a metal blank, such as brass or babbitt, and it represents to extreme accuracy both as to size and relative position the blade elements illustrated respectively by the four curves on drawing 100. Thus, the master template 112 has four machined profiles or blade elements 114, 116, 118 and 120 which correspond exactly both in shape and angular position to the four drawing curves 102, 104, 106 and 108. However, though the drawing curves may be twenty times actual size, the corresponding template blade elements are preferably either actual size or actual size plus a constant thickness envelope; and while the drawing curves lie all in a single plane the corresponding template blade elements are separated spanwise so as to exactly correspond in relative position or location to the relative positions of the corresponding computed blade elements from which the drawing curves were projected. The master template, therefore, may be likened to a blade composed only of those sections or elements which were computed and shown on the drawing; the remainder of the blade material being relieved or cut away as shown at 122.

The four blade elements of the master template are machined one at a time on the pantograph of Figures 1 to 10 by successively using the four curves of the drawing as a reference and successively cutting the respective blade elements of the template, with the cutter 124 being shifted axially on its shaft 126 to a position corresponding to the correct axial or spanwise position of the blade element being cut, before each cut is begun. The template blank is mounted on an arbor formed by an extension of the rotatable shaft 128 which carries the pantograph table 130. Drawing 100 is so fixed to the top of table 130 that the point 110 coincides with the axis of rotation of shaft 128; the axis of rotation of the table and of the template blank is therefore coincident or coaxial with the spanwise blade axis represented by point 110, and as the table and the drawing thereon rotate, the template blank rotates also in fixed relationship thereto.

Movements of the cutter 124 are controlled by a follower or tracer head 132 mounted on one arm 136 of a parallelogram linkage comprising arms 134 and 136, link 107, and the bed 109. As table 130 rotates, the tracer is caused to follow a selected one of the four curves of the drawing, and this causes the arm 136 to move about its pivot 138 and the other parallel arm 134 to be moved similarly about the pivot 140. Because the distance from pivot 140 to the center of cutter 124 is much less than the distance from pivot 138 to the point 142 (where the tracer arm is pivoted to parallel arm 136) the movements of the cutter will be much less than those of the tracer. Preferably, where the drawing is to a 20:1 scale these distances are selected so that the cutter movements are in a ratio to the tracer head movements of 1:20, whereby the cutter may cut a template of actual size while the tracer follows a drawing twenty times actual size.

In order to cause the cutter to exactly duplicate (at a reduced scale) the motion of the tracer, the linkages are designed so that for all possible positions the triangle formed by table center 110, pivot 140 and cutter center 127 is geometrically similar to the triangle formed by table center 110, pivot 138 and tracer center 142. This may be done: (a) by placing pivots 138 and 140 and table center 110 in line, (b) by making the distance between pivot 140 and table center 110 equal to the distance between pivot 140 and cutter center 127, (c) by making the distance between pivot 138 and table center 110 equal to the distance between pivot 138 and tracer center 142, and (d) by making the distance between pivots 138 and 140 equal to the distance between pivots 135 and 137.

The ratio of template size to drawing size will be equal to the ratio between the distance from the table center 110 to the pivot 140 and the distance from the table center 110 to the pivot 138.

If it is desired to cut a template of the actual computed size and shape, the ratio of the radius of the cutter to the radius of the tracer arm (the distance between the pivot 142 and the point where the follower contacts the drawing curve) is made equal to the desired ratio of template to drawing size. However, it is often desirable to make a template with a constant thickness envelope surrounding the actual or computed blade profile. This may be done simply by reducing the cutter radius by an amount equal to the desired thickness of the envelope.

Because all four curves of the drawing are in the same plane on the steel sheet 100, it is necessary to separate them in some way or to select respective curves during the process of cutting the respective blade elements of the template. This is done by laying a thin transparent sheet 131 of electrical insulating material such as cellulose acetate over the steel drawing 100 and securing it thereto with pressure sensitive tape, just like ordinary tracing paper. A selected one of the curves (curve 102 in Figure 2) is then traced onto the insulating sheet with an electrically conductive ink, which may be a mixture of finely divided silver and a binder in a volatile organic liquid. When the ink dries a single one of the four curves on the drawing is exactly reproduced on top of the insulating sheet in an electrically continuous conductive line drawing 144. The other three curves are, of course, then electrically separated from the conductive line drawing by the insulating sheet 131.

The cutter having been adjusted to that position axially of its shaft corresponding to the spanwise position of the blade element represented by the particular drawing curve traced out as a conductive line drawing on top of the insulating sheet, the template cutting process is begun by slowly rotating table 130 with the table drive motor 146, driving cutter 124 by cutter drive motor 172, and following the conductive line drawing 144 with the tracer 132 as the table is rotated. The tracer could be manipulated by hand so as to follow the conductive line. However, in the interest of accuracy, it is best to use the automatically controlled electrical sensing device 148 illustrated in Figures 2 to 5. This device comprises an arc-shaped electrode formed by a conductive line 156 drawn about the tracer center 142 on the edge of a thin sheet of polystyrene 150, which is cemented along the edge opposite the conductive edge to a thin slightly arched sheet 152 of spring steel. An insulating strip 154 is interposed between the conductive edge of the polystyrene sheet 156 and the steel sheet 152. The whole assembly or sandwich is carried by the tracer head 158 mounted on the tracer arm 160, the whole constituting the tracer 132. When this tracer is laid on top of the insulating sheet 131 the arched sandwich flattens against the insulating sheet and causes the conductive edge 156 to bear against the sheet over its entire length, regardless of minor irregularities in the smoothness of the surface of the sheet 131.

The high side of an electrical servo circuit 162 (see Figure 10) is connected to the conductive edge 156 of the tracer through two resistors 164, 166 and the low side of the circuit is grounded to the inside of the conductive line drawing by a conductive strip 168 which extends under the insulating sheet 131 and which is electrically connected at one end through a hole in the insulating sheet to the conductive line drawing. This connection is made on the inside of the conductive line, so that the outside thereof will be electrically continuous and free of barriers or discontinuities. The other end of the conductive strip is connected to the low side, or ground, of the circuit 162.

During the cutting process the circuit 162 continuously maintains relatively high direct current potential across the gap between the conductive edge 156 and the conductive line drawing, as shown in Figure 2. This potential, which for example may be of the order of approximately 800 volts (open circuit voltage), is sufficient to cause a spark to jump between the conductive edge and the conductive line whenever they approach to within a predetermined distance. This distance, for a potential of the order of 800 volts, is about .003".

Tracer 132 is moved toward or away from the conductive line drawing (counterclockwise or clockwise respectively about pivot 138 as viewed in Figure 2) by the tracer drive motor 170. This motor is controlled by the circuit 162, which in turn is responsive to variations in the electrical characteristics of the spark between the conductive edge and the conductive line which result from variations in the length thereof. The arrangement is such that if the spark shortens below a predetermined length the circuit will cause motor 170 to move the conductive edge away from the conductive line until the spark is increased to its proper length. A reverse action takes place as the spark lengthens above its predetermined length. The circuit is so designed that the corrective action of motor 170 depends not only on the deviation of the spark length from its selected value, but also upon the rate of change of spark length. This provides stability of operation, or prevents hunting, and enables circuit 162 and motor 170 to act to maintain the length of the spark between the conductive edge and the conductive line at a substantially constant predetermined value. Consequently, as the table 130 turns the tracer follows the conductive line automatically at a predetermined very short constant distance therefrom (a distance equal to the length of the spark) and thereby causes the cutter 124 on the parallel arm to describe a like path, though on a smaller scale of movement.

The result is that the cutter, which is rotated by the cutter drive motor 172 independently of the movements of the cutter and the parallel arm 134 about the pivot 140, machines a profile or blade element 114 on the template blank which exactly corresponds in shape to the conductive line drawing 144 and the drawing curve 102 of which it is a tracing but which may be of actual size or actual size plus a uniform thickness envelope.

When the blade element 114 is completed the insulating sheet 131 is removed and a new one substituted therefor on the steel drawing 100, the next curve 104 is traced thereon with conductive ink to form a conductive line drawing as before, except that it is of the curve 104 rather than the curve 102. Cutter 124 is moved upwardly on its shaft to the spanwise position of the blade element corresponding to curve 104, and the blade element 116 is machined on the template blank in the manner just described for blade element 114. The remaining blade elements 118, 120 are also machined on the template blank in a like manner, successively using the curves 106, 108 to make the conductive line drawings.

When completed, template 112 has on it four blade elements which correspond exactly in size, shape and location both angularly and axially to the actual computed blade elements desired at such selected locations in the master blade. However the template itself is an accurate representation of the desired master blade only for such computed blade elements; at other locations the material of the template is merely cut away so as not to obstruct or interfere with the portions thereof which represent the computed blade elements.

Figure 12:
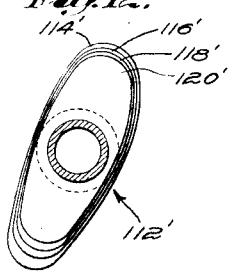
Figure 12 is a top view of an untwisted template made according to the teaching of Figure 11.

If desired any or all of the blade elements of the template may be made with an envelope of extra material around the periphery thereof, by using a smaller cutter, as referred to above. Another variation of particular usefulness may be provided where a blade of high twist or rapidly changing blade angle is to be made, this requiring a somewhat different template 112' as shown in Fig. 12. For cutting the template 112' the pantograph machine is the same as that of Figures 1 to 10, and the process of cutting the computed blade elements on the template is generally the same, but is somewhat different as shown in Fig. 11. The difference is that the blade is "untwisted"; i. e. the various curves 102, 104, 106, 108 are placed on the drawing 100 with their chords parallel, as if the blade were of constant blade angle from root to tip. A similar result could also be accomplished by using the drawing 100 as in Figure 2, but angularly displacing the insulating sheets so that the chord lines of each successive conductive line drawing are all parallel with chord line of the first curve 102. Whichever the method used, it will be seen that the result is to provide a template 112' as shown in Figure 12 which represents in its four machined blade elements the exact shape, size and spanwise or axial location of the blade elements desired in the master at such four points, except that the template blade elements are not in the correct angular positions, being aligned rather than twisted and having their chords lying in parallel planes. As will be shown later, this untwisted template 112' of Figure 12 may be used as a model or guide from which a correctly twisted master blade can be made with exceptional accuracy.

The master templates 112 and 112' can in a sense be considered as partial master blades: they are at four positions just as the complete master is intended to be; i. e., those positions where the computed blade elements are machined on the template. This, of course, is subject to the qualification that the template is usually of brass or babbitt and the master blade of a tough alloy steel; the template blade elements are usually machined of actual size plus a constant envelope while the master blade may be either of actual size or of actual size plus the same envelope as provided on the template blade elements or with a different thickness envelope; and in the case of the template 112' the template blade elements are formed in alignment, or untwisted, while the blade elements of the master blade are twisted, or retwisted, to their proper angular positions. Also, the template blade elements have a certain thickness to impart sufficient rigidity thereto (of the order of ⅛" is usually sufficient) while the blade elements of the master blade, in theory at least, have no thickness and in some instances one or more of the template blade elements may not be reproduced on the master blade; the master blade in such cases represents only a portion or section of the template.

A contouring machine embodying the invention is adapted for shaping or cutting a workpiece to produce thereon a contour or contours corresponding to the contour or contours of a template or pattern. When the article to be formed is a turbine blade 300, as best shown in Fig. 29, the machine may advantageously be constructed as shown in Figs. 13 to 25. For forming a turbine blade the template is preferably of the type previously described, a template such as 112 being used for a blade having a small twist and a template such as 112' being used for a blade having a larger twist. The template 112 or 112' is used as a guide, pattern or model for guiding or controlling the relative movements of a cutting tool 302 and a work piece 300' so that the work piece is formed by the tool into a completed master blade 300. Because the master blade has a continuous surface or an infinite number of side by side blade elements, while the template has only four such elements, it is necessary to provide some means for guiding the cutting tool at the intermediate positions corresponding to the cut-away spaces or relieved portions on the template between the four blade elements thereof.

Figure 13:
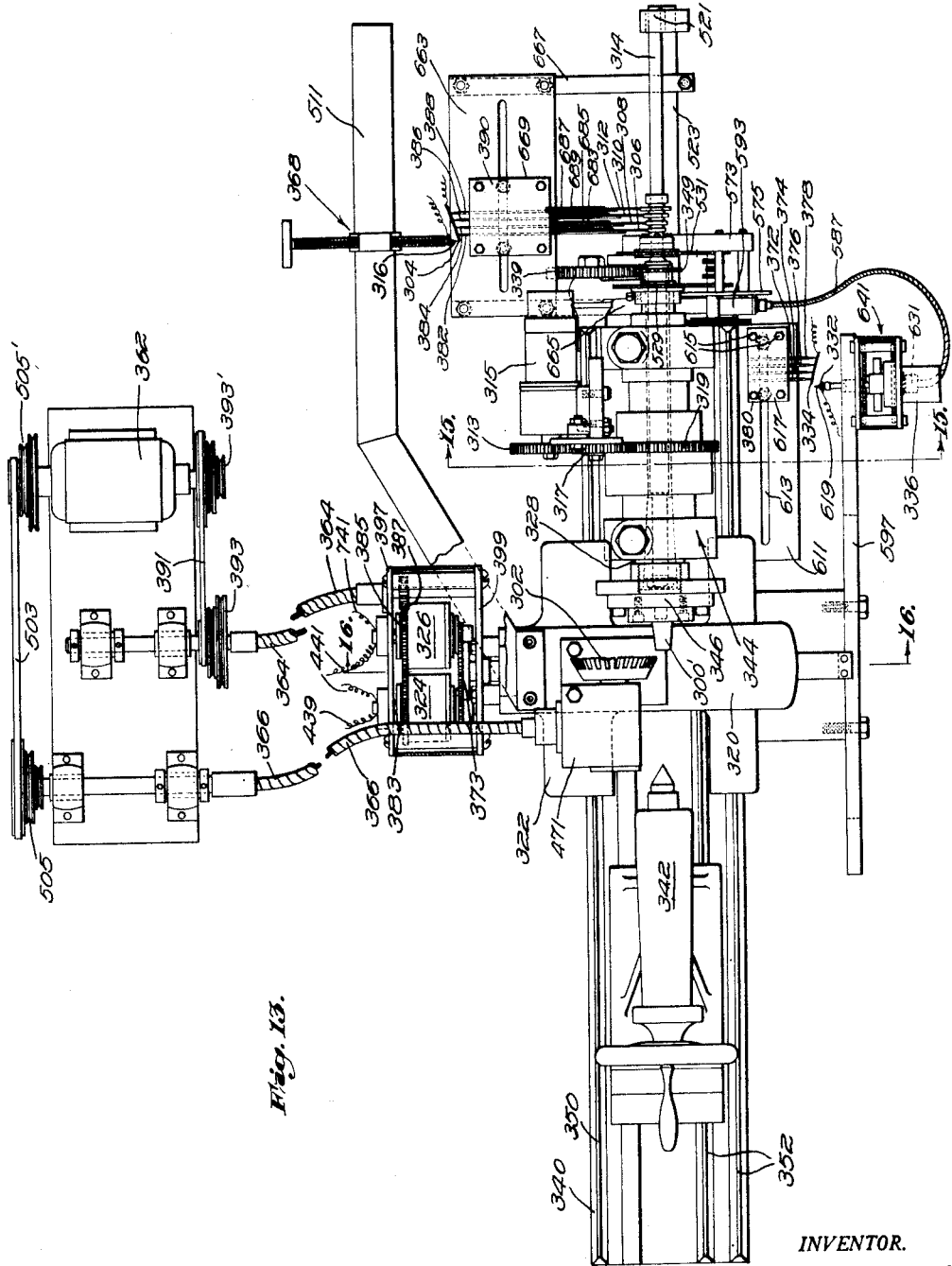
Figure 13 is a top view of a contouring machine for forming a complete or finished article from a partial template such as shown in Figures 1 to 9. In the form shown, the machine of Figure 13 also has a retwisting device or mechanism thereon for forming complete or finished twisted articles, such as turbine blades, from untwisted templates such as shown in Figure 12.
Figure 14:
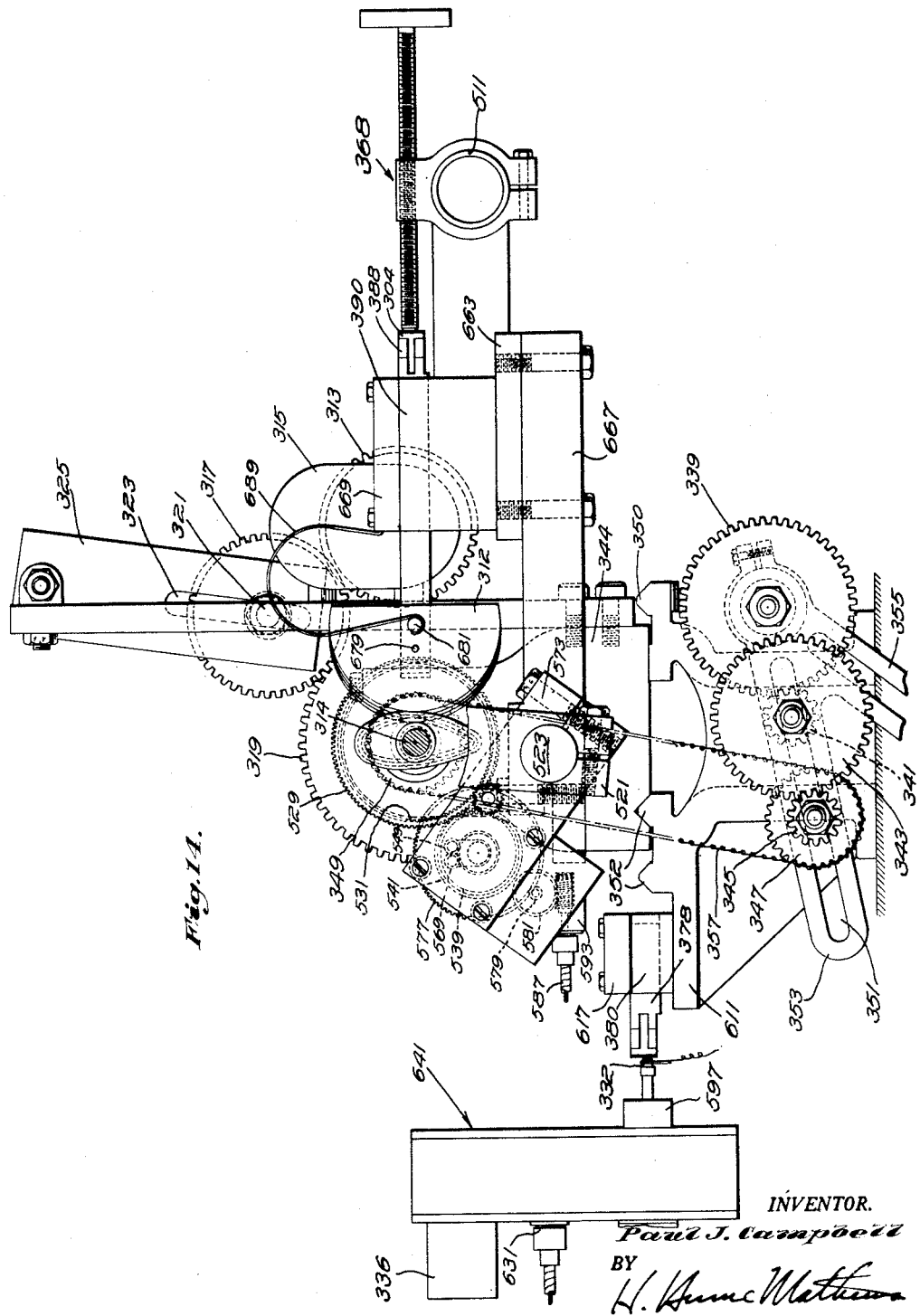
Figure 14 is an end view of the machine shown in Figure 13.
Figures 23, 24:
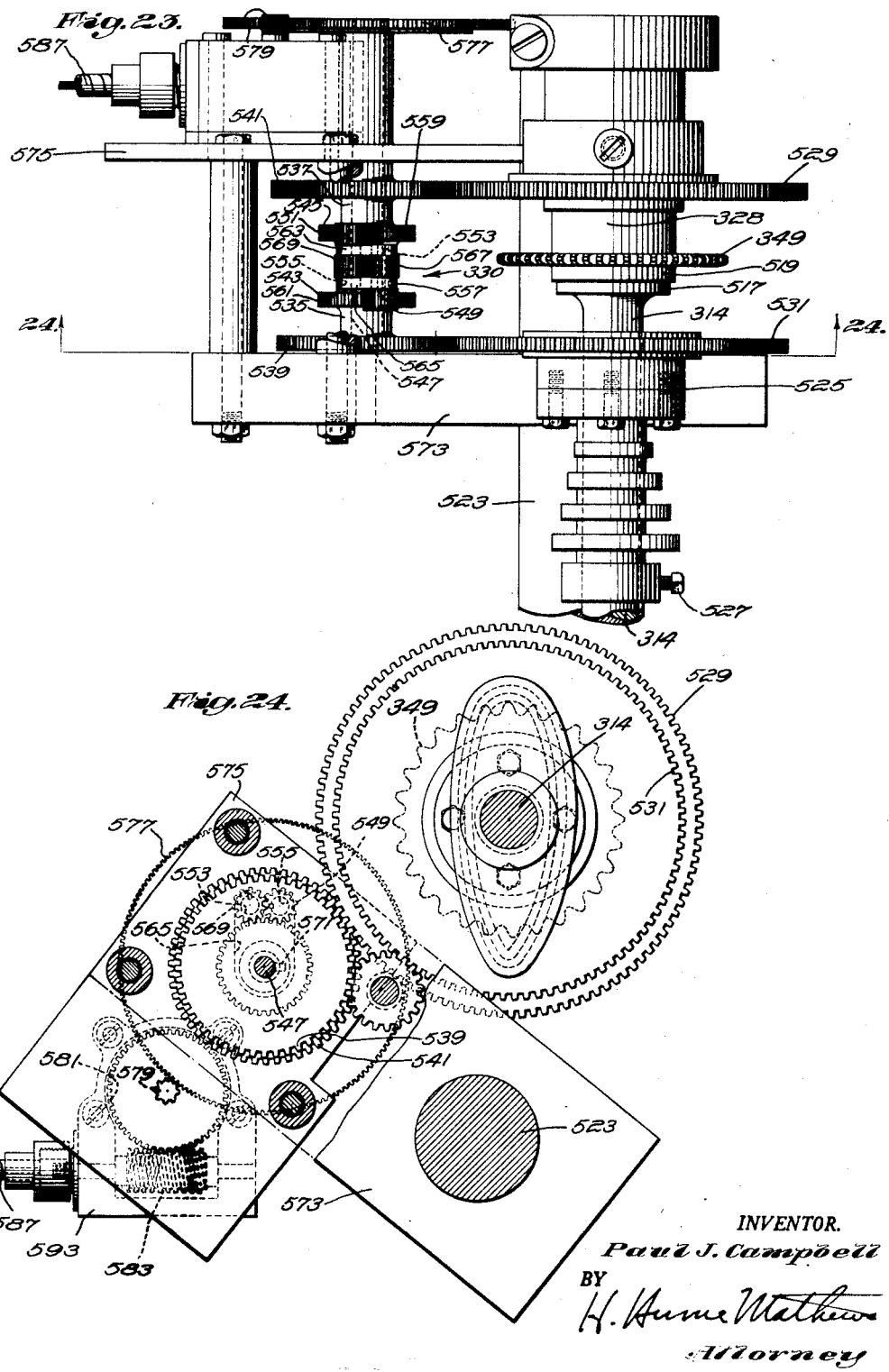
Figure 23 is a top view of the differential which is operated by the retwisting mechanism.
Figure 24 is a view along the line 24—24 of Figure 23.

The guiding means comprises a control member or flexure 304 which is so arranged as to provide an automatic interpolation of those unknown portions or surfaces of the template lying between the computed blade elements thereof. As shown in Figures 13 and 14, the flexure is held, preferably by magnetic attraction on the knife edges of a series of four magnetic slider strips which are respectively attached to circular followers 306, 308, 310 and 312. The sliders and the followers are biased to hold the said followers against the respective blade element of the template 112 or 112' mounted on a rotatable template shaft 314. The followers are all of the same radius, this radius being the same as or related to the radius of the cutting tool.

The sliders are all mounted for reciprocation in parallel planes normal to the longitudinal or spanwise axis of the template. Each slider has at its outer end a pair of magnetized legs which terminate in a knife edge lying in a line extending perpendicularly to the direction of reciprocation of the follower centers and to the template axis. The four lines representing the knife edges of all the sliders lie at equal distances from their respective follower centers.

Inasmuch as the followers are always in contact with the respective blade elements of the template, regardless of the angular position of the template, the knife edges will be positioned at varying distances from the longitudinal axis of the template, and these distances will depend both on the radial distance from the template axis to the point of contact between the template blade element and the follower and on the distance from the point of contact to the line of the path of reciprocation of the follower center.

The control element or flexure 304 is preferably a thin flat elastic strip of magnetic metal such as spring steel, this being placed on the knife edges of the sliders and being held thereon by magnetic attraction. The said flexure will automatically bend to form a smooth curve through the knife edges of the four sliders. Since the sliders are all equal in length (from follower center to knife edge) the curve thus formed by the flexure represents a like curve through the follower centers, but displaced outwardly therefrom.

If the template is untwisted, or has a relatively low twist, the curve thus established may be considered to define the locations of the centers of an infinite number of imaginary followers for an infinite number of corresponding imaginary template blade elements of proper shape and orientation lying between the computed template blade elements. Furthermore, the flexure will so function, when such a template is used, at each angular position of the template; if the template is rotated the flexure will continuously change shape and position to successively form all the infinite number of curves representing for each of the infinite number of successive angular positions of the template the relative positions of the actual follower centers and the interpolated positions of the imaginary follower centers for imaginary blade elements which would define a complete blade of proper contour but of the same degree of twist as the template. But this is true only in the case of an untwisted template, or a template of low twist.

If the master blade being formed (and therefore the template) has a high amount of twist, or a relatively large angular displacement between blade elements, then the two dimensional curve of the flexure will not correctly define or locate the interpolated positions of imaginary follower centers for imaginary intermediate blade elements of proper shape and orientation. This is because at some angular positions of the template the large twist of the blade surface causes the points of contact between the followers and the template blade elements to lie along a curved line extending either wholly or partly crosswise or askew with respect to the direction of the template longitudinal axis, so that the resulting positions of the follower centers reflect not only the contour or curve of the blade surface in an axial or longitudinal direction but also its contour or curve in an angular or transverse direction. With a twisted template the follower centers will be displaced in their path of reciprocation according to two components of surface contour: a linear or spanwise component determined by the variations in the size and shape of the blade elements in an axial or longitudinal direction, and an angular component determined by the twist or varying orientations of the blade elements. With a template of high twist or large differences in orientation of successive blade elements this latter cross-sweeping component becomes unduly large and the flexure curve required to define the locus of all the imaginary follower centers for such a blade is no longer a smooth curve through the knife edges. But the flexure because of its inherent characteristics can assume only a smooth curve through the knife edges. Therefore, the flexure will not correctly interpolate the imaginary follower center positions for the intermediate imaginary blade elements of a properly faired or contoured blade when the template blade elements have a relatively high twist.

However, this difficulty may be overcome by untwisting the templates for blades of high twist as described previously, thereby providing a template 112' of no twist or only a relatively small twist, and then by means of the retwisting mechanism described below forming a properly twisted complete master blade although following the untwisted template as a guide or pattern.

Regardless of whether or not an untwisted template is used, means are provided for relatively moving the tool 302 and the work piece 300' and for guiding such movement by the control element or flexure 304, the shape and position of which is determined by the sliders in the manner described above. The said control element or flexure constitutes a pattern of continually changing position and contour.

In the machine of Figures 13 to 25 the milling cutter 302 is moved bodily while the workpiece 300' merely rotates, but it will be obvious to those skilled in the art that other arrangements may be used. For instance a milling machine arrangement may be provided where the workpiece is moved bodily and the cutter merely rotates.

A tracer means 368 is provided for following the pattern or flexure 304 and this may be somewhat similar to that described above in connection with the template making machine shown in Figures 1 to 10. The tracer means 368 includes an electrode 316 which directly follows the pattern, and the said electrode is shown as having a sharp edge or point.

An electrically responsive control system is provided for the tracer means 368 and for the tool 302 which is generally similar to that of the template making machine as shown in Fig. 10, but which nevertheless differs in many details.

The electrode 316 of the tracer means 368 is moved longitudinally along the surface of the pattern or flexure 304 and as it is so moved the controlling circuit 318 (top Figure 25) causes it to move in or out, transversely with respect to its longitudinal movement, to maintain a substantially constant length spark gap between the electrode and the surface of the flexure. If the spark lengthens beyond a predetermined length the electrode is moved inwardly until the gap is shortened to its proper length. The reverse action occurs if the spark shortens below its selected length. Thus the electrode point 316, though never actually touching the flexure and consequently exerting no deflecting or distorting force thereon, will exactly follow its shape or contour as the electrode is moved longitudinally.

The electrode 316 is mounted for transverse movement with the tool 302, both the tool post which carries the tool and the tracer head which carries the electrode being mounted on a cross-slide 320 on a carriage 322. The carriage is movable longitudinally on ways and it is this movement of the carriage which causes the electrode 316 to move longitudinally along the surface of the pattern or flexure and the tool to be moved longitudinally along the work. The carriage movements are caused and controlled in the usual way by a lead screw mechanism. Transverse movements of the electrode 316 are caused by controlling the relative energization of electromagnetic clutches 324, 326, which move cross-slide 320 and consequently electrode 316 and tool 302 attached thereto. These transverse movements are controlled automatically by the circuit 318 in response to signals from the spark between the electrode and the flexure, so that the electrode and consequently the cross-slide and the tool 302 mounted thereon follow the contour of the flexure as the carriage moves longitudinally.

It will be seen that with this arrangement, if the carriage is slowly fed longitudinally along the work while the work and the template are simultaneously rotated in fixed angular relationship, and if the tool (for instance a milling cutter) is of the same diameter as the followers which bear against the template blade elements, then the work will be machined to a form determined both by the size, shape and location of the blade elements on the template and by the interpolation between said blade elements provided by flexure 304.

The pattern or flexure 304 has its contour or contours extending in a longitudinal plane and relative longitudinal movement is effected between the tracer means and the said pattern. Similar relative longitudinal movement is effected between the cutting tool 302 and the workpiece 300', and as the result of such relative longitudinal movement the tool cuts contours on the workpiece which extend in longitudinal planes. In order to provide conformity between the workpiece contours and the pattern contours, the shape of the tracer must correspond with the shape of the cutting tool. As shown, the tool 302 is shaped in a longitudinal plane, so that it has point contact with the workpiece 300'. When the tool 302 is so shaped the tracer electrode 316 is shaped, in the said longitudinal plane, so that it has point contact with the pattern or flexure 304.

If the template blade elements are provided with an envelope, as referred to above, this envelope may be omitted or decreased, as desired, in the complete master blade by increasing the cutter radius relative to the radius of the followers by an amount equal to the thickness of the envelope or the portion thereof which is to be omitted.

Means are preferably provided for varying the distance between the cutter center and the axis of rotation of the workpiece relative to the distance between the follower centers and the axis of rotation of the template, thereby enabling roughing cuts to be made. The finish cut should, of course, be made with these two distances equal.

Such a means is provided in the machine of Figures 13 to 25 by mounting the tracer electrode 316 on a screw in the tracer head to provide for transverse adjustments therebetween.

If the template used has no twist or if it is of the twisted type (see 112 in Figures 8 and 9) and has a relatively small twist, then a complete blade can be formed in the contouring machine in the manner described above, with the template and the workpiece being rotated together in a fixed angular relationship. But if the template used is untwisted (see 112' in Figures 11 and 12), then a retwisting means must be incorporated in the contouring machine in order to form a complete blade of proper twisted shape from the untwisted template.

The specific mechanism for retwisting is described specifically elsewhere herein. In general, it operates as follows: The template shaft 314 is connected to the spindle 328 which supports the workpiece by a differential mechanism 330. This differential mechanism ordinarily causes the template to rotate with the workpiece in fixed angular relationship thereto; however, it can be adjusted, continuously or intermittently either during rotation or when the parts are stationary, so as to vary the angular position of the template relative to the workpiece by any desired amount and with a high degree of sensitivity, or to a small fraction of a degree.

As shown, the differential mechanism is controlled by a retwister electrode 332 which is moved longitudinally along a retwister flexure 334 by the carriage 322 on which it is mounted. As the electrode moves longitudinally it is shifted transversely by a motor 336 controlled by a circuit 338 (see bottom Figure 25) responsive to signals from a spark gap formed between the retwister electrode and the surface of the retwister flexure. The action is as before; the circuit controls the motor so as to maintain the spark gap (or the spark) at a substantially constant length. Therefore, the electrode follows the contour of the flexure, without actual physical contact therewith, as it is moved longitudinally.

Motor 336 is also connected to the adjustable member, or housing, of differential 330. For every operation of the motor there is a corresponding adjustment of the differential. The arrangement is such that the differential, and consequently the angular position of the template shaft and template, is adjusted in accordance with the transverse movements of the retwister electrode 332. Thus, the angular position of the template relative to the work is continuously varied to a degree determined by the contour of flexure 334 as the carriage and the cutting tool move longitudinally along the work. The contour of flexure 334 may be determined by manual adjustment at the four positions corresponding to those of the template blade elements and at intermediate positions it automatically assumes interpolated positions. The result is that the retwister flexure causes the template to be continuously and gradually "retwisted," or changed in angular position relative to the workpiece, as the tool machines the workpiece to form the complete master blade. This enables a properly twisted master blade to be made, with a high degree of accuracy, from an untwisted template. From a broad viewpoint, this is accomplished as described above by separating the necessary blade interpolations into two parts: (1) the shape interpolation to define the shapes of the blade elements of the surfaces extending between the computed blade elements in the direction of the longitudinal blade axis, and (2) the angular interpolation to define the relative positions, orientation or angular locations of the blade elements so interpolated.

The machine of Figures 13 to 25 is constructed generally as follows: A frame or bed 340 carries a tailstock 342 and a headstock 344. A work holder 346 for the work 300' is mounted on the spindle 328 driven by a spindle drive motor 348 through interchangeable gears, as in a conventional lathe. Carriage 322 is slidable on ways 350, 352 and is driven longitudinally toward or away from the workpiece by the lead screw 354, which may be connected to or disconnected from the carriage by a split nut 356 opened or closed by the operating handle 358. The lead screw is driven in the usual manner through a transmission connected with the spindle.

Cross-slide 320 is mounted on transverse ways on the carriage and may be driven transversely toward or away from the workpiece by a cross-feed screw 360 controlled by the electro-magnetic clutches 324, 326 and driven by the motor 362 through a flexible shaft 364. This same motor also drives the milling cutter 302 through a flexible shaft 366. The milling cutter is carried by a tool post fixed to the cross-slide and is moved thereby relative to the workpiece so as to regulate the depth of cut. When one of the electro-magnetic clutches is energized the cutter (which is being rotated independently by the flexible drive shaft 366) is fed transversely toward the work, while energization of the other clutch will move the cutter transversely away from the work. Consequently, the cross-sectional profile or contour of the machined piece may be regulated by selectively controlling the flow of current to the clutches, or by controlling the relative flow of the current through both clutches.

The current flow to the clutches is controlled by the circuit 318 shown at the top of Figure 25. This circuit acts to maintain a relatively high voltage drop between an electrode in the tracer head 368 carried by the cross-slide on carriage 322 and the flexure 304. Whenever the point of the electrode 316 in the tracer head is spaced from the flexure by more than a predetermined relatively small distance or gap (for instance of the order of .0015 of an inch one of the clutches will be engaged to feed the cross-slide inwardly, toward the work. Because the tracer head is carried by the cross-slide it too will be moved inwardly, and if a spark does not already exist one will be formed between the electrode point on the tracer head and the flexure when they approach to within about .003 of an inch from each other. The inward movement continues for a brief period after the spark is formed, but when the spark is shortened to the preselected length of .0015 of an inch then the in-feeding clutch is de-energized, and the movement of the cross-slide halted. So long as the spark remains at this pre-set length the cross-slide will remain stationary, but if the spark lengthens the slide is moved inwardly, thereby shortening the spark, and if the spark shortens the slide is moved outwardly which lengthens the spark. Thus, the spark length is maintained substantially constant, the slide being moved in or out as the case may be by the varying outputs from the circuit to the extent necessary to keep the spark length at its predetermined value. Consequently, the electrode point in the tracer head will exactly follow the contour of the flexure as the lead screw moves the carriage toward the head stock, and the path of movement of the milling cutter center will be determined thereby.

This follower or tracer system also works exceptionally well under dynamic conditions. If the point on the flexure opposite the electrode is moving outward (as caused either by rotation of the template or longitudinal motion of the electrode or both) the spark will become shorter and the current in the outward driving clutch will become greater until the outward driving torque is just sufficient to move the slide outward at the same velocity as the point on the flexure. Any deviation from equal velocities will result in a change in spark length and a corresponding correction to clutch current. Of course a reverse action occurs when the flexure moves inward. Under conditions of equilibrium the following conditions obtain: (a) spark length is constant, (b) velocity of the cross-slide is equal to the velocity of the portion of the flexure opposite the electrode (includes zero velocity), (c) torque delivered by the clutches is equal to torque imposed on the clutches by friction of the screw and sliding surfaces and by the load of the tool (includes zero torque). Any departure from these conditions causes a change in spark length. As the spark length changes the circuit acts to change clutch current by an amount and at a rate to restore equilibrium. The circuit begins to act as soon as a departure from equilibrium begins to occur. The control is not of the on-off or "bang-bang" types; normally, both clutches always slip and when the cross-slide is moving one clutch simply slips at a lower velocity. Therefore, it can and does provide simultaneously the important basic features of speed and smoothness of operation, sensitivity and accuracy.

The values of .0015 inch given for the selected spark length and of .003 inch for the maximum spark length are exemplary only. The first can be varied by changing the electrical constants of the circuit and the second by varying the open circuit voltage across the gap.

In that form of the invention illustrated in Figures 13 to 25 the longitudinal contour or profile of the flexure 304 is governed by the untwisted template of Figures 11 and 12. The template is fixed on a template shaft 314 which is mounted coaxially with the spindle 328 on sleeve bearings respectively located within the hollow outer end of the spindle itself and on the outer end of a supporting arm carried by the frame. The template shaft is geared to the spindle for rotation therewith at the same speed as the spindle; however, the gear connection includes a differential mechanism 330 by which the angular position of the template shaft can be varied or adjusted relative to the spindle both during rotation of the parts as well as when they are stationary.

The differential mechanism is connected to and adjusted by a motor 336 which moves a twist control electrode in the tracer head 370 transversely with respect to a twist control flexure carried by the frame. A circuit 338 (shown at the bottom of Figure 25) controls the motor so as to maintain a constant length spark gap between the point of the electrode and the outer surfaces of the flexure. The twist tracer head is attached to the carriage and is movable longitudinally therewith, thereby providing for longitudinal movement of the twist electrode with respect to its flexure in a manner similar to that previously described in connection with the contour tracer and flexure; however, the twist electrode is not affected by movements of the cross-slide because the twist tracer head by which it is carried is attached directly to the carriage, whereas the contour tracer head and electrode are carried by the cross-slide. Also, in the case of the contour tracer the electrode is fixed in the tracer head once adjusted to its proper position and the length of the spark gap between it and the movable flexure 304 is maintained constant by transverse movements of the tracer head and slide, while in the case of the twist tracer the electrode itself is moved in or out by the motor 336 to maintain a constant length spark gap between the electrode and the fixed flexure 334. Because motor 336 is geared to the differential mechanism as well as to the tracer electrode, there is a corresponding adjustment of the differential for each movement of the electrode.

Flexure 334 is adjusted to the proper position and then locked in place. Consequently as the carriage moves toward the headstock the tracer electrode will follow a fixed path determined by the longitudinal shape of the flexure and the differential mechanism will be adjusted in accordance with the movements of the electrode and therefore also in accordance with the shape of the flexure. The flexure is so positioned, or shaped, that as the carriage moves from a station corresponding to that of one of the blade elements on the template to a station corresponding to that of the next succeeding template blade element the differential 330 will be adjusted in accordance with the transverse movements of the twist electrode by an amount which displaces the template shaft and the template fixed thereto through an angle relative to the spindle which equals the angle by which the two blade elements should be displaced in the finished blade. This re-twisting action is a gradual or continuous process; it occurs smoothly and evenly at a rate and in an amount determined by the shape of the flexure 334. Furthermore, this action is true not only for the four blade elements which are machined on the template but also for the infinite number of imaginary blade elements located therebetween. The flexure 334, like the flexure 304, is a thin flexible magnetic and elastic spring steel strip which, when the deflecting force is removed, will return to its original linear shape. Because the tracer electrodes never actually touch the flexures 304, 334 but are maintained at a preset distance therefrom, with the sensing action being provided by the electron stream flowing across the spark gap, the flexures need not resist any mechanical deflecting force by the tracer. Therefore they need only be thick enough to prevent buckling, sufficiently elastic to return to their original straight, flat condition when not deflected by the magnetic sliders by which they are shaped, and can be made highly flexible without fear of distortion by the tracer.

Flexure 334 is held in the proper shape by magnetic slider strips 372, 374, 376, 378 each of which have one end slidably mounted in a respective slot of the block 380 fixed to the frame. The other end of each slider terminates in a pair of legs (372A, 372B in Figure 15) which form the poles of a permanent magnet attracting the steel flexure. An electrical winding may be provided on one or both of these poles if desired to increase the strength of the magnetic field, or to provide a means for regulating its strength. Each slider is adjusted to its proper transverse position, determined by the angular position desired for the corresponding blade element of the template relative to the spindle, and then the flexure is placed on the magnetic knife edges. The attraction of the magnetic sliders for the steel of the flexure causes it to cling thereto and to be deflected at the four knife edges to exactly the proper, pre-set, positions. Because the flexure is of elastic material it assumes a smooth curved contour between these four positions which represents a graphical or mechanical interpolation of the respective angular positions of all the infinite number of imaginary blade elements located between each pair of successive computed blade elements. Consequently, flexure 334 forms a longitudinally curved surface or line which represents by its shape or curvature the various angular positions of all the infinite number of blade elements which compose the complete blade. Only four of these positions are computed in the embodiment of Figure 13: the ones determined by the setting of the four magnetic sliders. The innumerable others are determined by the curving of the elastic flexure as it adjusts itself automatically to the four predetermined points or positions at the knife edges of the magnetic sliders. Because the flexure is of uniform dimensions and elastic properties throughout its length the resulting longitudinal curve it provides between the knife edges is of the utmost smoothness and of gradually changing shape, without rapid or abrupt changes in contour.

A refinement of the flexure apparatus is shown in Figures 26 and 27. This refinement, or species, is suitable for use either as a contouring flexure or retwisting flexure or both, but it is shown as applied to the contouring flexure. It will be understood that the parts shown in Figures 26 and 27 may be substituted for the flexure 304 and the parts immediately associated therewith as shown in Figure 13, the cooperation with other parts of the machine being exactly the same as shown in Figures 13 to 15.

A flexure 304' is provided which is similar in function to the flexure 304. It comprises a thin flexible flat strip of elastic and magnetic material such as spring steel mounted on the knife edges of magnetic slider strips 382, 384, 386' and 388' which are carried by the block 390. The mechanism of Figures 26 and 27 differs from that of Figure 13 in that an auxiliary means is provided for properly shaping or curving the flexure adjacent the end 400 thereof.

In a device which depends on a flexure bent among several known points to form a smooth curve, or a fair curve, a means of continuously determining the end conditions is needed. If, as is the case in the illustration of Figure 26, the location of the known points is such that the radius of curvature of a fair curve through the points would steadily decrease toward either end then it is necessary that the bending moment in the flexure increase steadily toward each end. A flexure lying through the known points, with zero moment applied by each point would form a fair curve only in the special case where the radius of curvature of a fair curve approaches infinity at the end points.

The apparatus of Figures 26 and 27 provides a means whereby the formation of a fair curve for practically all end conditions may be assured. The end portion 400 of the flexure 304' is supported by a means capable of applying a bending moment to said end portion. This means could comprise, for instance, merely a pivoted pair of fingers capable of being rotated to apply a moment to the flexure. However, as shown in Figures 26 and 27 it comprises a rotatably mounted permanent magnet 402 having parallel poles or arms 404, 406 which terminate in knife edges to which the end portion 400 of the flexure clings by magnetic attraction. Magnet 402 is attached, as by soldering or brazing, to a vertical shaft 408 rotatably supported in a cylindrical boss 410 on the outer end of the slider 388'. The magnet is so placed relative to the shaft that the knife edge on arm 406 is in alignment with the axis of rotation of the shaft. When the shaft is rotated, or turned through a small angle about its axis, the flexure end portion 400 will be bent to a corresponding degree about the knife edge on arm 406 as a pivotal axis.

Magnet 402, and consequently the end flexure portion which is attracted thereto, is rotated by a pulley 412 fixed to the lower end of shaft 408. The pulley 412 is driven with the belt 414 and pulley 416 through the gear train 418, 420, 422 and 424 by the motor 426. The motor is reversible and is connected by leads 428 with the servo-amplifier control circuit 162'. This circuit may be constructed like the circuit 162, or the circuit 338, so as to regulate the operation of motor 426 in accordance with variations in the length of the spark between the electrode point 430 and flexure 304'.

The electrode point 430 is carried on the outer end of the slider strip 386' but is electrically insulated therefrom by insulation 432. Because the electrode is not of magnetic material (this electrode and the others as well are preferably made of a platinum alloy which resists corrosion and erosion) the flexure will not be attracted thereto, as is the case with the other flexures. It is, however, held practically in contact with the electrode point on the end of the slider by the action of the servo-mechanism including motor 426 and circuit 162'. A relatively high potential is maintained between the electrode 430 and flexure 304' by the high lead 434, containing a resistor 436 immediately adjacent the electrode, and the ground lead 438. The resultant spark creates a current flow across the spark gap which causes a drop in potential which varies with the length of the spark gap and hence is an indication of the same. This voltage drop signal is applied by the signal or grid lead 440, containing the resistor 442 immediately adjacent the spark gap, to the control circuit 162' where it is amplified and caused to actuate the motor 426 in such manner as to maintain the voltage drop across the spark gap substantially constant; therefore the length of the gap is maintained substantially constant. If the flexure moves away from the point 430 (or vice versa) the resulting increased spark length causes motor 426 to bend the flexure so as to bring it back to its predetermined spacing relative to the electrode point. The reverse action takes place if the electrode and the flexure approach within a closer distance than that selected for the spark gap. The result is that the flexure is held or maintained at a constant small distance (for example, about .0015") from the end point 430 of slider 386', though actually the slider exerts no deflecting force on the flexure. For any configuration of known points, or slider positions, the end support 402 is rotated just enough to bring the flexure to its proper position relative to the adjacent point but with the load of the flexure against said adjacent point at zero. The dotted and full line positions of the flexure in Figure 26 show how this is accomplished by moving the magnet 402 angularly about the pivot formed by shaft 408, so as to bend the end portion 409 of the flexure to greater or lesser degrees. While the end loading apparatus of Figures 26 and 27 is shown as applied to one end only of the flexure it could as well be used on the other end, or on both ends of the flexure, if desired.

A blade 300 when made on the contouring machine in the way described above, either from a twisted template 112 or an untwisted template 112' and with or without the flexure curving device of Figures 26 and 27, should match the drawing curves 102, 104, 106 and 108 exactly (except of course for the difference in scale) at the spanwise positions of the computed blade elements. It should also be of the proper shape between the computed blade elements; i. e., the profiles of the infinity of imaginary blade elements between the computed ones should be of proper contour and orientation. But it is advisable to make certain of this before the blade is used and this is particularly true in the case of a master blade, which is to be used as a pattern or model from which the actual working blades are manufactured. Therefore, it is desirable that the blades made in the contouring machine be given a geometrical inspection before use. This is in addition to the usual physical inspection, which may be given either before or after the blade is machined, or both before and after, with any of the numerous devices that are commercially available and satisfactory for that purpose. Devices are also commercially available which may be used for the geometrical inspection of an article such as the blade 300. However, such devices (usually optical in character) are not entirely satisfactory for such purpose. It is best, therefore, that a blade 300 as machined on the contouring machine of Figures 13 to 25 be examined for geometric accuracy, or for correctness of form and size, on the novel apparatus of Figures 28 to 31, referred to herein as the inspection machine.

The inspection machine is very similar, in construction, to the template making machine of Figures 1 to 12. As the latter has been fully described above and as like reference numerals are used in Figures 28 to 31 and in Figures 1 to 12 to indicate like parts in these machines, it is considered necessary here only to point out the material differences in construction between them.

In the inspection machine of Figures 28 to 31 the shaft 128' of table 130 terminates at its lower end in a face plate or chuck 900 on which the blade 300 is supported in exactly the same manner as it was supported during machining in the contouring machine. Therefore, the spanwise axis of the blade will be coincident with the axis of rotation of table shaft 128', just as the spanwise axis of template 112 or 112' was coincident with the axis of rotation of the template table shaft 128 during formation of the template. Thus when the table is rotated, by motor 146 as before, the blade 300 is rotated therewith on the same axis of rotation. Dead center 183 is not required, ordinarily, because no deflecting force is applied to the blade during the inspection operation, though the dead center may be used as an aligning means for blades which were supported at both ends in a similar manner during machining thereof.

The operation of the inspection machine of Figures 28 to 31 may be considered, to some extent, as the reverse of that of the template making machine of Figures 1 to 12. In the inspection machine a tracer head 902 replaces the cutter 124 and a recording head 904 replaces the tracer 132. A blank sheet of drawing paper is placed on the table, a completed blade is placed in the chuck, and as the two are rotated a circular follower 906 in the tracer head moves the pantograph linkage and causes the ball point pen 908 to record an ink line curve 910 on the drawing paper 131" which represents (on a twenty times enlarged scale) the movement of the center of follower 906 about the profile of the blade element at the spanwise position to which the tracer head 902 has been set. The resultant curve does not represent a blade element profile; it is an enlarged scale drawing of the path of the follower center relative to the blade element profile. However, by reducing the size of the curve 910 by a uniform thickness (twenty times the radius of follower 906) a curve 912 can be readily obtained which does represent on a twenty times scale the profile of the blade element of blade 300 at the level of the follower. Curve 912 is not only in a definite size proportion to the blade element contacted by the follower, it also is in the same position relative to the common axis of rotation and has the same angular relationship or orientation relative to the other blade elements of the blade being inspected. Therefore, the curve 912, or a number of such curves made of different blade elements of the blade being inspected, can be compared with the corresponding computed blade elements or the corresponding curves thereof (see 102 to 108 in Figure 2) to determine the geometrical accuracy of the inspected blade. This is the more readily and accurately done because the curve 912, like the curves 102 to 108 are preferably made on a greatly enlarged scale, such as twenty times actual size.

The follower 906 possibly could manually be made to follow the blade profile as the shaft 128' is rotated, but practically this would result in a loss of accuracy as well as time. It is preferable to use the spark gap follow-up mechanism, or spark actuated servo-mechanism, shown schematically in Figure 28.

This mechanism acts, like the spark sensing means described above, to move follower 906 about pivot 140 so as to maintain a substantially constant length spark between the follower and the blade 300 as the blade is rotated with shaft 128'. The follower is made of metal insulated from its support at 912 and connected to the high lead 914 through a resistor 916 located at the follower. The blade is connected to ground by lead 438. The resultant relatively high voltage maintained between the follower and the blade causes a spark to be formed therebetween (when the parts are within about .003") and the voltage drop across the spark is fed to the control circuit 162" by the resistor 916 next to the follower and by the grid or signal lead 920. The circuit is designed to regulate the flow of current to the drive motor 170 for the parallel linkage so that follower 906 is maintained at a pre-selected spacing (for instance .0015") from the blade being inspected. As the blade and drawing rotate, follower 906 is automatically moved by the follower bar 922 about the pivot 140 of the follower arm 134' so as to follow the profile of the blade element. The point of ball pen 908 is similarly moved by the parallel linkage which interconnects the follower and the pen, thus causing a record of the path described by the follower center relative to the axis of rotation to be inscribed on the drawing sheet 131″ by the pen as the table and the blade are slowly rotated. A single drawing or a plurality of drawings may be made in this way of one or more of the blade elements, whether computed or otherwise, of the complete blade 300. The drawings so made will be highly accurate representations of the contour or profile of the various blade elements so reproduced and also of their size, location and orientation relative to the blade axis and relative to each other. A record so made of either the whole of the blade or of any desired portion or portions thereof enables the blade 300 to be easily and quickly checked for accuracy of form and size and provides a drawing of the actual blade which may be stored for future use. If desired, the drawing sheet 131″ may be placed on a drawing 100″, properly oriented relative to the complete blade on the face plate 900, containing curves representing computed blade elements as described previously in connection with drawing 100. Then if the blade being inspected is of the proper geometry at the locations corresponding to the computed blade elements the curve 912 on the sheet 131″ will exactly overlie the corresponding computed blade element curve on the drawing 100″.

In the case of the template pantograph the parallel linkage is arranged as previously described so that the cutter center and the follower center are located at corresponding apices of triangles which are geometrically similar at any and all of the various positions assumed by the follower and cutter. This same result is achieved in the inspection pantograph of Figures 28 to 31, though the recording arm 924 and follower arm are arranged somewhat differently, as follows:

The pivots 138′ and 140′ and table center 110′ (the axis of rotation) are placed in line; the distance from pivot 140′ to follower center 127′ is made equal to the distance from pivot 140′ to table center 110′; the distance from pivot 138′ to the recorder center or point 142′ of the ball pen is made equal to the distance from pivot 138′ to table center 110′; and by making the distance between the pivots 135′ and 137′ of the link 107′ equal to the distance between pivots 138′ and 140′. Also, the recording arm 924 as shown in Figure 28 is parallel to the line joining the pivot 140′ and the follower center 127′, which is like the arrangement of Figure 2 in which the line joining pivots 138 and 142 is parallel to the line joining pivot 140 and cutter center 127. However, in Figure 28 the recording arm 924 is angularly offset from the parallel arm 136′ and is rotatable about the pivot 138′ with the parallel arm 136′, to which it is locked by the compass type adjustment means 926. The follower center 127′ is similarly offset angularly from the parallel arm 134′, an adjustment 928 being provided to facilitate setting of the follower center at an angular displacement from arm 134′ equal to the angular displacement of the recording center 142′ from the arm 136′.

With this arrangement the triangle formed by the axis of rotation, the axis 140′ and the follower center 127′ and the triangle formed by the axis of rotation, the axis 138′ and the recorder center 142′ will be maintained geometrically similar during movements of the follower relative to the axis 110′ as the follower traces a blade element profile during an inspection operation. Consequently the motion of the recorder center 142′ will duplicate the motion of the follower center 127′ (though on an enlarged scale because of the difference in size of the two triangles) thereby enabling an exact drawing to be made of an element of the blade 300 without actually touching the blade, except through the intermediary of the electron stream flowing across the spark gap between the periphery of the metal follower and the blade. In the case of a master blade, if the drawing or drawings so made correspond within the desired limits of accuracy to the specifications or standard to which the blade is made, it is removed from the face plate 900 as a completed article of manufacture and sale, fully inspected and ready for use.

*Specific description of the template making machine*

The machine shown in Figures 1 to 11 of the drawing, called herein the template making machine, comprises a frame 101, which may be a lathe bed or similar thereto, on which is bolted a pair of U-shaped stocks 103, 105 which respectively carry the main parallel arms of a pantograph mechanism having a tracer 132 which regulates the position of a milling cutter or tool 124. One of these parallel arms 134 is pivoted at 140 to the block 105 while the other arm 136 is pivoted at 138 to the block 103. The two arms are connected by link 107. In order to provide for variation in the desired ratio of tempalte size to drawing size, adjustments are provided in the location of stocks 103, 105 on frame 101, in the length of link 107, as at 111, and in the length of arm 136 (between pivot 138 and tracer center 142) as at 113.

A tracer 132 is carried by a horizontal arm 160 which is connected with an extension of the parallel arm 136, the said extension being identified as 157 in Fig. 2. The arm 160 and the tracer are pivotally movable about a vertical axis at 142 as shown in Fig. 2 and they are also pivotally movable about a horizontal pivotal axis at 174 as shown in Fig. 1, being counterbalanced by a weight 115. The extension 157 is longitudinally adjustable relatively to the main portion of the arm 136 and is held in adjusted position by set screws 113, 113. The other parallel arm 134 carries the cutting tool 124 and its driving mechanism. For rigidity and stability each arm has a U-shaped attachment end with the two legs of each U being supported respectively by the corresponding legs of the U-shaped stocks. This construction is best illustrated in Figure 8, which shows the two legs 117, 119 of the parallel arm 134 respectively connected to the legs 121, 123 of stock 105. The connection for both legs of parallel arm 134 is provided by a pair of coaxial stub shafts 125 which extend through respective bushings or bearing holes in each leg to pivotally connect them on an axis represented by the point 140. The legs of the other parallel arm 136 are similarly pivotally connected to stock 103 by shafts 129, having an axis of rotation represented on the drawings by the point 138 in Figure 2. Ball bearings are preferably provided as thrust bearings between each of the parallel arms and the stocks to which they are pivoted. One of these two bearings is shown at 133 in Figure 8. Ball bearings are likewise provided at the pivot points 135, 137 between the link 107 and the parallel arms.

The cutting tool 124 is fixed to a shaft 126 rotatably mounted in bearings 139, 141 in the legs of parallel arm 134. The arm also supports the cutter drive mechanism, which comprises a reduction gear train housed in a casing 143 and driven by the motor 172 and having a pinion 145 connected to the cutter shaft drive gear 147 through an idler or intermediate gear 149 on the adjustable link 151. The whole of this cutter drive, with the exception of the cutter shaft gear 147, is supported by a plate 153 bolted at 155 to the upper leg 117 of the parallel arm 134.

The pantograph is driven through a sector plate 159 bolted to arm 134 having a center hole which snugly receives the upper end of the pivot shaft 125. The outer periphery of this sector plate is formed as a flat circular edge which extends over a little more than a quarter of a circle, and is constructed on a radius having its center at the axis 140. A friction wheel 161 engages this flat edge and drives it about the axis 140 in the manner of a pinion and gear, except that the force transmitted is entirely frictional because the edge faces of both the pinion and the sector are flat. As best shown in Figure 7 the friction wheel 161 is fixed to a pinion drive shaft 163 mounted on ball bearings in a bracket 165 bolted at 167 to the stock 105. A reduction gear shaft 169 is also mounted in ball bearings on the bracket 165 and this shaft has fixed thereto a pinion 171 which meshes with the drive shaft gear 173 on the friction wheel drive shaft 163. The reduction gear shaft is driven by a gear 175 meshing with the pinion 176 of the pantograph drive motor 170. The top of the motor and the gears are covered by an oil pan 177. Motor 170 is reversible. When it rotates in one direction the sector 159 and the parallel arms 134, 136 of the pantograph and consequently cutter 124 and tracer 132 are rotated clockwise about the axes 140 and 138; when it rotates in the other direction the parallel arms and the cutter and tracer are moved counterclockwise about the same axes.

The workpiece, or the template blank 112, and the table 130 on which the drawing is mounted are both carried by a single shaft 128 supported by a bushing or journal 179 attached to the upper leg 121 of the stock 105. A ball bearing 181 transmits the thrust or weight of the table and its associated parts to the upper face of the journal 179, leaving the shaft and the table and workpiece thereon free to rotate about an axis indicated by the point 110 in Figure 1. Some of the table weight is also taken up by the dead center piece 183, having a tapered upper point fitting within a tapered recess at the center of the lower end face of shaft 128. This dead center is slidably received within a lower boss 185 on the lower leg 123 of the stock 105 and can be fixed in a desired position by the set screw 187. It is adjusted so that it coacts with the journal 179 to hold shaft 128 in proper alignment relative to the frame and stock members and also to provide the necessary resistance to lateral displacement of the workpiece which might otherwise occur due to the force exerted thereon by the cutting tool.

The template is a solid metal blank, such as brass or babbitt, having a hole drilled axially therethrough so that it is a snug slidable fit on the lower end of shaft 128. A set screw 189 is provided to lock it tightly to the shaft. The portions of the template which represent the computed blade elements are made oversize and then cut with the tracer and pantograph to correspond with the drawing curves in the manner set forth in the general description above. The other portions of the template are preferably relieved, or cut away, and this may be done either before the template is mounted on shaft 128 or with the cutter 124 after the template is mounted but preliminarily to the actual blade element cutting process. The axial or spanwise location of the computed blade elements both on the blade and the template are known, of course, and the cutter is adjusted on its shaft to correspond with one of said locations and then fixed in position with clamp 191 before the respective blade element is cut.

Table 130 has a hub 193 fixed by a set screw to the upper end of shaft 128. The hub has an annular flange 195 which receives a square plywood table top that is preferably covered with a thin flat steel sheet 197. Both the plywood top and the steel sheet are fastened to the hub 193 by countersunk machine screws, to provide a rigid table mounted on the rotatable shaft 128 and having a smooth flat level surface lying perpendicular to the axis of rotation for receiving the drawing 100.

The table is driven, independently of the pantograph linkage and of the cutter drive, by the table drive motor 146 through the motor shaft pinion 199, intermediate gear 201 and sprocket 203. A chain-belt 205 engaged by the sprocket and extending around the periphery of the wooden rim or pulley 207 fixed on the underside of the table slowly turns the table and its shaft 128 as the sprocket 203 is rotated by motor 146. The rim 207 is mounted coaxially with the table axis 110. Motor 146 is mounted on the bracket 165 which also supports the linkage drive motor 170. The bracket is attached to stock 105 which is adjustably mounted on the ways 109 of the frame 101.

The cutter drive motor 172 and the table drive motor 146 are independently controlled, preferably by manually operated on and off switches (not shown). It is usually satisfactory to operate these motors at a constant speed, with on and off switches. However, variable speed motors could be used if it is desired to adjust or vary cutter speeds or table speeds.

The pantograph or linkage drive motor 170 is automatically controlled by the spark sensing means and the associated circuit shown diagrammatically in Figure 10.

The spark gap, as shown in Figure 10, is energized from a direct current source of constant or steady relatively high voltage by the ground lead 168 and the high lead 211. The ground wire is connected directly to the inside of the conductive line drawing 144 but the lead 211 contains a pair of resistors 213 and 166 between the voltage source and the conductive edge 156 of the follower. At least one of these resistors (the one marked 166 in Figure 10) is preferably located as close as possible to the conductive edge 156. The open circiut voltage between the conductive edge and the conductive line drawing will, of course, be approximately 800 volts in the circuit of Figure 10. But once a spark is formed the resulting current flow causes a voltage drop across each of the resistors 213, 166 so that the voltage drop across the gap itself will be appreciably less than 800 volts after the spark is formed. Resistors 213 and 166 are preferably so selected that the current flowing across the gap would be within a range of from about thirty-five microamperes to zero amperes for spark lengths from about .001 inch to about .003 inch. Within an operating range having these approximate limits the current will vary inversely with spark length in a substantially uniform manner. This characteristic is made use of in the circuit of Figure 10 to maintain the spark length (i. e., the spacing of the edge 156 from the line 144) at a substantially optimum value which, in this instance, is of the order of .0015 inch. With a spark length of this selected or predetermined optimum value the current flow across the spark gap will be of the order of twenty-five microamperes and this current flow will produce a certain voltage drop across resistors 213 and 166. Because the energizing voltage is fixed at 800 volts, the resulting voltage at the conductive edge 156 will also have a definite value, dependent upon the value of the two resistors so long as the spark length remains at .0015" with a resultant current flow of 25 microamperes. But if the spark length shortens (as a result of relative movement between edge 156 and line 144) then the current flow proportionally increases, thereby lowering the voltage at the conductive edge 156. An increase in voltage at this point will similarly result from an increase in the length of the spark gap.

This variation in voltage at the conductive edge 156 of the tracer with changes in spark length above or below the predetermined value is utilized by the circuit 162 to control both the direction and rate of rotation of the motor 170, and in such a way as to move the edge 156 relative to the line 144 so as to maintain a substantially constant predetermined length spark gap therebetween.

Signals in the form of voltage variations at the conductive edge 156 are transmitted through the resistor 164 to the grid of an electronic tube 217, in this instance a triode connected in a cathode follower circuit. This tube and its cathode resistors 219, 221 serve to provide a voltage in the lead 223 which is proportional to the voltage at the electrode or conductive edge 156, but at a low enough level to apply to the grid of the triode tube 225 whose plate is supplied from a separate 300 volt source by lead 227. A like result might be obtained by using a voltage dividing resistor directly between the electrode and ground in place of the tube 217, but this would divert current from the spark whereas the tube 217 and cathode follower circuit of Figure 10 diverts practically no current from the spark and yet provides an adequate signal in lead 223 which is connected through a variable resistance 229 to the grid lead 231 of the second tube 225.

A by-pass condenser 233 connects the high side of the two cathode resistors with the grid lead 231, thereby creating a voltage in the said lead which is proportional to the rate of change of the signal applied to the grid of tube 217 by the input lead 215. This rate of change signal is algebraically added to the signal applied by the lead 223 to the grid lead 231, thereby producing on the grid of the second tube 225 a voltage which is determined not only by the deviation of the voltage at electrode 156 from its predetermined value (signal applied to the grid 235 through leads 223 and 231) but also by the rate of change of said electrode voltage (signal applied to the grid 235 by the condenser 233 and lead 231). Thus the grid 235 of the second tube is provided with a combined signal equal to the signal produced by the deviation plus the signal produced by the rate of change of the deviation.

A filter condenser 237 is used between the cathode of the first tube and ground to by-pass the alternating current which may arise from oscillations of the spark due to the unavoidably large electrode. However, such oscillations are kept at a minimum by locating the resistors 164, 166 at the electrode or as close to it as possible. Resistance 219 is made variable to provide a gain adjustment and resistance 229 is made variable to provide a damping adjustment.

The output of tube 225 corresponds to the signal applied to its grid by lead 231, except that the output signal in the plate lead 239 has its phase inverted relative to the input signal on the grid 235. A second output signal, which is in phase with the input signal on grid 235, is taken from the cathode lead 241 of the second tube 225 at the point 243 on the high side of the cathode resistor 245.

The cathode output signal of tube 225 (the in-phase signal) is applied directly to the grid of a power amplifier tube 247 which controls the current passing through the core winding of a saturable core transformer 249 in its plate circuit. The plate output signal of tube 225 (the inverted phase signal) is taken off from a point 251 of a voltage divider 253 and then applied directly to the grid of a second power amplifying tube 255 which controls the current passing through the core winding of a saturable core transformer 257 in its plate circuit. However, because of the phase inversion at the plate of tube 225, the result of any change in the voltage applied by the input circuit to the tube 217 will be an increase in the current in the direct current winding of one of the transformers 249, 257 and a decrease in the current in the direct current winding of the other of the said transformers. Furthermore, these changes will each be proportional not only to the deviation in the input signal, but to its rate of change as well.

The primary windings 259, 261 of transformers 249, 257 are wound in the same direction and connected in series across the 100 volt, 400 cycle power line 263, 265. These windings are therefore continuously energized. The secondary windings 267, 269 of the transformers 257, 249 are wound in opposite directions and connected in series with one of the field coils 271 of the reversible motor 170. The other field coil 273 is connected across the power line by leads 275, 277 and in one of these leads (277) a phase shifting condenser is interposed.

Circuit 162 is preferably so designed and adjusted that equal currents will flow from the two tubes 247, 255 through the direct current windings of the saturable core transformers 249, 257 when the spark gap is at its proper, predetermined length. Furthermore, these currents are sufficiently great to saturate or almost saturate the transformer cores. Under this condition the outputs of the secondary windings 267, 269 will be equal and opposite so the motor 170 will not turn because only one coil thereof (coil 273) is energized.

But if the spark length varies in one direction from its preselected length, the resulting signal will cause the direct current output from one of the power tubes 247, 255 to increase and from the other to decrease, thereby increasing the core saturation of one of the transformers 249, 257 and decreasing the core saturation of the other. This results in a current flow through coil 271 which is out of phase with respect to the current through coil 273 and causes the motor 170 to be operated in a direction which tends to return the spark gap to its preselected length. A reverse action occurs if the spark length varies in the other direction, with the motor being operated in a reverse direction which tends again to return the spark gap to its preselected length. The direction of rotation of motor 170 therefore depends on which core saturation is decreased and which is increased, which in turn depends on whether the spark length increases or decreases. The rate of rotation of motor 170 depends on the strength of the signal applied in opposite phase to the grids of the power tubes 247, 255 and this signal strength is a function not only of the error in the spark length relative to its preselected length, but also to the rate of change of said error. Thus, circuit 162 controls the pantograph drive motor so as to maintain the conductive edge 156 at a preselected distance (for example .0015") from the conductive line 144 and this spacing is held substantially constant, without instability or hunting, even for comparatively rapid movements of the conductive line drawing. No projections, depressions or other physical deformations of the curve 144 are required; so long as it is electrically conductive it will be traced by the electrode or circular follower edge 156 accurately and rapidly, with no contact therebetween other than through the electron stream flowing across the spark gap.

*Specific description of the contouring machine*

The contouring machine of Figures 13 to 25 has a milling attachment thereon controlled by a novel form of feed regulating mechanism. The machine has a frame 340 on which are mounted a tailstock 342 and headstock 344 in the same manner as in a conventional lathe. The face plate or chuck 307 which holds the work 300' is attached to a spindle 328 driven by the pinion 313 on the spindle drive motor 348 through the intermediate gear 317 and the spindle drive gear 319. The intermediate gear is carried on a layshaft 321 adjustably mounted in a slot 323 in the pedestal 325.

Carriage 322 slides like conventional lathe carriages on the ways 350, 352, and is fed longitudinally by the split-nut 356 which may be engaged or disengaged with the lead screw 354 by means of a handle 358. The lead screw is driven at a selected speed relative to the speed of spindle 328 by a gear train comprising the lead screw drive gear 339, the intermediate pinion 341 and gear 343 and the drive pinion 345 and sprockets 347, 349. The intermediate pinion and gear and the drive pinion and lower sprocket are respectively mounted on parallel layshafts adjustably secured in the slot 351 of the supporting arm 353. Here again the drive is like that conventionally provided for the lead screws of conventional lathes. Power for the lead screw drive is taken from the spindle, to which the upper sprocket 349 is fixed. The two sprockets are connected by a chain drive 357.

The carriage is provided with a cross-slide, 320, best shown in Figure 16. Slide 320 is reciprocated on a pair of transverse ways on the carriage, one of which is shown at 359, by the cross feed screw 360. A tensioning spring 365 and cable 367 bias the slide in one direction to increase accuracy by taking up the slack between the screw and the slide to prevent play therebetween. Cable 367 is guided by pulley 369 mounted on a shaft bridging a hole 371 in an extension of the carriage. The lower end of spring 365 is fixed to a support (not shown) so that it exerts a substantially constant force on the slide urging it to the left relative to the screw 360, as viewed in Figure 16.

As shown in Figures 13, 16, 17 and 18, the cross-feed screw 360 is driven by a gear 373 meshing with a pair of gears 375, 377 actuated respectively by a pair of electro-magnetic clutches 324, 326. Each clutch has a driven member attached to one of the gears 375, 377 and a driving member 443 connected with one of a pair of intermeshing driving gears 383, 385. These gears are driven by a pinion 381 which engages one of them and which is driven by a motor 362 through a belt and pulley drive 391, 393 and a flexible shaft 364.

The clutches are both housed in a casing having end plates 397, 399 held in spaced parallel relationship by the five posts 401. The driving member of each clutch comprises an electromagnet 403 having a core 405 of magnetic material (such as soft iron) and an electrical winding 407. The core is fixed on a shaft 409 rotatably mounted on ball bearings 411, 413 in the end plates 397, 399. The driving gear 383 is fixed to the left end of the core by a pin 415 and this pin is also utilized for attaching the commutator or slip rings 417, 419 to the core. Both the slip rings and the driving gear are provided with central holes which receive the shaft 409. A spacer washer 421 maintains a predetermined clearance between the slip rings and the end plate 397. The two slip rings are insulated from each other by an intermediate ring of electrical insulating material 423 and are insulated from the gear 383 by a plate or washer 425, also of electrical insulating material. The inner slip ring 417 is electrically connected to one end of the winding 407 by a lead 427; the other end of the winding is attached to the outer slip ring 419 by a lead 429. The inner slip ring is electrically insulated from the shaft and from the pin 415 by an inner ring of insulating material concentric with the outer insulating ring 423. The slip rings rotate with the core 405 but are electrically insulated therefrom.

Current is supplied to the winding 407 by carbon brushes 431, 433 which are carried by an insulating member 444 and which are biased against slip rings 417, 419 respectively by springs 435, 437. Though the driven member of the clutch rotates continuously during operation, current from leads 439, 441 may readily pass into and out of the winding 407 by way of the brushes 431, 433 and the slip rings 417, 419.

The driven member 443 of the clutch comprises an annular plate carried by a spider 445 mounted on a ball bearing 447. The plate is fastened to the respective spider arms by pins 449. Compression springs 451 urge the plate 443 toward the end plate 453 of the core 405, though not so strongly as to create any appreciable friction therebetween when the winding 407 is not energized. The spider 445 is provided with an extension collar on which is mounted the intermediate clutch gear 375 or 377 and this gear is locked to the collar by a sleeve 457 which telescopes thereover with a tight fit and which is supported from shaft 409 by ball bearing 459. Spacers 461, 463 and 465 locate the bearings 447, 459 and associated parts relative to the end plates 397, 399 of the clutch casing and relative to the core 405 of the driven clutch member. The end plate 453 of the core is provided with an annular insert 467 of brass or similar non-magnetic material, in effect forming an annular gap in the magnetic material or magnetic envelope around the winding 407. The cylindrical iron shell around the winding forms the outer leg of this magnetic envelope. The plate of the driven clutch member 443 is so located as to bridge this annular gap, forming a highly permeable path of the magnetic flux that attempts to cross it when the winding is energized. This construction causes the clutch plate to become bound to the end plate when current is flowing through the winding 407, thus engaging the clutch to transmit torque between the driving and driven members. A thin sheet of paper 469 impregnated with graphite grease is interposed between the two clutch plates so that they will provide a smooth flow of power without grabbing or chatter. The clutches always slip but the torques transmitted vary with their energization. The construction of both magnetic clutches is the same so what has been said above and what is shown in Figure 18 applies to both.

Referring to Figures 19 and 20, a tool post 471 is bolted on the top of the cross-slide and in it, on an axis parallel to the axis of the spindle 328, is mounted a tool shaft 473 on a plain bearing 475 and a ball bearing 477. The milling cutter 302 is fastened by a key 481 and nut 483 on one end of the tool shaft; and its other end is threaded to receive a nut 485 which, together with spacer 487, locates the shaft relative to the ball bearing 477. The spacer 487 butts against a cutter drive gear 489 which in turn abuts against a shoulder 491 on the shaft. The gear is keyed to the shaft by a key 493. A worm wheel 495 keyed to a drive shaft 497 mounted in ball bearings 499, 501 drives the gear 489. The worm wheel 395 is driven by the motor 362 through a belt 593 and pulleys 505 and a flexible shaft 366, as shown in Fig. 13.

It will be seen from the above that the carriage may be fed longitudnially toward the work, when the lathe is operating, by engaging the split nut with the lead screw by the handle 358. The cross-slide may be fed transversely, either toward or away from the work, by energizing one or the other of the electro-magnetic clutches which control the rotation of the cross feed screw, in either direction of rotation. The milling cutter is independently rotated, by a separate drive from the motor 362, and therefore if the split nut is engaged with the lead screw while the milling cutter is rotating the resulting cut may be controlled simply by varying the energization of or relative current flow through the electro-magnetic clutches which control the direction and rate of cross-feed of the slide and the milling cutter mounted thereon. Energization of the clutches is regulated by the circuit 319 at the top of Figure 25 to which signals are fed by a tracer head 368 on the arm 511 carried by the carriage.

In the form of the invention illustrated in Figures 13 to 25 of the drawings, the tracer 368 is actuated or guided by a fairing strip or flexure 304 whose longitudinal contour is determined by the relative sizes, shapes and locations of the blade elements of an untwisted template such as shown in Figures 11 and 12. The untwisted template 112' is mounted on a separate template shaft 314 which is coaxial with the spindle 328. At its inner end 517 the template shaft telescopes within the outer end 519 of the spindle and is supported thereby by means of a sleeve bearing (not shown). The outer end of the template shaft is supported in a sleeve bearing 521 in a supporting arm 523 carried by the frame 340. A separable joint in the template shaft is provided as shown at 525 so that the template 112' may easily be slipped into position on the shaft. It may then be locked in place by the set screw 527 and the shaft reassembled by rebolting the joint 525.

The template shaft is driven at the same speed as the spindle, though at adjustable angular positions with respect thereto, by a driving gear 529 on the spindle, a driven gear 531 on the template shaft, and a differential mechanism 330 which interconnects said gears. Mechanism 330 comprises a pair of countershaft gear units 535 and 537 each consisting of a large gear 539 or 541 and a small gear 543 or 545 integral therewith rotatably mounted on a countershaft 547. The small gears mesh respectively with the pinions 549, 551 fixed to a pair of differential shafts 553, 555 mounted in journals or bearing portions 557, 559, 561, 563 of a differential housing 565 which is keyed to the countershaft 547. The two differential shafts are connected together by a pair of intermeshing pinions 567, 569, the arrangement being such that power is transmitted from the driving gear 529 to the large gear 541 and the small gear 545, thence through the pinion 551 and differential shaft 555 to the intermeshing pinions 569, 567 and then through differential shaft 553 to pinion 549, from whence it is transmitted to the driven gear 531 by way of the integrally connected small and large gears 543, 539 and the idler gear (shown in Figure 24 between the gears 539 and 531). So long as the differential housing or cage 565 is held in the same angular position, the template shaft will be maintained by the gear train in a constant or fixed angular position relative to the spindle. Furthermore, the gear sizes are such that the template shaft will be driven by the spindle in the same direction of rotation and at the same speed.

Adjustment or variation of the angular position of template shaft 314 relative to the spindle 328 is accomplished by changing the angular position of the differential housing 565, which may be done at any time, regardless of whether or not the spindle and template shaft are rotating. The differential housing is keyed to the countershaft 547, as shown at 571, and this countershaft is rotatably mounted in bearings in the sideplates 573, 575 of the transmission frame or casing, which are secured to the supporting arm 523 of the main frame 340. Countershaft 547 projects through the right hand sideplate and has at its extended outer end a gear wheel 577 attached thereto. The gear is driven by a pinion 579 connected to a large circular rack 581 which meshes with a worm 583 driven by a motor 336 through a flexible shaft 587 and a gear train 589, 591. The worm 583, rack 581 and pinion 579 are all mounted on shafts carried by a casing 593 secured to the sideplate 575. The arrangement is such that when the motor is energized, the pinion and gear turn the flexible shaft 587, which in turn drives the worm 583, rack 581, pinion 579 and countershaft drive gear 577, causing the countershaft and the differential housing 565 fixed thereto to rotate and thereby change the angular position of the template shaft relative to the spindle.

The motor 336 is reversible; when it rotates in one direction the template shaft is rotated in one direction relative to the spindle and when it rotates in the other direction the template shaft is rotated in the other direction relative to the spindle. This angular adjustment ordinarily involves only a matter of a few degrees and the arrangement shown provides a high degree of accuracy in controlling the relative angular positions over such a small range of angular adjustment.

Energization of the motor 336 and consequently the adjustments of the angular position of the template shaft relative to the spindle are controlled by the circuit 338 shown at the bottom of Figure 25 to which signals are fed by a tracer head 370 on the arm 597 carried by the carriage 322. The tracer is actuated or guided by a flexure 334 comprising a thin, highly flexible spring steel strip held on the north and south knife edge poles of the permanent magnet strips of steel or Alnico 372, 374, 376 and 378. These permanent magnet strips are fixed by an adjustable connection in transverse slots of a block 380 which is bolted to a plate 611 secured to the frame 340. The block may be adjusted longitudinally of the machine by means of the slot 613, through which the attachment bolts 615 pass. The magnet strips may be adjusted transversely of the machine by loosening the cap screws which hold the cover plate 617 in place on the block, shifting the strips in and out of their slots, and binding them in place by tightening the cap screws to force the cover down to grip the strips between the cover and the bottoms of the slots.

The circuit 338 shown at the bottom of Figure 25 controls the motor 336 in response to signals from the tracer head 370 so as to maintain a spark gap of substantially constant length between the point 619 of the tracer electrode 362 and the curved outer surface of the flexure 334. The tracer head is originally set by loosening the set screw 623 and turning the hand wheel 625 to adjust the micrometer cap 627 so that the electrode point 619 carried by its spindle 370 is at a predetermined distance from the flexure when the carriage is at that position in which the point of the electrode is at the first station, opposite the first magnet strip 372, corresponding to the first blade element of the template. This predetermined distance is made equal to the length of the spark gap which will be maintained by the circuit 338. The arrangement is such that as the carriage is fed longitudinally by the lead screw toward the work during a cutting operation a spark will be initiated between the flexure and the electrode as the point 619 of the electrode reaches a longitudinal position opposite the magnet strip 372. As the longitudinal carriage movement is continued the motor 336 will be operated in response to signals from the spark gap so as to maintain the spark gap substantially constant. If, for example, the spark gap shortens, the motor will rotate the gear 589 which rotates the shaft 631 and the gear 633 locked thereto by set screw 623. This causes the micrometer gear 635 and the micrometer thimble 627 keyed thereto at 637 to rotate and feed the micrometer spindle 370 away from the flexure so as to increase the spark gap to its selected length. Barrel 629 of the micrometer is rigidly mounted or fixed to the arm 597 (see Figure 13) by a press fit at 639. If the spark gap lengthens, the resulting signal causes the motor to rotate in the opposite direction to adjust the position of micrometer spindle 370 relative to the arm 597 and tracer head frame 641 (comprising side plates 643, 645 supported by posts 647) in a similar manner but in the opposite direction, so as to decrease the spark gap to its selected length. Consequently, the electrode point 619 will be caused to follow the curve of the flexure and will be maintained at a substantially constant distance therefrom as the carriage is fed toward the headstock. But each adjusting movement of the electrode point is accomplished by the motor 336 and involves a rotation, in one or the other direction, of the shaft 631 and as this shaft is connected to the flexible shaft 587 a consequent and corresponding adjustment is made of the differential housing 565 which results in a change in the angular position of the template shaft 314 relative to the spindle 328. Thus, by setting the magnetic strips 372, 374, 376, 378, or twist sliders, to relative positions which differ by transverse distances which represent the amount of twist the blade should have between the successive blade elements of the template, the template shaft will gradually be adjusted angularly or rotated relative to the spindle by an angle equal to the amount of the twist the blade is intended to have, as the carriage and the tracer heads 368 and 370 move longitudinally from one blade element station to the next. The effect is, that though the template blank is untwisted, the milling cutter is fed transversely or cross fed so as to gradually "retwist" the blade it is cutting as the cutter moves from each longitudinal station to the next. If the blade to be made has a very low rate of twist or no twist the retwisting mechanism 310 and 330 would have little or no effect and might even be omitted, if desired. In that case, a twisted template as shown in Figures 8 and 9 can be used on the template shaft in place of the untwisted template 112' and, if desired, the differential may be omitted and the template shaft fastened directly to the spindle. However, if a blade having a high rate of twist is to be formed, it is desirable to use the untwisted template of Figures 11 and 12 on the template shaft and to utilize in combination therewith the retwisting mechanism comprising the tracer, the flexure, and the differential mechanism.

Regardless of whether or not the retwisting mechanism is used, the cross-feed of the carriage is so controlled that the center of the milling cutter follows a path of the same shape or contour as that presented by the outer surface of the contouring flexure 304, as the carriage is fed toward the headstock by the lead screw. This is accomplished by the circuit 318 at the upper part of Figure 25, which regulates the relative energization of the electro-magnetic clutches 324, 326 in response to signals from the tracer head 368 so as to feed the cross-slide 320 in or out and maintain the spark between the point 649 of the electrode 316 at a predetermined distance from the outer curved surface of the contouring flexure. The arm 511 upon which the tracer head 368 is mounted is carried by the cross-slide and therefore the two are moved together, longitudinally by the carriage and transversely by the cross-feed screw.

The contouring flexure is held by the north and south knife edge poles of magnetic strips 382, 384, 386, 388, or contour sliders, which are slidably mounted in four transverse slots in a block 390 secured to a plate 663 carried by bars 665, 667 bolted to the supporting arm 523. A cover plate 669 is provided to retain the slider strips in their slots but in this case the slots are slightly deeper than the strips so that the strips may be freely slid back and forth in their respective slots even after the cover plate is bolted down tightly. The four magnet strips have at their inner ends four follower members 306, 308, 310, 312 respectively pinned to the magnet strips, as shown for the strip 308 at 679, 681. The followers are circular, or have circular bearing edges and are of equal diameters. Furthermore, the radius of the followers is the same as that of the circular milling cutter. Thus, when the milling-cutter center is caused by the contouring flexure to follow the locus of the follower centers the milling cutter will machine a surface on the work which is the same as that of a complete template which would produce the locus of follower centers defined by the contour of the flexure 304.

The followers, and consequently the slider strips to which they are respectively attracted, are each biased into engagement with the respective blade elements of the template by springs 683, 685, 687, 689 which at one end engage the respective pins (as at 681) attaching the followers to the strips and at the other end engage the inner surface of the block 399. As the template is rotated, the followers are moved in or out to varying positions determined by the profiles of the respective blade elements of the template. The sliders are of course also moved simultaneously with the followers with the result that the flexure 304 for any given angular position of the template has an outer contour or shape which represents a smooth curve through the follower centers at the positions to which they are deflected by the four blade elements on the template. Furthermore, the flexure is elastic and of uniform dimensions and properties so that it interpolates the positions between the sliders or forms a smooth curve defining the positions of the imaginary follower centers as well as those actually present. Thus while the template bears only four computed blade elements, the contouring flexure represents the follower center locations for an infinite number of blade elements, the four computed ones plus an infinite number of imaginary intermediate ones. While the position and curvature of the strip are determined by the relative shape, size and location of the computed blade elements on the template, the strip itself represents the location of the follower centers. This is true for any given angular position of the template. When the template is stationary the flexure represents only the locus of the follower centers for that particular angular position of the template. However, as the template is rotated the flexure successively assumes shapes representing the loci of follower center positions for the infinite number of successive template positions. By using a sufficiently slow longitudinal feed of the carriage relative to the rate of rotation of the work and the template, the work will be machined by the milling cutter (which preferably rotates faster than the work) not only to the exact shape and size of the four computed blade elements on the template at locations corresponding thereto but also to the proper shape and size of an infinite number of intermediate blade elements the follower center locations for which are defined by the varying curvature of the flexure. There is no reduction or increase in scale; the master blade formed by the milling cutter is the same size as the template, except that, if an envelope of metal has been added to the template in the pantograph operation as described above it may be removed or eliminated with the contouring machine quite simply, merely by using a cutter whose radius is greater than the follower radius by an amount equal to the thickness of envelope to be removed. This same means can be used to provide or add an envelope on the master blade while using a template of the computed size, in which case the radius of the cutter is decreased relative to the follower radius. To facilitate the initial setting-up of the machine and the taking of roughing and finish cuts, a screw threaded adjustment is provided on the electrode support to enable it to be shifted transversely with respect to its support.

The circuit 316 which controls the motion of the milling cutter in accordance with the shape of the contouring flexure is shown in such detail in Figure 25 as to require only a brief description, particularly in view of the fact that this circuit is similar in basic principle to the circuit 162 previously described.

The spark gap between the contouring electrode 316 and the contouring flexure 304 is energized as before, from a source of relatively high steady direct current voltage. As shown graphically in Figure 25A, the characteristics of the spark gap are such that the current varies inversely with gap length in a uniform manner over a certain range of gap lengths, and the circuit is designed so that the gap between the electrodes is regulated or maintained at a length within such range; in the example of the drawing the spark length is maintained at about .0015" length.

Signals from the spark gap caused by voltage variations at the electrode 316 resulting from changes in the current flow which occur when the spark length increases or decreases above or below its pre-selected value are imposed on the grid of the cathode follower tube 217' and the resulting proportional signals in the lead 231' are used to control the grid of the first of the two triodes in the common bottle or envelope 701. The resulting output signals in the cathode lead 241' and the plate lead 239' though proportional to the signal in leads 231' and 215', are opposite in phase, due to the phase inversion action of the tube upon the signal in the plate lead. As in the case of Figure 10, the tubes in Figure 25 subsequent to the input tube 217' are powered from a separate power source through the lead 227'.

The inverted signal in plate lead 239' of the first triode in tube 701 is passed through a stabilizing network comprising a pair of condensers 233' and 703 connected in series and then to the grid 705 of the second triode in the tube 701. The first condenser 233' creates a leading signal which is proportional to the rate of change (velocity) of the input signal in the leads 215', 231'. The second condenser 703 creates a further leading signal which is proportional to the rate of change of the rate of change (acceleration) of the input signal in the leads 215', 231'. Thus the signal applied to the grid 705 is doubly differentiated and represents a voltage proportional to the acceleration of the signal voltage taken off from the electrode 316. This leading or differentiated voltage signal is still inverted; however, it appears in its original phase in the plate output lead 707 of the second triode of tube 701, again because of the inherent inversion characteristic of the tube upon its plate signal.

The direct signal from the cathode resistor 709 of the first triode of tube 701 is applied by lead 711 to the control grid 713 of the pentode 715.

The differentiated and reinverted signal from the plate lead 707 of the second triode of the tube 701 is applied to the screen grid 717 of the pentode 715. A suppressor grid 719 may also be provided in the pentode, for the usual purpose.

The action of the pentode is to algebraically add the direct signal tapped from the cathode resistor 709 to the amplified leading or differentiated signal coming from the stabilizing network 239', 233', 703. Thus the pentode output signal tapped off by the lead 721 between the cathode resistors 723, 725 of the pentode 715 represents the sum of the direct signal in resistor 709 and the stabilizing signal in lead 707. The plate output signal of the pentode, tapped off by the lead 727 from the voltage divider 729, 731, also represents the sum of the direct signal input plus the stabilizing signal; however, this pentode plate output signal is inverted, or of opposite phase, relative to the signal in the cathode output lead 721.

The two output signals from the pentode are applied, respectively, to the grids 733, 735 of a pair of beam power amplifier tubes 737, 739 where they are amplified and then passed through the leads 439, 741 to the respective clutch coils of the electro-magnetic clutches 324, 326 of the cutter feed servo. Because the signals applied through leads 721, 727 to the beam power tubes are opposite in phase the resultant current change will be increasing in one clutch coil and decreasing in the other clutch coil, though both currents will change in accordance with the algebraic sum of the signal deviation (or the error) and the acceleration of the signal deviation (or the rate of change of the rate of change of the error).

Of course the connections are so made, relative to the direction of rotation of the cutter feed motor, that a signal resulting from excessive spark length will increase the current flow through the in-feeding clutch and simultaneously decrease the current flow through the out-feeding clutch; while a signal resulting from insufficient spark length will have the opposite effect.

No filter condenser is provided in circuit 318. The electrode tip is preferably made of very small dimensions, insulated from the main body of the electrode, and this when taken in combination with the arrangement shown in which the resistors 166' and 164' are located immediately adjacent the electrode provides a low reactance in that part of the circuit adjacent the spark gap and reduces the oscillating component of the spark to a very low, negligible, value.

A gain adjustment may be provided in the circuit 318 by making resistor 709 variable, as shown. A damping adjustment may be similarly provided as shown by the variable resistor 743, connected from a point intermediate the condensers in the stabilizing network to ground. Bias batteries 745, 747 are provided to help bring the current in the non-driving clutch to zero. A voltmeter 749 is provided to facilitate balancing of the beam power tubes.

It will be seen that the contouring servo circuit 318 contains certain refinements not utilized in the basic servo circuit 162 shown in Figure 10. These refinements are provided primarily to increase the speed of response and to maintain stability; i. e. to provide for rapid operation with extremely accurate control of spark length.

The twist servo control circuit does not need the refinements of the circuit 318 or even those of the basic circuit 162, because this is a slow acting, on-off system which does not need or rely upon a steady voltage variation over an appreciable spark range. Therefore, the signal from the spark gap (between the electrode tip 332 and the twist flexure 334) can be taken off from the electrode through a voltage divider comprising the resistor 164'' and the resistor 751, and the resultant small current flow bled off from the electrode can safely be neglected. The signal from the voltage divider is applied directly to the grid 753 of the amplifying tube 755; no stabilizing components are introduced into the signal, because they are not required in the twist servo system.

The current flow through the tube 755 passes through a pair of solenoid windings 757, 759 connected in series in the cathode lead 761. Thus, as the signal on grid 755 increases the current flow through the solenoids also increases. One of the solenoids (757) is by-passed by an adjustable resistor 763, with the result that that solenoid will be operated (its iron core 765 pulled downward) at a higher rate of cathode current flow than required to shift the iron core 767 of the other solenoid.

Each of the two iron cores (which are respectively biased upwardly by springs 769, 771) carries a double pole switch, illustrated respectively at 773 and 775. These switches control the current flow from battery 777 to the six volt reversible direct current motor 336 which actuates both the twist electrode 332 and the adjusting means of the differential 330.

The positions of the switches 773, 775 as shown in Figure 25 are those assumed when the spark length is below its predetermined value, and the motor 336 is so connected to battery 777 (through leads 781, 783, and 785, 787) as to cause the motor to run in a direction which moves the electrode away from the flexure, so as to return the spark gap to the proper length.

As the spark gap lengthens the resulting increasing voltage on grid 753 causes the current flow through tube 755 to increase until solenoid 759 is energized sufficiently to pull core 765 down and shift switch 773 to its lowermost position, in which lead 781 is disconnected from lead 783 and the current flow through motor 336 is cut off and the motor stops. The spark gap should then be at its proper, or predetermined length.

If the spark length shortens again below the selected value the current through tube 755 decreases and spring 769 pulls the switch 773 upwardly to again operate motor 336 in the spark lengthening direction.

But if the spark length increases above the preselected value, the current through tube 755 further increases until it operates the solenoid 757 as well as the solenoid 759 with both of the cores 765, 767 and the switches 773, 775 being held in their lowermost positions. Battery lead 781 will then be connected to the motor lead 783 and battery lead 789 to motor lead 787, thus reversing the connections between the battery and the motor and causing the motor to run in the opposite direction so as to move the electrode toward the flexure until the spark gap again is at its proper length. Thus the circuit 338 uses a signal which is a function of spark length to regulate the flow of current through the tube 755 and this current flow is caused to operate the motor in one direction if it exceeds a given value, to operate the motor in the other direction if it is below said given value, or to maintain said motor stationary for current flows of the given value.

Specific description of the inspection machine

The inspection machine is very similar in construction to the template making machine; in fact the inspection machine and method of Figures 28 to 31 may be regarded as a modified form or species of the template making machine and method of Figures 1 to 12.

In the inspection machine, the work (blade 300) and the table are mounted on a shaft 128' for rotation about a common axis as before, and the tracer head 902 and the recording head 904 are interconnected by a parallel linkage comprising link 107', the ways 109' of the frame which extend parallel to the link 107', and the parallel arms 134', 136'. Recording arm 924 which carries the recording head is fixed to parallel arm 136' for rotation therewith about the pivot 138'. Bar 922 which carries the tracer head is clamped and keyed to the shaft 126' for rotation therewith about the pivotal axis 140' of the parallel arm 134'. As the parallel arm 134 is also fixed to the rotatable shaft 128', by the pin 901, the tracer head and the parallel arm 134' are held in fixed angular relationship (which may be adjusted by the connection 928) for rotation about the common axis 140'. The parallel arms are interconnected by the link 107' so rotation of the follower center 127' of the tracer head about the axis 140' will cause an equal and corresponding adjustment of the recorder center 142' about the axis 138'. As in the case of the template making machine, the sides of the triangle formed in the inspection pantograph by the axis of rotation 110', the pivotal axis 140' of the follower, and the follower center 127' are parallel to the respective sides of the triangle formed by the axis of rotation 110', the pivotal axis 138' of the recorder, and the recorder center 142'. These two triangles are geometrically similar and therefore a movement of the follower center at an apex of one will cause a duplicate movement (though on a different scale) of the recorder center at the corresponding apex of the other.

The follower 906 of Figures 28 to 31 is preferably formed as a small circular metal disc so arranged as to be capable of reaching each point on the profile of a blade element of the blade 300 as the latter is rotated. The follower is mounted on the bar 922 but electrically insulated therefrom by insulation 912. Bar 922 is adjustable axially of the shaft 126' and may be clamped in a selected axial position at which the plane of the follower 906 is at the height of the blade element whose profile is to be determined.

Table 130' in Figures 28 to 31 is driven by motor 146' through a reduction gear and chainbelt arrangement like that shown in Figure 6 for the template pantograph. Also, the parallel linkage or follower drive in Figures 28 to 31 is like that shown for the template pantograph in Figure 6, with the motor 170' driving the sector 159 through a reduction gear and friction wheel. The follower drive motor 170' in the inspection pantograph is controlled by a servo-circuit 162" responsive to signals received from the spark gap between the periphery of the follower and the surface of blade 300, the arrangement being such that the spark gap is maintained at a substantially constant length, for example, about .0015", so that the follower describes a path determined by the blade element profile without actually touching the blade.

The circuit 162" and its associated means for maintaining a direct current potential across the gap between the follower and the blade (for instance the open circuit voltage across the gap may be of the order of 800 volts) may be the same as the circuit 162 of the template making machine, which circuit is fully described elsewhere herein.

Conclusion

As will be apparent to those skilled in the art, the invention is not limited to the specific embodiments herein illustrated and described nor are the novel elements disclosed necessarily limited in use to the particular combinations and purposes set forth. Therefore, it is to be understood that the invention is not limited to the forms specifically described above in illustration of its principles but may be used, either wholly or partly, in other ways without departure from its spirit as defined by the following claims.

I claim:

1. In a machine for shaping a workpiece with a predetermined contour, the combination of a pattern having a contour extending in two coordinate directions, an electrically conductive tracer having an edge positioned to face the contour of the pattern, means for effecting relative movement between the tracer and the pattern in one coordinate direction, means for connecting the tracer in an electric circuit including a short spark gap at the said edge of the tracer which gap during the said relative movement between the tracer and the pattern tends to vary in length in accordance with the said contour of the pattern, means electrically responsive to variations in the length of the said spark gap for causing additional relative movements between the tracer and the pattern toward and from each other in the other coordinate direction so as to maintain the said gap length within predetermined narrow limits and so as to thus cause the tracer to follow the said contour of the pattern, and means controlled by the said relative movements between the tracer and the pattern in the said two coordinate directions for shaping a workpiece to provide a contour thereon corresponding to the said contour of the pattern.

2. In a machine for shaping a workpiece with a predetermined contour, the combination of a pattern having a contour extending in two coordinate directions, an electrically conductive tracer having an edge positioned to face the contour of the pattern, means for effecting relative movement between the tracer and the pattern in one coordinate direction, means for connecting the tracer in an electric circuit including a short spark gap at the said edge of the tracer, means electrically responsive to variations in the voltage drop across said spark gap during the said relative movement between the tracer and the pattern which means serves to cause additional relative movements between the tracer and the pattern toward and from each other in the other coordinate direction so as to maintain the said voltage drop within predetermined narrow limits and so as to thus maintain the length of the said gap within predetermined narrow limits with the result that the tracer follows the said contour of the pattern, and means controlled by the said relative movements between the tracer and the pattern in the said two coordinate directions for shaping a workpiece to provide a contour thereon corresponding to the said contour of the pattern.

3. In a machine for shaping a workpiece with a predetermined contour, the combination of a pattern having a contour extending in two coordinate directions, an electrically conductive tracer having an edge positioned to face the contour of the pattern, means for effecting relative movement between the tracer and the pattern in one coordinate direction, means for connecting the tracer in an electric circuit including a short spark gap at the said edge of the tracer which gap during the said relative movement between the tracer and the pattern varies in length in accordance with deviations from a predetermined optimum relationship between the said tracer edge and the said pattern, electrically responsive means for causing additional relative movements between the tracer and the pattern toward and from each other in the other coordinate direction which additional relative movements are responsive to the order and extent of the said deviations and are additionally responsive to the rate of the said deviations so as to maintain the said gap length within predetermined narrow limits and so as to thus cause the tracer to follow the said contour of the pattern, and means controlled by the said relative movements between the tracer and the pattern in the said two coordinate directions for shaping a workpiece to provide a contour thereon corresponding to the said contour of the pattern.

4. In a machine for shaping a workpiece with a predetermined contour, the combination of a pattern having a contour extending in two coordinate directions at angles to each other, an electrically conductive tracer having an edge positioned to face the contour of the pattern, means for moving the tracer relatively to the pattern in one coordinate direction, means for connecting the tracer in an electric circuit including a short spark gap at the said edge of the tracer which gap during the said movement of the tracer tends to vary in length in accordance with the said contour of the pattern, means electrically responsive to variations in the length of the said spark gap for causing additional movements of the tracer toward and from the pattern in the other coordinate direction so as to maintain the said gap length within predetermined narrow limits and so as to thus cause the tracer to follow the said contour of the pattern, and means controlled by the said movements of the tracer relatively to the pattern in the said two coordinate directions for shaping a workpiece to provide a contour thereon corresponding to the said contour of the pattern.

5. In a machine for cutting a workpiece with predetermined contours, the combination of a template having contours in parallel planes spaced in one coordinate direction which contours extend in second and third coordinate directions, an electrically conductive tracer having an edge positioned to face the said contours of the template, means for effecting relative movement between the tracer and the template in the said first coordinate direction so that the said tracer is successively in the said parallel contour planes, means for effecting relative movement between the tracer and the template in the said second coordinate direction, means for connecting the tracer in an electric circuit including a short spark gap at the said edge of the tracer which gap during the said first and second relative movements between the tracer and the template tends to vary in length in accordance with corresponding contours of the template, means electrically responsive to variations in the length of the said spark gap for causing additional relative movements between the tracer and the template toward and from each other in the said third coordinate direction so as to maintain the said gap within narrow predetermined limits and so as to thus cause the tracer to follow the said contours of the template, and means controlled by the said relative movements between the tracer and the template in the said three coordinate directions for cutting a workpiece to provide contours thereon corresponding respectively to the said contours of the template.

6. In a machine for cutting a workpiece with predetermined contours, the combination of a template having continuous closed contours in parallel planes spaced in a longitudinal coordinate direction which contours extend in second and third coordinate directions, the said template being rotatable about an axis perpendicular to the said planes, an electrically conductive tracer fixed against rotative movement with the template and having an edge positioned to face the said template contours, means for moving the tracer relatively to the template longitudinally in the said first coordinate direction so that the said tracer is successively in the said parallel contour planes, means for rotating the template to move it in the said second coordinate direction, means for connecting the tracer in an electric circuit including a short spark gap at the said edge of the tracer which gap during the longitudinal movement of the tracer and during rotative movement of the template tends to vary in length in accordance with corresponding contours of the template, means electrically responsive to variations in the length of the said spark gap for causing additional relative movements of the tracer toward and from the template in the said third coordinate direction so as to maintain the said gap length within narrow predetermined limits and so as to thus cause the tracer to follow the said contours of the template, and means controlled by the said rotative movement of the template and by the movements of the tracer in the first and third coordinate directions for cutting a workpiece to provide contours thereon corresponding respectively to the said contours of the template.

7. In a machine for shaping a workpiece with a predetermined contour, the combination of an electrically conductive pattern having a contour extending in two coordinate directions, an electrically conductive tracer having an edge positioned to face the contour of the pattern, means for effecting relative movement between the tracer and the pattern in one coordinate direction, means for connecting the tracer and the pattern in an electric circuit including a short spark gap between the said tracer edge and the said pattern which gap during the said relative movement between the tracer and the pattern tends to vary in length in accordance with the said contour of the pattern, means electrically responsive to variations in the length of the spark gap for causing additional relative movements between the tracer and the pattern toward and from each other in the other coordinate direction so as to maintain the said gap length within predetermined narrow limits and so as to thus cause the tracer to follow the said contour of the pattern, and means controlled by the said relative movements between the tracer and the pattern in the two said coordinate directions for shaping a workpiece to provide a contour thereon corresponding to the said contour of the pattern.

8. In a machine for shaping a workpiece with a predetermined contour, the combination of an electrically conductive pattern having a contour extending in two coordinate directions, an electrically conductive tracer having an edge positioned to face the contour of the pattern, means for effecting relative movement between the tracer and the pattern in one coordinate direction, means for connecting the tracer and the pattern in an electric circuit including a short spark gap between the said tracer edge and the said pattern, means electrically responsive to variations in the voltage drop across said gap during the said relative movement between the tracer and the pattern which means serves to cause additional relative movements between the tracer and the pattern holder toward and from each other in the other coordinate direction so as to maintain the said voltage drop within predetermined narrow limits and so as to thus maintain the length of the spark gap within predetermined narrow limits with the result that the tracer follows the said contour of the pattern, and means controlled by the said relative movements between the tracer and the pattern in the two said coordinate directions for shaping a workpiece to provide a contour thereon corresponding to the said contour of the pattern.

9. In a machine for shaping a workpiece with a predetermined contour, the combination of an electrically conductive pattern having a contour extending in two coordinate directions, an electrically conductive tracer having an edge positioned to face the contour of the pattern, means for moving the tracer relatively to the pattern in one coordinate direction, means for connecting the tracer and the pattern in an electric circuit including a short spark gap between the said tracer edge and the said pattern which gap during the said movement of the tracer tends to vary in length in accordance with the said contour of the pattern, means electrically responsive to variations in the length of the said spark gap for causing additional movements of the tracer toward and from the pattern in the other coordinate direction so as to maintain the said gap length within predetermined narrow limits and so as to thus cause the tracer to follow the said contour of the pattern, and means controlled by the said movements of the tracer relatively to the pattern in the said two coordinate directions for shaping a workpiece to provide a contour thereon corresponding to the said contour of the pattern.

10. A machine comprising in combination, a holder for an electrically conductive template having a predetermined fixed contour, an electrically conductive tracer adjacent the template holder and adapted to be positioned with an edge thereof immediately adjacent the said contour of a template on the holder, a holder for a workpiece upon which a contour is to be produced, a carrier for supporting a tool for engagement with a workpiece on the last said holder, means for effecting relative movement between the template holder and the tracer and for effecting proportionate relative movement between the workpiece holder and the tool carrier, means for connecting the template and the tracer in an electric circuit including a short spark gap between the template and the edge of the tracer which gap during the said relative movement between the template holder and the tracer tends to vary in length in accordance with the contour of the template, means electrically responsive to variations in the length of the said spark gap for causing additional relative movements of the tracer with respect to the template holder so as to maintain the said spark gap length within predetermined narrow limits and so as to thus cause the tracer to follow the contour of the template, and means controlled by the said additional relative movements of the tracer for effecting similar additional relative movements of the tool carrier with respect to the workpiece holder so as to enable the tool to produce a contour on the workpiece having a definite relationship to the said contour of the template.

11. A machine comprising in combination, a holder for an electrically conductive template having a predetermined fixed contour, an electrically conductive tracer adjacent the template holder and adapted to be positioned with an edge thereof immediately adjacent the said contour of a template on the holder which edge of the tracer is convex and has a predetermined radius of curvature, a holder for a workpiece upon which a contour is to be cut, a carrier for supporting a rotary cutting tool for engagement with a workpiece on the last said holder which tool has a radius with a predetermined proportional relationship to the said radius of the edge of the tracer, means for effecting relative movement between the template holder and the tracer and for effecting similar relative movement between the workpiece holder and the tool carrier, means for connecting the template and the tracer in an electric circuit including a short spark gap between the template and the edge of the tracer which gap during the said relative movement between the template holder and the tracer tends to vary in length in accordance with the contour of the template, means electrically responsive to variations in the length of the said spark gap for causing additional relative movements of the tracer with respect to the template holder so as to maintain the said spark gap length within predetermined narrow limits and so as to thus cause the tracer to follow the contour of the template, and means controlled by the last said additional relative movements of the tracer for effecting similar additional relative movements of the tool carrier with respect to the workpiece holder which last said additional relative movements have the aforesaid proportional relationship to the first said additional relative movements so as to enable the cutting tool to cut a contour on the workpiece having a definite relationship to the said contour of the template.

12. A machine comprising in combination, a holder for an electrically conductive template having a fixed contour in a predetermined plane, an electrically conductive tracer adjacent the template holder and adapted to be positioned with an edge thereof immediately adjacent the said contour of a template on the holder, a holder for a workpiece upon which a contour is to be produced in a predetermined plane, a carrier for supporting a tool for engagement with a workpiece on the last said holder, means for effecting relative movement between the template holder and the tracer in parallelism with the said template contour plane and for effecting proportionate similar relative movement between the workpiece holder and the tool carrier in parallelism with the second workpiece contour plane, means for connecting the template and the tracer in an electric circuit including a short spark gap between the template and the edge of the tracer which gap during the said relative movement between the template holder and the tracer tends to vary in length in accordance with the contour of the template, means electrically responsive to variations in the length of the said spark gap for causing additional relative movements of the tracer with respect to the template holder so as to maintain the said spark gap length within predetermined narrow limits and so as to thus cause the tracer to follow the contour of the template, and means controlled by the said additional relative movements of the tracer for effecting similar additional relative movements of the tool carrier with respect to the workpiece holder so as to enable the tool to produce a contour on the workpiece having a definite relationship to the said contour of the template.

13. A machine comprising in combination, a holder for an electrically conductive template having a continuous closed fixed contour in a predetermined plane which holder is rotatable about an axis perpendicular to the said plane, an electrically conductive tracer adjacent the template holder and adapted to be positioned with an edge thereof immediately adjacent the said contour of a template on the holder, a holder for a workpiece upon which a continuous closed contour is to be produced in a predetermined plane which holder is rotatable about an axis perpendicular to the said plane, a carrier for supporting a tool for engagement with a workpiece on the last said holder, means for rotating the template holder about its said axis and for proportionately rotating the workpiece holder about its said axis, means for connecting the template and the tracer in an electric circuit including a short spark gap between the template and the edge of the tracer which gap during the said rotative movement of the template holder tends to vary in length in accordance with the contour of the template, means electrically responsive to variations in the length of the said spark gap for causing relative movements of the tracer with respect to the template holder during rotation of the latter so as to maintain the said spark gap length within predetermined narrow limits and so as to thus cause the tracer to follow the contour of the template, and means controlled by the said additional relative movements of the tracer for effecting similar additional relative movements of the tool carrier with respect to the workpiece holder so as to enable the tool to produce a contour on the workpiece having a definite relationship to the said contour of the template.

14. A machine comprising in combination, a holder for an electrically conductive template having a continuous closed fixed contour in a predetermined plane which holder is rotatable about an axis perpendicular to the said plane, an electrically conductive tracer adjacent the template holder and adapted to be positioned with an edge thereof immediately adjacent the said contour of a template on the holder which edge of the tracer is convex and has a predetermined radius of curvature, a holder for a workpiece upon which a contour is to be cut in a predetermined plane which holder is rotatable about an axis perpendicular to the said plane, a carrier for supporting a rotary cutting tool for engagement with a workpiece on the last said holder which tool has a radius with a predetermined proportional relationship to the said radius of the edge of the tracer, means for rotating the template plate holder about its said axis and for proportionately rotating the workpiece holder about its said axis, means for connecting the template and the tracer in an electric circuit including a short spark gap between the template and the edge of the tracer which gap during the said rotative movement of the template holder tends to vary in length in accordance with the contour of the template, means electrically responsive to variations in the length of the said spark gap for causing relative movements of the tracer with respect to the template holder during rotation of the latter so as to maintain the said spark gap length within predetermined narrow limits and so as to thus cause the tracer to follow the contour of the template, and means controlled by the said additional relative movements of the tracer for effecting similar additional relative movements of the tool carrier with respect to the workpiece holder which last said relative movements have the aforesaid proportional relationship to the first said relative movements so as to enable the cutting tool to cut a contour on the workpiece having a definite relationship to the said contour of the template.

15. A machine comprising in combination, a holder having a face for supporting a drawing having thereon an electrically conductive line with a predetermined contour, an electrically conductive tracer adjacent the said face of the holder and having an edge portion arranged for at least approximate engagement with a drawing on the said holder face, a holder for a workpiece upon which a contour is to be produced, a carrier for supporting a tool for engagement with a workpiece on the last said holder, means for effecting relative movement between the drawing holder and the tracer in a direction parallel to the said drawing holder face and for effecting proportionate relative movement between the workpiece holder and the tool carrier, means for connecting the tracer and a conductive line on a drawing supported on the drawing holder face in an electric circuit including a short spark gap between the said edge portion of the tracer and the said drawing line which gap during the said relative movement between the drawing holder and the tracer tends to vary in length in accordance with the contour of the conductive line on the drawing, means electrically responsive to variations in the length of the said spark gap for causing additional relative movements of the tracer with respect to the drawing holder so as to maintain the said spark gap length within predetermined narrow limits and so as to thus cause the tracer to follow the contour of the said conductive line on the drawing, and means controlled by the said additional relative movements of the tracer for effecting similar additional relative movements of the tool carrier with respect to the workpiece holder so as to enable the tool to produce a contour on the workpiece having a definite relationship to the said contour of the said conductive line on the drawing.

16. A machine comprising in combination, a table having a face in a predetermined plane for supporting a drawing having thereon an electrically conductive line with a predetermined contour, an electrically conductive tracer adjacent the said plane of the table and having an edge portion arranged for at least approximate engagement with a drawing on the said table face, a holder for a workpiece upon which a contour is to be produced in a predetermined plane, a carrier for supporting a tool for engagement with a workpiece on the said holder, means for effecting relative movement between the table and the tracer in parallelism with the said plane of the table face and for effecting proportionate relative movement between the workpiece holder and the tool carrier in parallelism with the said workpiece contour plane, means for connecting the tracer and a conductive line on a drawing supported on the table face in an electric circuit including a short spark gap between the said edge portion of the tracer and the said drawing line which gap during the said relative movement between the table and the tracer tends to vary in length in accordance with the contour of the conductive line on the drawing, means electrically responsive to variations in the length of the said spark gap for causing additional relative movements of the tracer with respect to the table so as to maintain the said spark gap length within predetermined narrow limits and so as to thus cause the tracer to follow the contour of the said conductive line on the drawing, and means controlled by the said additional relative movements of the tracer for effecting similar additional relative movements of the tool carrier with respect to the workpiece holder so as to enable the tool to produce a contour on the workpiece having a definite relationship to the said contour of the said conductive line on the drawing.

17. A machine as set forth in claim 16, wherein the tracer comprises a thin sheet of material having a conductive edge and positioned for direct engagement with an electrically conductive line drawing on the face of the table.

18. A machine as set forth in claim 16, wherein the tracer comprises a thin sheet of material positioned for direct engagement with an electrically conductive line drawing on the face of the table which sheet has an electrically conductive line drawn thereon at its edge.

19. A machine as set forth in claim 16, wherein the tracer is biased for movement toward the face of the table and comprises a thin sheet of material initially arched and having a conductive edge, the said sheet of material being flattened by the bias of the tracer and being thus held in close engagement with a drawing on the table.

20. A machine comprising in combination, a table having a face in a predetermined plane for supporting a drawing having thereon an electrically conductive line with a predetermined contour, an electrically conductive tracer adjacent the said plane of the table and having an edge portion arranged for at least approximate engagement with a drawing on the said table which edge of the tracer is convex and has a predetermined radius of curvature, a holder for a workpiece upon which a contour is to be cut in a predetermined plane, a carrier for supporting a rotary cutting tool for engagement with a workpiece on the said holder which tool has a radius with a predetermined proportional relationship to the said radius of the edge of the tracer, means for effecting relative movement between the table and the tracer in parallelism with the said plane of the table and for effecting similar relative movement between the workpiece holder and the tool carrier in parallelism with the said workpiece contour plane, means for connecting the tracer and a conductive line on a drawing supported on the table in an electric circuit including a short spark gap between the said edge portion of the tracer and the said line which gap during the said relative movement between the table and the tracer tends to vary in length in accordance with the contour of the conductive line on the drawing, means electrically responsive to variations in the length of the said spark gap for causing additional relative movements of the tracer with respect to the table so as to maintain the said spark gap length within predetermined narrow limits and so as to thus cause the tracer to follow the contour of the said conductive line on the drawing, and means controlled by the said additional relative movements of the tracer for effecting similar additional relative movements of the tool carrier with respect to the workpiece holder which last said additional relative movement has the aforesaid proportional relationship to the first said relative movement so as to enable the tool to produce a contour on the workpiece having a definite relationship to the said contour of the said conductive line.

21. A machine comprising in combination, a table having a face in a predetermined plane for supporting a drawing having thereon an electrically conductive line with a continuous closed contour which table is rotatable about an axis perpendicular to the said plane, an electrically conductive tracer adjacent the said plane of the table and having an edge portion arranged for at least approximate engagement with a drawing on the said table face, a holder for a workpiece upon which a contour is to be produced in a predetermined plane which holder is rotatable about an axis perpendicular to the said plane, a carrier for supporting a tool for engagement with a workpiece on the said holder, means for rotating the table about its said axis and for rotating the workpiece holder about its said axis, means for connecting the tracer and a conductive line on a drawing supported on the table in an electric circuit including a short spark gap between the said edge portion of the tracer and the said line which gap during the said rotative movement of the table tends to vary in length in accordance with the contour of the conductive line on the drawing, means electrically responsive to variations in the length of the said spark gap for causing relative movements of the tracer with respect to the table during table rotation so as to maintain the said spark gap length within predetermined narrow limits and so as to thus cause the tracer to follow the contour of the said conductive line on the drawing, and means controlled by the said additional relative movements of the tracer for effecting similar relative movements of the tool carrier with respect to the workpiece holder so as to enable the tool to produce a contour on the workpiece having a definite relationship to the said contour of the said conductive line.

22. An apparatus comprising in combination, a drawing having an electrically conductive line with a predetermined contour on one face thereof, an electrically conductive tracer arranged for at least approximate engagement with the conductive line of the said drawing, a holder for a workpiece upon which a contour is to be produced, a tool for engagement with a workpiece on the last said holder, means for effecting relative movement between the drawing and the tracer in a direction parallel to the said drawing face and for effecting proportionate relative movement between the workpiece holder and the tool, means for connecting the tracer and the said conductive drawing line in an electric circuit including a short spark gap between them which gap during the said relative movement between the drawing and the tracer tends to vary in length in accordance with the contour of the said conductive line, means electrically responsive to variations in the length of the said spark gap for causing additional relative movements of the tracer with respect to the drawing so as to maintain the said spark gap length within predetermined narrow limits and so as to thus cause the tracer to follow the contour of the said conductive line, and means controlled by the said additional relative movements of the tracer for effecting similar additional relative movements of the tool with respect to the workpiece holder so as to enable the tool to produce a contour on the workpiece having a definite relationship to the said contour of the said conductive line.

23. An apparatus comprising in combination, a table having a flat face, a drawing supported on the table face and having thereon an electrically conductive line with a predetermined contour, an electrically conductive tracer adjacent the said face of the table and arranged for at least approximate engagement with the conductive line of the said drawing, a holder for a workpiece upon which a contour is to be produced in a predetermined plane, a tool for engagement with a workpiece on the said holder, means for effecting relative movement between the table and drawing and the tracer in parallelism with the said table face and for effecting proportionate relative movement between the workpiece holder and the tool in parallelism with the said workpiece contour plane, means for connecting the tracer and the said conductive drawing line in an electric circuit including a short spark gap between them which gap during the said relative movement between the table and drawing and the tracer tends to vary in length in accordance with the contour of the said conductive line, means electrically responsive to variations in the length of the said spark gap for causing additional relative movements of the tracer with respect to the table and drawing so as to maintain the said spark gap length within predetermined narrow limits and so as to thus cause the tracer to follow the contour of the said conductive line, and means controlled by the said additional relative movements of the tracer for effecting similar additional relative movements of the tool with respect to the workpiece holder so as to enable the tool to produce a contour on the workpiece having a definite relationship to the said contour of the said conductive line.

24. An apparatus comprising in combination, a table having a flat face, a drawing supported on the table face and having thereon an electrically conductive line with a predetermined contour, an electrically conductive tracer adjacent the said face of the table and arranged for at least approximate engagement with the conductive line of the said drawing which edge of the tracer is convex and has a predetermined radius of curvature, a holder for a workpiece upon which a contour is to be cut in a predetermined plane, a rotary cutting tool for engagement with a workpiece on the said holder which tool has a radius with a predetermined proportional relationship to the said radius of the edge of the tracer, means for effecting relative movement between the table and drawing and the tracer in parallelism with the said table face and for effecting proportionate relative movement between the workpiece holder and the tool in parallelism with the said workpiece contour plane, means for connecting the tracer and the said conductive drawing line in an electric circuit including a short spark gap between them which gap during the said relative movement between the table and drawing and the tracer tends to vary in length in accordance with the contour of the said conductive line, means electrically responsive to variations in the length of the said spark gap for causing additional relative movements of the tracer with respect to the table and drawing so as to maintain the said spark gap length within predetermined narrow limits and so as to thus cause the tracer to follow the contour of the said conductive line, and means controlled by the said additional relative movements of the tracer for effecting similar additional relative movements of the tool with respect to the workpiece holder which last said additional relative movement has the aforesaid proportional relationship to the first said relative movement so as to enable the tool to produce a contour on the workpiece having a definite relationship to the said contour of the said conductive line.

25. An apparatus comprising in combination, a table having a flat face and rotatable about an axis perpendicular to the said face, a drawing supported on the table face and having thereon an electrically conductive line with a continuous closed contour, an electrically conductive tracer adjacent the said face of the table and arranged for at least approximate engagement with the conductive line of the drawing, a holder for a workpiece upon which a contour is to be produced in a predetermined plane which holder is rotatable about an axis perpendicular to the said plane, a tool for engagement with a workpiece on the said holder, means for rotating the table and drawing about the said table axis and for rotating the workpiece holder about its said axis, means for connecting the tracer and the said conductive drawing line in an electric circuit including a short spark gap between them which gap during the said rotative movement of the table tends to vary in length in accordance with the contour of the said conductive line, means electrically responsive to variations in the length of the said spark gap for causing relative movements of the tracer with respect to the table and drawing during table and drawing rotation so as to maintain the said spark gap length within predetermined narrow limits and so as to thus cause the tracer to follow the contour of the said conductive line, and means controlled by the said additional relative movements for effecting similar relative movements of the tool with respect to the workpiece holder so as to enable the tool to produce a contour on the workpiece having a definite relationship to the said contour of the said conductive line.

26. The hereindescribed method of producing a contour on a workpiece, which method comprises the steps of providing a nonconductive drawing sheet having an electrically conductive line thereon with a predetermined contour, connecting the said conductive drawing line and an electrically conductive tracer in an electric circuit including a short spark gap between the said line and the said tracer, effecting relative movement between the drawing and the tracer in one direction, utilizing the current in the said circuit for relatively moving the tracer in another direction to maintain the length of the spark gap within predetermined narrow limits so that the tracer follows the contour of the said line, and utilizing the said tracer for controlling a cutter to cause it to cut a contour on the workpiece having predetermined contour and size relationship to the contour of the said conductive line.

27. The hereindescribed method of producing different contours at longitudinally spaced positions on a rotatable workpiece, which method comprises the steps of providing a plurality of different contour lines on an initial drawing in predetermined relationship to each other and to a reference point corresponding to the axis of workpiece rotation, successively tracing on transparent nonconductive drawing sheets electrically conductive lines conforming respectively to the said contour lines and the said reference point on the initial drawing which sheets are successively supported on a rotatable holder with their said reference points at the axis of holder rotation, and electroresponsively utilizing the respective conductive lines drawn on the last said sheets for successively controlling a cutter to cause it to cut contours at longitudinally spaced positions on the workpiece which last said contours have a predetermined contour and size relationship to the contours of the lines on the initial drawing and are in a predetermined angular relationship to the last said lines.

28. The hereindescribed method of producing different contours at longitudinally spaced positions on a rotatable workpiece, which method comprises the steps of providing a plurality of different contour lines on an initial drawing disposed on a drawing holder rotatable with the workpiece which lines are in predetermined relationship to each other and to the axis of rotation, successively placing transparent nonconductive drawing sheets on the said initial drawing and tracing electrically conductive lines on the said sheets conforming respectively to the said contour lines on the drawing, and electroresponsively utilizing the respective conductive lines drawn on the last said sheets for successively controlling a cutter to cause it to cut contours at longitudinally spaced positions on the workpiece which last said contours have a predetermined contour and size relationship to the contours of the lines on the initial drawing and are in a predetermined angular relationship to the last said lines.

29. The hereindescribed method of producing different contours at longitudinally spaced positions on a rotatable workpiece, which method comprises the steps of providing a plurality of different contour lines on an initial drawing disposed on a drawing holder rotatable with the workpiece which lines are in proper relationship to the axis of rotation and are in proper angular relationship to each other, successively placing transparent nonconductive drawing sheets on the said initial drawing and tracing electrically conductive lines on the said sheets conforming respectively to the said contour lines on the drawing, and electroresponsively utilizing the respective conductive lines drawn on the last said sheets for successively controlling a cutter to cause it to cut contours at longitudinally spaced positions on the workpiece which last said contours have a predetermined contour and size relationship to the contours of the lines on the initial drawing and are in the same angular relationship as the last said lines.

30. The hereindescribed method of producing different contours at longitudinally spaced positions on a rotatable workpiece, which method comprises the steps of providing a plurality of different contour lines on an initial drawing in predetermined relationship to each other and to a reference point corresponding to the axis of workpiece rotation, successively tracing on transparent drawing sheets lines conforming respectively to the said contour lines and the said reference point on the initial drawing which sheets are successively supported on a rotatable holder with their said reference points at the axis of holder rotation, angularly shifting all but the first of the last said sheets about their said reference points to extents proportionate to the longitudinal spacing of the said contour positions on the workpiece, and utilizing the respective lines drawn on the last said sheets as shifted for successively controlling a cutter to cause it to cut contours at longitudinally spaced positions on the workpiece which last said contours have a predetermined contour and size relationship to the contours of the lines on the initial drawing and are in an angular relationship to each other different from that of the lines on the initial drawing.

31. The hereindescribed method of producing different contours at longitudinally spaced positions on a rotatable workpiece, which method comprises the steps of providing a plurality of different contour lines on an initial drawing disposed on a drawing holder rotatable with the workpiece which lines are in predetermined relationship to each other and to the axis of rotation, successively placing transparent drawing sheets on the first said drawing and tracing lines on the said sheets conforming respectively to the said contour lines on the initial drawing, angularly shifting all but the first of the last said sheets to extents proportionate to the longitudinal spacing of the said contour positions on the workpiece, and utilizing the respective lines drawn on the last said sheets as shifted for successively controlling a cutter to cause it to cut contours at longitudinally spaced positions on the workpiece which last said contours have a predetermined contour and size relationship to the contours of the lines on the initial drawing and are in an angular relationship to each other different from that of the lines on the initial drawing.

32. The hereindescribed method of producing different contours at longitudinally spaced positions on a rotatable workpiece, which method comprises the steps of providing a plurality of different contour lines on an initial drawing disposed on a drawing holder rotatable with the workpiece which lines are in predetermined relationship to each other and to the axis of rotation, successively placing transparent nonconductive drawing sheets on the said initial drawing and tracing electrically conductive lines on the said sheets conforming respectively to the said contour lines on the initial drawing, angularly shifting all but the first of the last said sheets to extents proportionate to the longitudinal spacing of the said contour positions on the workpiece, and electroresponsively utilizing the respective conductive lines drawn on the last said sheets as shifted for successively controlling a cutter to cause it to cut contours at longitudinally spaced positions on the workpiece which last said contours have a predetermined contour and size relationship to the contours of the lines on the initial drawing and are in an angular relationship to each other different from that of the lines on the initial drawing.

33. In a machine for shaping a workpiece with a predetermined contour, the combination of an electrically conductive pattern having a contour extending in two coordinate directions, an electrically conductive tracer having an edge positioned to face the contour of the pattern, means for effecting relative movement between the tracer and the pattern in one coordinate direction, means for connecting the tracer and the pattern in a direct current electric circuit including a short spark gap between the said tracer edge and the pattern with a voltage drop across the said gap from the said tracer edge to the pattern, the length of the said gap and the voltage at the said tracer tending to vary in accordance with the pattern contour during the said relative movements between the tracer and the pattern, an electronic tube of the triode type having its grid electrically connected with a point in the said circuit adjacent the tracer so that the voltage at the said grid varies with the voltage at the said tracer, means providing an electric circuit through the annode and the cathode of the said tube so that the current in the said circuit varies with the grid voltage, means for causing additional relative movements between the tracer and the pattern holder toward and from each other in the other coordinate direction, electronic means dependent upon variations in the last said current for controlling the last said movement causing means so as to maintain the said voltage at the said tracer within predetermined narrow limits and so as to thus maintain the length of the spark gap within predetermined narrow limits with the result that the tracer follows the said contour of the pattern, and means controlled by the said relative movements between the tracer and the pattern in the said two coordinate directions for shaping a workpiece to provide a contour thereon corresponding to the said contour of the pattern.

34. In a machine for cutting a workpiece with a predetermined contour, the combination of an electrically conductive pattern having a contour extending in two coordinate directions, a workpiece holder fixed against bodily movement with respect to the pattern, an electrically conductive tracer having an edge positioned to face the contour of the pattern, a cutting tool carrier fixed against bodily movement with respect to the tracer, means for effecting relative movement in one coordinate direction between the tracer and tool carrier and the pattern and workpiece holder, means for connecting the tracer and the pattern in an electric circuit including a short spark gap between the said tracer edge and the pattern which gap has an optimum length but tends to vary in length in accordance with the contour of the pattern during the last said relative movement between the tracer and the pattern, electrical means operable to move the tracer and the tool carrier inwardly and outwardly, and means electrically responsive to variations in the length of the said spark gap from the said optimum length for energizing the said electrical means to effect relative inward movement of the tracer and the tool carrier when the gap length increases and for energizing the said electrical means to effect relative outward movement of the tracer and the tool carrier when the gap length decreases, the last said means serving in cooperation with the said electrical means to cause the tracer to follow the contour of the pattern and to cause a tool on the tool carrier to cut the same contour on a workpiece on the workpiece holder.

35. In a machine for cutting a workpiece with a predetermined contour, the combination of an electrically conductive pattern having a contour extending in two coordinate directions, a workpiece holder fixed against bodily movement with respect to the pattern, an electrically conductive tracer having an edge positioned to face the contour of the pattern, a cutting tool carrier fixed against bodily movement with respect to the tracer, means for effecting relative movement in one coordinate direction between the tracer and tool carrier and the pattern and workpiece holder, means for connecting the tracer and the pattern in an electric circuit including a short spark gap between the said tracer edge and the pattern which gap has an optimum length but tends to vary in length in accordance with the contour of the pattern during the last said relative movement between the tracer and the pattern, two oppositely acting electrical devices operable respectively to move the tracer and the tool carrier inwardly and outwardly, and means electrically responsive to variations in the length of the said spark gap from the said optimum length for energizing one of the electrical devices to effect relative inward movement of the tracer and the tool carrier when the gap length increases and for energizing the other of the electrical devices to effect relative outward movement of the tracer and the tool carrier when the gap length decreases, the last said means serving in cooperation with the said electrical devices to cause the tracer to follow the contour of a pattern on the pattern holder and to cause a tool on the tool carrier to cut the same contour on a workpiece on the workpiece holder.

36. In a machine for cutting a workpiece with a predetermined contour, the combination of an electrically conductive pattern having a contour extending in two coordinate directions, a workpiece holder fixed against bodily movement with respect to the pattern, an electrically conductive tracer having an edge positioned to face the contour of the pattern, a cutting tool carrier fixed against bodily movement with respect to the tracer, means for effecting relative movement in one coordinate direction between the tracer and tool carrier and the pattern and workpiece holder, means for connecting the tracer and the pattern in an electric circuit including a short spark gap between the said tracer edge and the pattern which gap has an optimum length but tends to vary in length in accordance with the contour of the pattern during the last said relative movement between the tracer and the pattern, an actuating member mechanically connected with the tracer and the tool carrier for moving them in unison in the other coordinate direction, two oppositely acting electrical devices connected with the said actuating member and operable respectively to move the said member oppositely so as to move the tracer and the tool carrier inwardly or outwardly, and means electrically responsive to variations in the length of the said spark gap from the said optimum length for energizing one of the electrical devices to move the actuating member for effecting relative inward movement of the tracer and the tool carrier when the gap length increases and for energizing the other of the electrical devices to move the actuating member for effecting relative outward movement of the tracer and the tool carrier when the gap length decreases, the last said means serving in cooperation with the said electrical devices and the said actuating member to cause the tracer to follow the contour of the pattern and to cause a tool on the tool carrier to cut the same contour on a workpiece on the workpiece holder.

37. In a machine for cutting a workpiece with a predetermined contour, the combination of an electrically conductive pattern having a contour extending in two coordinate directions, a workpiece holder fixed against bodily movement with respect to the pattern, an electrically conductive tracer having an edge positioned to face the contour of the pattern, a cutting tool carrier fixed against bodily movement with respect to the tracer, means for effecting relative movement in one coordinate direction between the tracer and tool carrier and the pattern and workpiece holder, means for connecting the tracer and the pattern in an electric circuit including a short spark gap between the said tracer edge and the pattern which gap has an optimum length but tends to vary in length in accordance with the contour of the pattern during the last said relative movement between the tracer and the pattern, two oppositely acting electrical devices which are normally continually energized and which tend respectively to move the tracer and the tool carrier inwardly or outwardly, and means electrically responsive to variations in the length of the said spark gap from the said optimum length for relatively increasing the energization of one of the electrical devices to cause it to effect inward relative movement of the tracer and the tool carrier when the gap length increases and for relatively increasing the energization of the other of the electrical devices to cause it to effect outward movement of the tracer and the tool carrier when the gap length decreases, the last said means serving in cooperation with the said electrical devices to cause the tracer to follow the contour of the pattern and to cause a tool on the tool carrier to cut the same contour on a workpiece on the workpiece holder.

38. A machine as set forth in claim 37, wherein there are two oppositely acting friction clutches which tend respectively to move the tracer and the tool carrier inwardly or outwardly, and wherein the two electrical devices are continually energized electromagnets which maintain the said friction clutches in continual engagement, the energization of one of the electromagnets being realtively increased to effect relative movement of the tracer and the tool carrier inwardly and the energization of the other of the electromagnets being relatively increased to effect relative movement of the tracer and the tool carrier in the outward direction.

39. In a machine for cutting a workpiece with a predetermined contour, the combination of an electrically conductive pattern having a contour extending in two coordinate directions, a workpiece holder fixed against bodily movement with respect to the pattern, an electrically conductive tracer having an edge positioned to face the contour of the pattern, a cutting tool carrier fixed against bodily movement with respect to the tracer, means for effecting relative movement in one coordinate direction between the tracer and tool carrier and the pattern and workpiece holder, means for connecting the tracer and the pattern in an electric circuit including a short spark gap between the said tracer edge and the pattern which gap has an optimum length but tends to vary in length in accordance with the contour of the pattern during the last said relative movement between the tracer and the pattern, an actuating member mechanically connected with the tracer and the tool carrier for moving them in unison in the other coordinate direction, two oppositely acting electrical devices which are normally continuously energized, gearing connecting the said electrical devices with the said actuating member so that the said devices tend respectively to move the said member oppositely and to thereby move the tracer and the tool carrier inwardly or outwardly, backlash in the said gearing being eliminated by continuous energization of the said electrical devices, and means electrically responsive to variations in the length of the said gap from the said optimum length for relatively increasing the energization of one of the electrical devices to cause it to move the actuating member for effecting relatively inward movement of the tracer and the tool carrier when the gap length increases and for relatively increasing the energization of the other of the electrical devices to cause it to move the actuating member for effecting relative outward movement of the tracer and the tool carrier when the gap length decreases, the last said means serving in cooperation with the said electrical devices and the said gearing and the said actuating member to cause the tracer to follow the contour of the pattern and to cause a tool on the tool carrier to cut the same contour on a workpiece on the workpiece holder.

40. An apparatus comprising in combination, an electrically conductive pattern having a contour extending in two coordinate directions at angles to each other, an electrically conductive tracer having an edge positioned to face the contour of the pattern, means for effecting relative movement between the tracer and the pattern in one coordinate direction, means for connecting the tracer and the pattern in an electric circuit including a short spark gap between said tracer edge and the pattern which gap during the said relative movement between the tracer and the pattern tends to vary in length in accordance with the said contour of the pattern, and means electrically responsive to variations in the length of the said spark gap for causing additional relative movements between the tracer and the pattern holder toward and from each other in the other coordinate direction so as to maintain the said gap length within predetermined narrow limits and so as to thus cause the tracer to follow the said contour of the pattern.

41. An apparatus comprising in combination, an electrically conductive pattern having a contour extending in two coordinate directions at angles to each other, an electrically conductive tracer having an edge positioned to face the contour of the pattern, means for effecting relative movement between the tracer and the pattern in one coordinate direction, means for connecting the tracer and the pattern in a direct current electric circuit including a short spark gap between the said tracer edge and the pattern with a voltage drop across the said gap from the said tracer edge to the pattern, the length of the said gap and the voltage at the said tracer tending to vary in accordance with the pattern contour during the said relative movements between the tracer and the pattern, means for causing additional relative movements between the tracer and the pattern in the other coordinate direction, and electronic means dependent upon variations in the voltage at the said tracer for controlling the last said movement causing means so as to maintain the said voltage at the said tracer within predetermined narrow limits and so as to thus maintain the length of the spark gap within predetermined narrow limits with the result that the tracer follows the said contour of the pattern.

42. An apparatus as set forth in claim 41, wherein the open circuit voltage across the gap between the tracer and the pattern is of the order of 800 volts, and wherein the current flow across the said gap is within the range from about zero to about thirty-five microamperes.

43. An apparatus as set forth in claim 41, wherein the length of the said gap between the tracer and the pattern is within the range from about .001 inch to about .003 inch.

44. An apparatus comprising in combination, an electrically conductive pattern having a contour extending in two coordinate directions at angles to each other, an electrically conductive tracer having an edge positioned to face the contour of the pattern, means for effecting relative movement between the tracer and the pattern in one coordinate direction, means for connecting the tracer and the pattern in a direct current electric circuit including a short spark gap between the said tracer edge and the pattern with a voltage drop across the said gap from the said tracer edge to the pattern, the length of the said gap and the voltage at the said tracer tending to vary in accordance with the pattern contour during the said relative movements between the tracer and the pattern, an electronic tube of the triode type having its grid electrically connected with a point in the said circuit adjacent the tracer so that the voltage at the said grid varies with the voltage at the said tracer, means providing an electric circuit through the anode and the cathode of the said tube so that the current in the said circuit varies with the grid voltage, means for causing additional relative movements between the tracer and the pattern holder toward and from each other in the other coordinate direction, and electronic means dependent upon variations in the last said current for controlling the last said movement causing means so as to maintain the said voltage at the said tracer within predetermined narrow limits and so as to maintain the length of the spark gap within predetermined narrow limits and with the result that the tracer follows the said contour of the pattern.

45. In a machine for cutting a workpiece with predetermined contours, the combination of a template comprising at least two longitudinally spaced transversely positioned elements provided with contours which template elements are movable in transverse planes, a longitudinally extending control member adjacent the template and fixed against bodily movement therewith which control member is movable in a plane perpendicular to the plane of movement of the template elements, means operable during movement of the template for causing the control member to move in the said plane so as to assume successively different positions corresponding to successively different generally longitudinal lines extending through points on the contours of the moving template elements, and means controlled by the said control member for cutting different contours on a workpiece at different longitudinally spaced transverse planes some of which workpiece contours correspond to the contours of the said longitudinally spaced template elements and others of which workpiece contours correspond to interpolated contours between the template elements determined by the successively different positions of the control member.

46. A machine as set forth in claim 45, including a tracer movable longitudinally along the control member, means controlled by the control member for additionally moving the tracer in the said plane of movement of the control member to cause the said tracer to assume successively different positions corresponding to the positions of the immediately adjacent portions of the control member during movement thereof, and means controlled by the tracer for cutting the workpiece.

47. In a machine for cutting a workpiece with predetermined contours, the combination of a template comprising at least two longitudinally spaced transversely positioned elements provided with continuous closed contours which template elements are rotatable in transverse planes and about a longitudinal axis, a longitudinally extending control member adjacent the template and fixed against bodily movement therewith which control member is movable in a plane extending through the axis of rotation of the template, means operable during rotation of the template for causing the control member to move in the said plane so as to assume successively different positions corresponding to successively different generally longitudinal lines extending through points on the contours of the rotating template elements, and means controlled by the said control member for cutting different contours on a workpiece at different longitudinally spaced transverse planes some of which workpiece contours correspond to the contours of the said longitudinally spaced template elements and others of which workpiece contours correspond to interpolated contours between the template elements determined by the successively different positions of the control member.

48. In a machine for cutting a workpiece with predetermined contours, the combination of a holder for a template comprising at least three longitudinally spaced transversely positioned elements provided with different contours which holder is movable to move the elements of the said template in transverse planes, a flexure fixed against bodily movement with the template holder, means for flexing the flexure during movement of the holder and of the template elements to cause it to assume continually differing shapes corresponding to successively different generally longitudinal lines extending through the contour edges of the moving template elements, and means controlled by the said flexure for cutting the workpiece to provide it with predetermined different transverse contours at different longitudinally spaced planes some of which contours correspond to the contours of the said longitudinally spaced template elements and others of which contours correspond to interpolated contours between the template elements determined by the said continually differing shapes of the flexure.

49. A machine as set forth in claim 48, including a tracer movable longitudinally along the flexure, means controlled by the flexure for moving the tracer transversely to cause it to assume successively different positions conforming to the positions of the successive immediately adjacent portions of the flexure during continual flexing thereof, and means controlled by the tracer for cutting the workpiece.

50. In a machine for cutting a workpiece with predetermined contours, the combination of a holder for a template comprising at least three longitudinally spaced transversely positioned elements provided with different contours which holder is movable to move the elements of the said template in transverse planes, a holder for the workpiece movable in a predetermined relationship to the movement of the template holder, a flexure fixed against bodily movement with the template holder, means for flexing the flexure during movement of the holder and of the template elements to cause it to assume continually differing shapes corresponding to successively different generally longitudinal lines extending through the contour edges of the moving template elements, a tracer movable longitudinally along the flexure and movable transversely under the control of the flexure to follow the continually changing shapes thereof, a carrier for supporting a tool adapted to cut the workpiece on the holder therefor which carrier is fixed against bodily movement with the last said holder, and means for moving the tool carrier relatively to the workpiece holder longitudinally and transversely in a manner bearing a fixed relationship to the manner in which the tracer is moved longitudinally along the flexure and is moved transversely under the control of the flexure and for thus causing the tool to cut predetermined different transverse contours on the workpiece at different longitudinally spaced planes some of which contours correspond to the contours of the said longitudinally spaced template elements and others of which contours correspond to interpolated contours between the template elements determined by the said continually differing shapes of the flexure.

51. A machine as set forth in claim 50, wherein the template holder and the workpiece holder are movable rotatively and in a predetermined relationship to each other.

52. In a machine for cutting a workpiece with predetermined contours, the combination of a holder for a template comprising at least three longitudinally spaced transversely positioned elements provided with different contours which holder is movable to move the elements of the said template in transverse planes, a holder for the workpiece movable in a predetermined relationship to the movement of the template holder, at least three individually movable sliders respectively engageable with the said elements of the template and movable transversely in accordance with the contours of the said elements, a flexure fixed against bodily movement with the template holder and engaged by the said sliders to be flexed thereby during movement of the template elements so as to assume continually differing shapes corresponding to successively different generally longitudinal lines extending through the contour edges of the moving template elements, a tracer movable longitudinally along the flexure and movable transversely under the control of the flexure to follow the continually changing shape thereof, a carrier for supporting a tool adapted to cut the workpiece on the holder therefor which carrier is fixed against bodily movement with the last said holder, and means for moving the tool carrier relatively to the workpiece holder longitudinally and transversely in a manner bearing a fixed relationship to the manner in which the tracer is moved longitudinally along the flexure and is moved transversely under the control of the flexure and for thus causing the tool to cut predetermined different transverse contours on the workpiece at different longitudinally spaced planes some of which contours correspond to the contours of the said longitudinally spaced template elements and others of which contours correspond to interpolated contours between the template elements determined by the said continually differing shapes of the flexure.

53. A machine as set forth in claim 52, wherein the flexure is formed of magnetic material, and wherein there are magnets on the several sliders for magnetically holding and flexing the flexure.

54. In a machine for cutting a workpiece with predetermined contours, the combination of a holder for a template comprising at least three longitudinally spaced transversely positioned elements provided with different contours which holder is movable to move the elements of the said template in transverse planes, a holder for the workpiece movable in a predetermined relationship to the movement of the template holder, a carrier for a rotary cutting tool rotatable about a longitudinal axis and adapted to cut the workpiece on the holder therefor which carrier is fixed against bodily movement with the last said holder, at least three individually movable sliders respectively engageable with the said elements of the template and movable transversely in accordance with the contours of the said elements, each of the said sliders having a follower portion which engages the corresponding template element and has a radius corresponding to that of the cutting tool, a flexure fixed against bodily movement with the template holder and engaged by the said sliders to be flexed thereby during movement of the template elements so as to assume continually differing shapes corresponding to successively different generally longitudinal lines extending through the contour edges of the moving template elements, a tracer movable longitudinally along the flexure and movable transversely under the control of the flexure to follow the continually changing shape thereof, and means for moving the tool carrier relatively to the workpiece holder longitudinally and transversely in a manner bearing a fixed relationship to the manner in which the tracer is moved longitudinally along the flexure and is moved transversely under the control of the flexure and for thus causing the tool to cut predetermined different transverse contours on the workpiece at different longitudinally spaced planes some of which contours correspond to the contours of the said longitudinally spaced template elements and others of which contours correspond to interpolated contours between the template elements determined by the said continually differing shapes of the flexure.

55. In a machine for cutting a workpiece with predetermined contours, the combination of a template comprising at least two longitudinally spaced transversely positioned elements provided with contours which template elements are movable in transverse planes, a longitudinally extending electrically conductive control member adjacent the template and fixed against bodily movement therewith which control member is movable in a plane perpendicular to the direction of movement of the adjacent portions of the template elements, means operable during movement of the template for causing the control member to move in the said plane so as to assume successively different positions corresponding to successively different generally longitudinal lines extending through points on the contours of the moving template elements, an electrically conductive tracer longitudinally movable along the control member, means for connecting the tracer and the control member in an electric circuit including a short spark gap between the tracer and the control member which gap during movement of the tracer tends to vary in length in accordance with the position of the control member, means electrically responsive to variations in the length of the said spark gap for causing additional movements of the tracer toward and from the control member so as to maintain the said gap length within narrow limits and so as to cause the tracer to be guided by the control member, and means controlled by the last said movements of the tracer and by the longitudinal movement thereof for cutting different contours on a workpiece at different longitudinally spaced transverse planes some of which workpiece contours correspond to the contours of the said longitudinally spaced template elements and others of which workpiece contours correspond to interpolated contours between the template elements determined by the successively different positions of the control member.

56. In a machine for cutting a workpiece with predetermined contours, the combination of a holder for a template comprising at least three longitudinally spaced transversely positioned elements provided with different contours which holder is movable to move the elements of the said template in transverse planes, a holder for the workpiece movable in a predetermined relationship to the movement of the template holder, an electrically conductive flexure fixed against bodily movement with the template holder, means for flexing the flexure during movement of the template elements to cause it to assume continually differing shapes corresponding to successively different generally longitudinal lines extending through the contour edges of the moving template elements, an electrically conductive tracer movable longitudinally along the flexure, means for connecting the tracer and the flexure in an electric circuit with a short spark gap between them which gap tends to vary in length by reason of the longitudinal movement of the tracer and by reason of the continually differing shapes of the flexure, means electrically responsive to variations in the length of the spark gap for causing transverse movements of the tracer so as to maintain the said spark gap length within predetermined narrow limits and so as to thus cause the tracer to follow the said continually differing shapes of the flexure, a carrier for supporting a tool adapted to cut the workpiece on the said workpiece holder which carrier is fixed against bodily movement with the workpiece holder, and means for moving the tool carrier relatively to the workpiece holder longitudinally and transversely in a manner bearing a fixed relationship to the manner in which the tracer is moved longitudinally along the flexure and is moved transversely under the control of the spark gap controlled means and for thus causing the tool to cut predetermined different transverse contours on the workpiece at different longitudinally spaced planes some of which contours correspond to the contours of the said longitudinally spaced template elements and others of which contours correspond to interpolated contours between the template elements determined by the said continually different shapes of the flexure.

57. In a machine for cutting a workpiece with predetermined contours, the combination of a holder for a template comprising at least four longitudinally spaced transversely positioned elements provided with different contours which holder is movable to move the elements of the said template in transverse planes, a holder for the workpiece movable in a predetermined relationship to the movement of the template holder, at least four individually movable sliders respectively engageable with the said elements of the template and movable transversely in accordance with the contours of the said elements, an electrically conductive flexure fixed against bodily movement with the template holder and engaged by the said sliders to be flexed thereby during movement of the template elements so as to assume continually differing shapes corresponding to successively different generally longitudinal lines extending through the contour edges of the moving template elements, a tracer movable longitudinally along the flexure and movable transversely under the control of the flexure to follow the continually changing shape thereof, means controlled by the flexure for cutting different contours on a workpiece at different longitudinally spaced transverse planes some of which workpiece contours correspond to the contours of the said longitudinally spaced template elements and others of which workpiece contours correspond to interpolated contours between the template elements determined by the successively different positions of the control member, an electrically operable means carried by a slider at one end of the series for applying force to flex the flexure, an electrical contact at the flexure engaging end of the next adjacent slider which contact is insulated from the remainder of the slider, means for connecting the said flexure and the said contact in an electric circuit, and means responsive to electrical conditions in the said circuit for energizing the said electrically operable means to cause it to flex the flexure.

58. In a machine for cutting a workpiece with predetermined contours in different longitudinally spaced planes and in a predetermined rotative relationship, the combination of a template rotatable about a longitudinal axis and having different contours in different longitudinally spaced transverse planes which contours are in a different rotative relationship from the corresponding contours to be cut on the workpiece, a rotatable holder for the workpiece, a tool carrier adjacent the workpiece holder, a tracer movable longitudinally relatively to the pattern, means for moving the tracer transversely in accordance with the contours of the template at different longitudinally spaced transverse planes, means for moving the tool carrier in accordance with the longitudinal and transverse movements of the tracer, and means for rotating the template at a rate sufficiently different from that of the workpiece holder to cause a tool on the tool carrier to cut contours on the workpiece corresponding to the said template contours and in the said predetermined rotative relationship notwithstanding the said different rotative relationship of the said contours of the template.

59. A machine as set forth in claim 58, wherein the means for adjusting the rate of rotation of the template holder includes a differential mechanism.

60. A machine as set forth in claim 58, wherein the means for adjusting the rate of rotation of the template holder includes a longitudinally inclined guide and a tracer relatively movable longitudinally along the guide in accordance with the longitudinal movement of the first said tracer and the tool carrier.

61. In a machine for cutting a workpiece with predetermined contours in different longitudinally spaced planes and in a predetermined rotative relationship, the combination of a rotatable holder for a template comprising a plurality of longitudinally spaced transversely positioned elements provided with contours which are in a rotative relationship different from the rotative relationship of the corresponding contours to be cut in the workpiece in the said planes thereof, a rotatable holder for the said workpiece, a flexure fixed against bodily movement with the template holder, means for flexing the flexure during movement of the template elements to cause it to assume continually differing shapes corresponding to successively different generally longitudinal lines extending through the contour edges of the moving template elements, a tracer movable longitudinally along the flexure and movable transversely under the control of the flexure to follow the continually changing shapes thereof, a carrier for supporting a tool adapted to cut the workpiece on the holder therefor which carrier is fixed against bodily movement with the last said holder, means for moving the tool carrier in accordance with the longitudinal movements of the tracer along the flexure and in accordance with the transverse movements of the tracer under the control of the flexure and for thus causing the tool to cut predetermined different transverse contours on the workpiece at different longitudinally spaced planes some of which contours correspond to the contours of the said longitudinally spaced template elements and others of which contours correspond to interpolated contours between the template elements determined by the said continually differing shapes of the flexure, and means for rotating the template holder at a rate sufficiently different from that of the workpiece holder to cause the said contours on the workpiece to be cut in the said predetermined rotative relationship notwithstanding the different rotative relationship of the template elements.

62. A machine as set forth in claim 61, including means for adjusting the rate of rotation of the template holder with respect to the rate of rotation of the workpiece holder.

63. A machine as set forth in claim 62, wherein the means for adjusting the rate of rotation of the template holder includes a differential mechanism.

64. A machine as set forth in claim 62, wherein the means for adjusting the rate of rotation of the template holder includes a longitudinally inclined guide and a tracer relatively movable longitudinally along the guide in accordance with the longitudinal movement of the first said tracer and the tool carrier.

65. A machine as set forth in claim 64, wherein the inclined guide is a flexure and wherein transversely adjustable sliders are provided which hold and flex the flexure.

66. A machine as set forth in claim 64, wherein the said inclined guide and the last said tracer are electrically conductive, means for connecting the last said tracer and the said guide in an electric circuit with a short spark gap between them which gap tends to vary in length by reason of the longitudinal movement of the tracer and by reason of the inclination of the guide, means electrically responsive to variations in the length of the spark gap for causing transverse movements of the tracer so as to maintain the said spark gap length within predetermined narrow limits and so as to thus cause the tracer to follow the said guide, and means controlled by the transverse movements of the last said tracer for controlling the rate of rotation of the template holder with respect to the rate of rotation of the workpiece holder.

References Cited in the file of this patent

UNITED STATES PATENTS

| Number | Name | Date |
| --- | --- | --- |
| 1,410,591 | Norton | Mar. 28, 1922 |
| 1,683,581 | Shaw | Sept. 4, 1928 |
| 1,953,283 | Weston | Apr. 3, 1934 |
| 1,955,322 | Brown | Jan. 22, 1935 |
| 1,988,458 | Minorsky | Jan. 22, 1935 |
| 1,998,939 | Mittag | Apr. 23, 1935 |
| 2,012,426 | Gulliksen | Aug. 27, 1935 |
| 2,032,016 | Hitner | Feb. 25, 1936 |
| 2,111,815 | Schwartz | Mar. 22, 1938 |
| 2,146,157 | Salisbury | Feb. 7, 1939 |
| 2,151,743 | Chladek | Mar. 28, 1939 |
| 2,173,446 | Heindlhofer | Sept. 19, 1939 |
| 2,180,872 | Ford | Nov. 21, 1939 |
| 2,199,103 | Jeffreys | Apr. 30, 1940 |
| 2,233,415 | Hull | Mar. 4, 1941 |
| 2,234,239 | Freudenhammer | Mar. 11, 1941 |
| 2,243,456 | Dutter | May 27, 1941 |
| 2,248,809 | Cook | July 8, 1941 |
| 2,311,804 | Wright | Feb. 23, 1943 |
| 2,315,176 | Zacharia | Mar. 30, 1943 |
| 2,324,546 | Taylor | July 20, 1943 |
| 2,354,391 | McCourt | July 25, 1944 |
| 2,380,357 | Ziebolz | July 10, 1945 |
| 2,390,879 | Hagen | Dec. 11, 1945 |
| 2,407,886 | Knobel | Sept. 17, 1946 |
| 2,420,547 | Lovely | May 13, 1947 |
| 2,424,042 | Lundberg | July 15, 1947 |
| 2,434,854 | Junkins et al. | Jan. 20, 1948 |
| 2,435,280 | Jaeger | Feb. 3, 1948 |
| 2,453,957 | Allen | Nov. 16, 1948 |
| 2,464,293 | Cooke et al. | Mar. 15, 1949 |
| 2,468,723 | Bartlett | Apr. 26, 1949 |
| 2,475,326 | Johnson | July 5, 1949 |
| 2,487,944 | Pressman | Nov. 15, 1949 |
| 2,524,091 | Von Zimmermann | Oct. 3, 1950 |
| 2,586,169 | Kline | Feb. 19, 1952 |

FOREIGN PATENTS

| Number | Country | Date |
| --- | --- | --- |
| 303,979 | Italy | Dec. 22, 1932 |
| 478,569 | Great Britain | Acc. Jan. 17, 1938 |